United States Patent
Cohen et al.

(10) Patent No.: US 10,703,297 B1
(45) Date of Patent: Jul. 7, 2020

(54) SYSTEM FOR HOLDING DEVICES IN A PASSENGER VEHICLE

(71) Applicants: Sawyer I. Cohen, Sunnyvale, CA (US); Jack J. Wanderman, Sunnyvale, CA (US); Romain A. Teil, San Francisco, CA (US); Mikael P. Sedlacek, Mountain View, CA (US); Jorge C. Fialho, San Jose, CA (US); Kirill Kalinichev, San Francisco, CA (US); Robert D. Silfvast, Sunnyvale, CA (US); Justin D. Crosby, Sunnyvale, CA (US)

(72) Inventors: Sawyer I. Cohen, Sunnyvale, CA (US); Jack J. Wanderman, Sunnyvale, CA (US); Romain A. Teil, San Francisco, CA (US); Mikael P. Sedlacek, Mountain View, CA (US); Jorge C. Fialho, San Jose, CA (US); Kirill Kalinichev, San Francisco, CA (US); Robert D. Silfvast, Sunnyvale, CA (US); Justin D. Crosby, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 15/686,229

(22) Filed: Aug. 25, 2017

Related U.S. Application Data

(60) Provisional application No. 62/379,817, filed on Aug. 26, 2016.

(51) Int. Cl.
    *B60R 11/02* (2006.01)
    *B60N 3/10* (2006.01)
    *B60R 11/00* (2006.01)

(52) U.S. Cl.
    CPC .............. *B60R 11/02* (2013.01); *B60N 3/103* (2013.01); *B60R 2011/007* (2013.01); *B60R 2011/0077* (2013.01); *B60R 2011/0091* (2013.01)

(58) Field of Classification Search
    CPC ............... B60R 11/02; B60R 2011/007; B60R 2011/0077; B60R 2011/0091; B60N 3/103
    See application file for complete search history.

(56) References Cited

U.S. PATENT DOCUMENTS

| | | | |
|---|---|---|---|
| 6,149,116 A * | 11/2000 | Won | B60R 11/0241 248/309.4 |
| 6,236,868 B1 | 5/2001 | Lygas | |
| 6,888,940 B1 | 5/2005 | Deppen | |
| 7,374,142 B2 * | 5/2008 | Carnevali | F16M 13/00 224/183 |
| 9,397,719 B1 * | 7/2016 | Schmidt | F16M 11/24 |
| 9,961,306 B1 * | 5/2018 | Lev | F16M 11/041 |

(Continued)

FOREIGN PATENT DOCUMENTS

CN    201996312 U    10/2011

*Primary Examiner* — Anita M King
(74) *Attorney, Agent, or Firm* — Young Basile Hanlon & MacFarlane, P.C.

(57) ABSTRACT

A system for securing a user device in a vehicle includes a magnet and an attraction plate. One of the magnet or the attraction plate is mechanically coupled to the vehicle, and the other of the magnet or the attraction plate is mechanically coupled to the user device. The magnet is selectively activated to hold the attraction plate and, thereby, secure the user device to the vehicle.

31 Claims, 40 Drawing Sheets

(56) References Cited

U.S. PATENT DOCUMENTS

| | | | |
|---|---|---|---|
| 10,237,384 B2* | 3/2019 | Holder | H04M 1/04 |
| 10,327,538 B2* | 6/2019 | Alexander | A45F 5/02 |
| 2008/0012706 A1 | 1/2008 | Mak-Fan et al. | |
| 2014/0354218 A1* | 12/2014 | Kaynar | H02J 7/0044 |
| | | | 320/107 |
| 2016/0040825 A1* | 2/2016 | Franklin | F16M 13/02 |
| | | | 439/39 |
| 2016/0106202 A1* | 4/2016 | Ford | A45C 13/1069 |
| | | | 224/267 |
| 2016/0150861 A1* | 6/2016 | Yao | A45C 11/00 |
| | | | 224/245 |
| 2019/0118972 A1* | 4/2019 | Yan | F16M 11/18 |

* cited by examiner

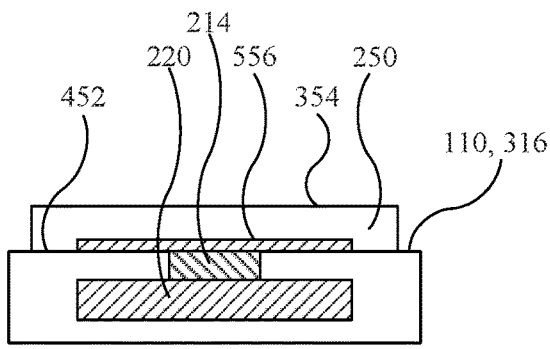
FIG. 5
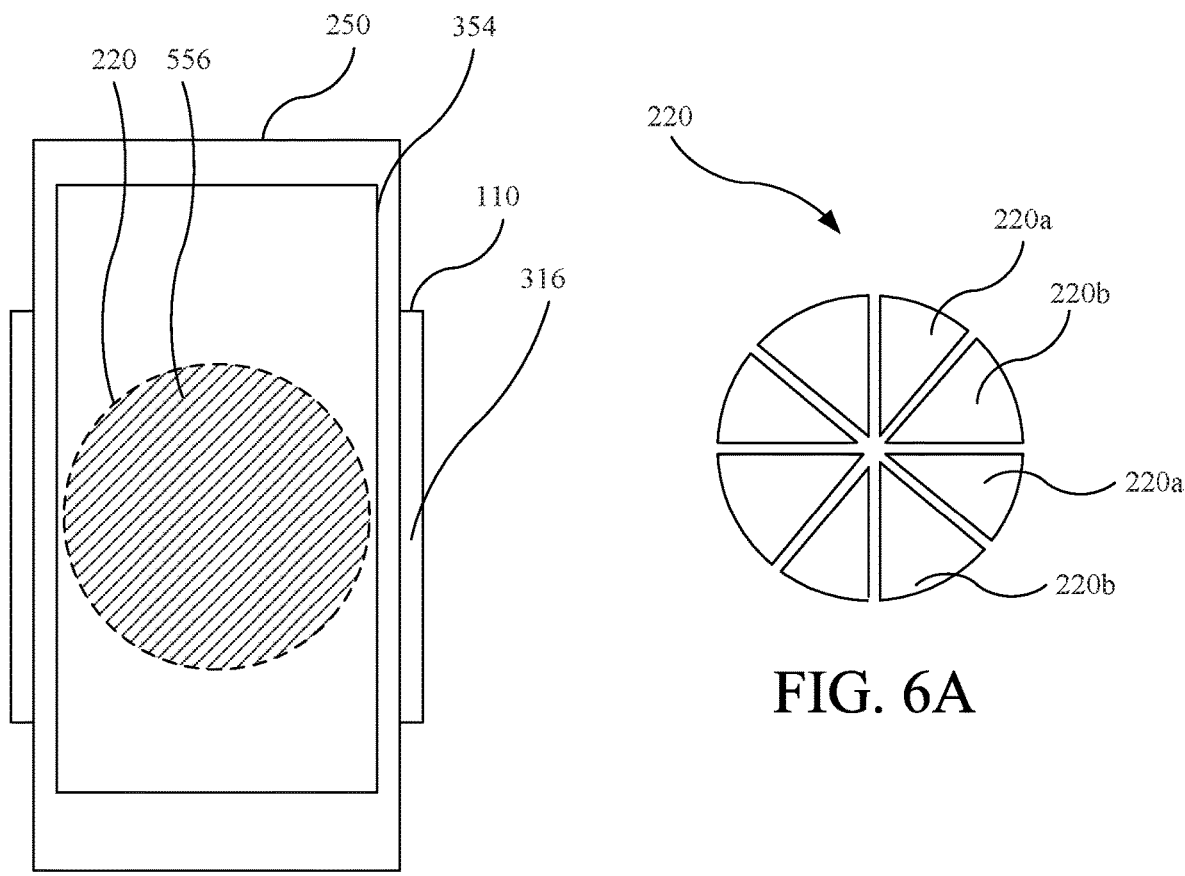
FIG. 6
FIG. 6A

SYSTEM FOR HOLDING DEVICES IN A PASSENGER VEHICLE

CROSS-REFERENCE TO RELATED APPLICATION(S)

This application claims the benefit of U.S. Provisional Application No. 62/379,817, filed on Aug. 26, 2016, and entitled "System for Holding Devices in a Passenger Vehicle," the content of which is incorporated herein by reference in its entirety for all purposes.

TECHNICAL FIELD

This disclosure relates to systems for holding devices and, in particular, systems for holding user devices in passenger vehicles.

SUMMARY

One aspect of the disclosure is a system for securing a user device in a vehicle. The system includes a magnet and an attraction plate. One of the magnet or the attraction plate is mechanically coupled to the vehicle, and the other of the magnet or the attraction plate is mechanically coupled to the user device. The magnet is selectively activated to hold the attraction plate and, thereby, secure the user device to the vehicle.

In some implementations of the system, the magnet is a component of a holding device that is mechanically coupled to the vehicle, and the attraction plate is mechanically coupled to the user device. The attraction plate may be external to the user device.

In some implementations of the system, the magnet is an electropermanent magnet.

In some implementations, the system includes multiple magnets and multiple attraction plates that each correspond to one of the magnets, wherein the magnets are activated progressively to firstly angularly orient the user device to magnets with a lesser force and secondly secure the user device to the magnets with a greater force. The multiple magnets may include a first set of magnets having a first strength and a second set of magnets having a second strength that is greater than the first strength, wherein the magnets of the first set of magnets are activated to angularly orient the user device and the magnets of the second set of magnets are activated to secure the user device.

In some implementations of the system, the magnet is a component of a holding device and is activated upon detection of the user device being positioned proximate the holding device. The holding device may include at least one of an optical sensor or a Hall effect sensor to detect the user device. The holding device may be configured to determine whether the user device is an authorized device by at least one of communicating with the user device, optically recognizing the user device, or magnetically recognizing the user device.

In some implementations of the system, the magnet is a component of a holding device and releases the user device upon detecting contact with user device by a user. The holding device may release the user device upon at least one of detecting the contact on opposite sides of the user device, detecting a force of the contact as exceeding a threshold, or optically recognizing the user as grasping the user device. The holding device may release the user device in a staged manner by reducing a magnetic force applied by the magnet to the attraction plate to lessen a holding force by which the user device is removable by the user from the holding device.

In some implementations, the system includes multiple magnets that provide multiple holding locations at which the user device is securable by the holding device, wherein the holding device is configured to determine a present location of the user device and activate one or more of the magnets corresponding to the present location of the user device. Each magnet of the multiple magnets may be associated with only one of the holding locations. The multiple magnets may be arranged in a matrix, and a majority of the magnets may be associated with more than one of the holding locations.

In some implementations of the system, the magnet is a component of a holding device, and holds the attraction plate with greater force upon detection of at least one of separation between the holding device and the user device or vehicle acceleration exceeding a threshold.

In some implementations of the system, the user device is a portable electronic device. The system may provide active feedback to assist a user in positioning the portable electronic device relative to the magnet. The active feedback may include at least one of visual feedback, tactile feedback, or audible feedback. The active feedback may be visual feedback comprising a dynamic graphical representation on a display of the portable electronic device.

In some implementations of the system, the user device is an auxiliary device for holding contents. The contents may be a beverage. The holding device may lack a power source.

Another aspect of the disclosure is a system for holding a user device. The system includes a passenger vehicle; and a holding device mechanically coupled to the passenger vehicle, wherein the holding device magnetically couples to the user device upon active detection of the user device by the holding device.

In some implementations of the system, the user device is detected using sensors of at least one of the user device, the holding device, or the vehicle. The holding device may release the user device upon detecting both contact of the user device by a user and intent by the user to grasp the user device. The intent of the user may be determined by at least one of contacting opposing sides of the user device, contacting the user device with a force exceeding a threshold, or optical recognition of the user.

In some implementations, the system is configured to provide feedback to the user of an angular orientation of the user device relative to the holding device by at least one of visually or tactilely.

Another aspect of the disclosure is an object securing system for a vehicle. The system include a magnetic device that is connected to the vehicle and is switchable between a first state in which an external magnetic field is produced to attract ferromagnetic objects and a second state in which the external magnetic field is not produced. The system also includes an electronic device, wherein the electronic device is held by the magnetic device in the first state and the electronic device is released from the magnetic device in the second state.

In some implementations of the object securing system, the magnetic device is automatically switched to the first state when the portable electronic device is detected in proximity of the magnetic device.

Another aspect of the disclosure is a system that includes a vessel for a beverage and a holding device. The holding device holds the vessel with an electropermanent magnet and an attraction plate.

In some implementations of the system, the holding device includes the electropermanent magnet, and the vessel includes the attraction plate. In some implementations of the system, the holding device is coupled to a passenger vehicle, and the vessel is coupleable to the passenger vehicle via the holding device. In some implementations of the system, the holding device is retractable to form a receptacle thereabove.

Another aspect of the disclosure is a system for coupling a user device to a passenger vehicle. The system includes a holding device comprising a vacuum source in communication with multiple nozzles formed in a plate, wherein the vacuum source is selectively activated when the user device is detected in proximity of the plate to secure the user device to the plate.

In some implementations of the system for coupling the user device to a passenger vehicle, the multiple nozzles are functionally grouped into regions of the nozzles, each region of the nozzles being selectively activated by an active valve in communication with the nozzles thereof and the vacuum source. In some implementations of the system for coupling the user device to a passenger vehicle, each nozzle includes a passive valve associated therewith that remains open when the user device is positioned adjacent to the nozzle associated therewith, and is closed when the user device is not positioned adjacent to the nozzle associated therewith simultaneous to the vacuum source being activated.

Another aspect of the disclosure is a holding device for securing an object to a passenger vehicle. The holding device includes a vacuum chamber that is enclosed by a flexible membrane, a media disposed in the vacuum chamber. The media includes solid particles that are flowable relative to each other. A vacuum source is configured to draw a vacuum in the vacuum chamber to compress the media together around the object when embedded into the flexible membrane.

In some implementations of the holding device, the vacuum is drawn selectively upon detection of a user device being embedded in the flexible membrane. In some implementations of the holding device, the holding device includes holding regions that are separately activated.

Another aspect of the disclosure is an adjustable mechanism for adjustably securing a user device to a passenger vehicle. The adjustable mechanism includes elongated members coupled to each other by joints therebetween. The joints are selectively released upon detection of a user's intent to adjust a position of the user device.

In some implementations of the adjustable mechanism, the user's intent is detected by at least one of a touch sensor of the user device or optically recognizing movements of the user. In some implementations of the adjustable mechanism, one or more of the joints comprise a male member coupled to one of the elongated members and positioned within a rigid chamber that is coupled to another of the elongated members, wherein a flowable media of solid particles is arranged in the chamber, and a vacuum is selectively drawn in the chamber to compress the media against itself and against the male member to prevent movement of the male member within the chamber.

BRIEF DESCRIPTION OF THE DRAWINGS

FIG. 5 is a cross-sectional view of the holding device and the electronic device taken along line 5-5 in FIG. 2.

FIG. 6 is a front view of the holding device and the electronic device shown in FIG. 3, which depicts hidden internal components of a magnet in broken lines and an attraction plate with diagonal cross-hatching.

FIG. 6A is a front view of a magnet of the holding device shown in FIG. 3.

DETAILED DESCRIPTION

Figure 1:
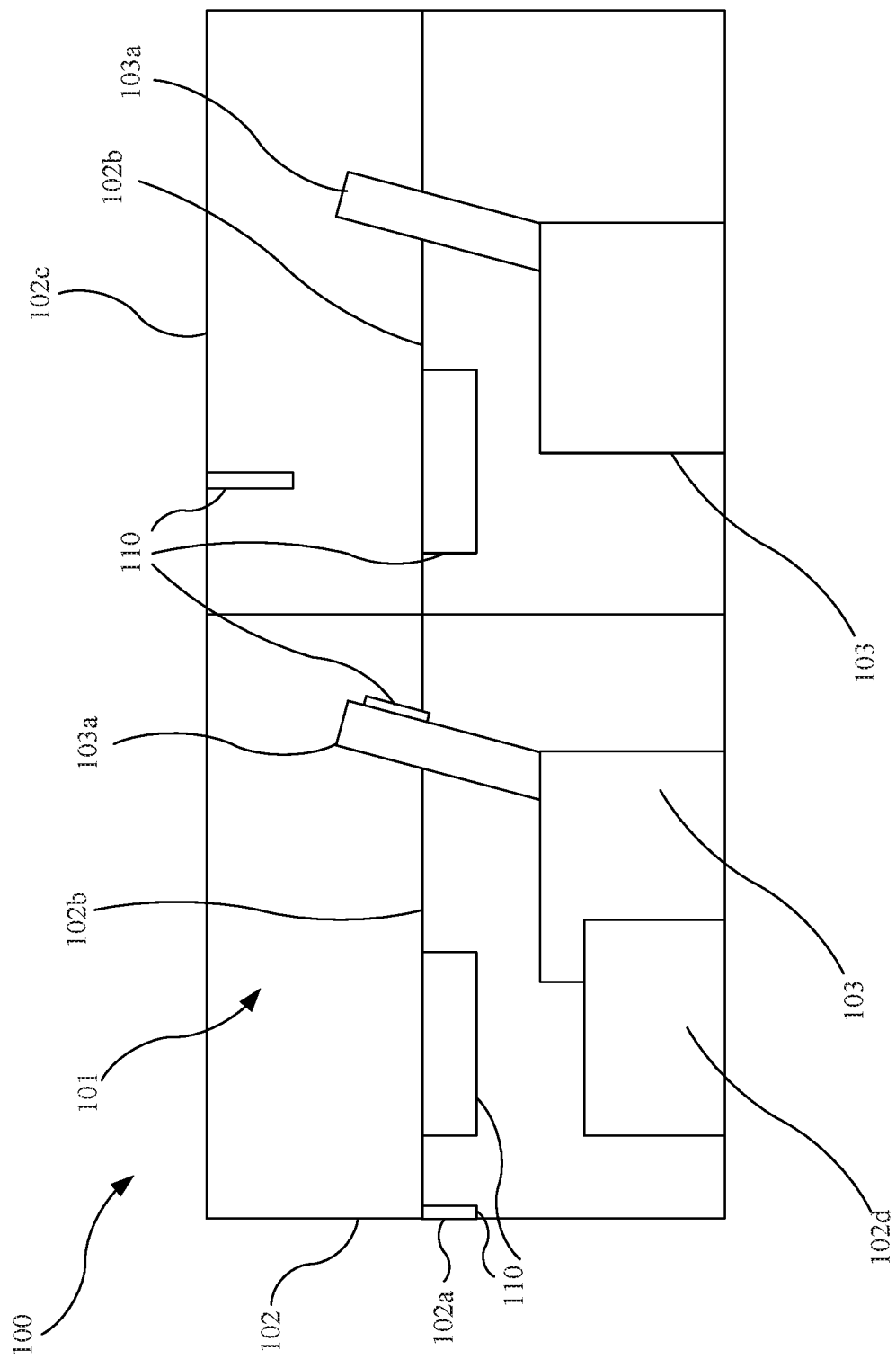
FIG. 1 is a side view of a vehicle showing an interior of a passenger compartment thereof with holding devices arranged in the passenger compartment.

Referring to FIG. 1, a passenger vehicle 100 (e.g., vehicle) includes one or more holding devices 110 (or variations thereof) that are configured to hold or otherwise secure one or more objects or other possessions of the passengers. The holding devices 110 may, for example selectively hold via magnetism (e.g., magnetically coupling) and/or a mechanical coupling user devices, such as portable electronic devices (e.g., smartphones, tablet computers, digital media players, etc.) or auxiliary devices (e.g., containers, mechanical device holders, etc.). The vehicle 100, the holding devices 110, the user devices, and/or subportions and subcombinations thereof may be considered to cooperatively form a system for securing a user device.

The holding devices 110 are positioned within a passenger compartment 101 that is defined by a vehicle body 102. The one or more holding devices 110 may, for example, be mechanically coupled to different structures of the vehicle body 102 at forward locations (e.g., in a dashboard 102a or other forward structure), at side locations (e.g., in a door 102b or other side structure), at interior locations (e.g., in a seat back 103a of one of the seats, or in console 102d), at upper locations (e.g., in a roof 102c), and/or other locations. The holding devices 110 may be provided at more, fewer, and/or different locations than the aforementioned examples.

Figure 2:
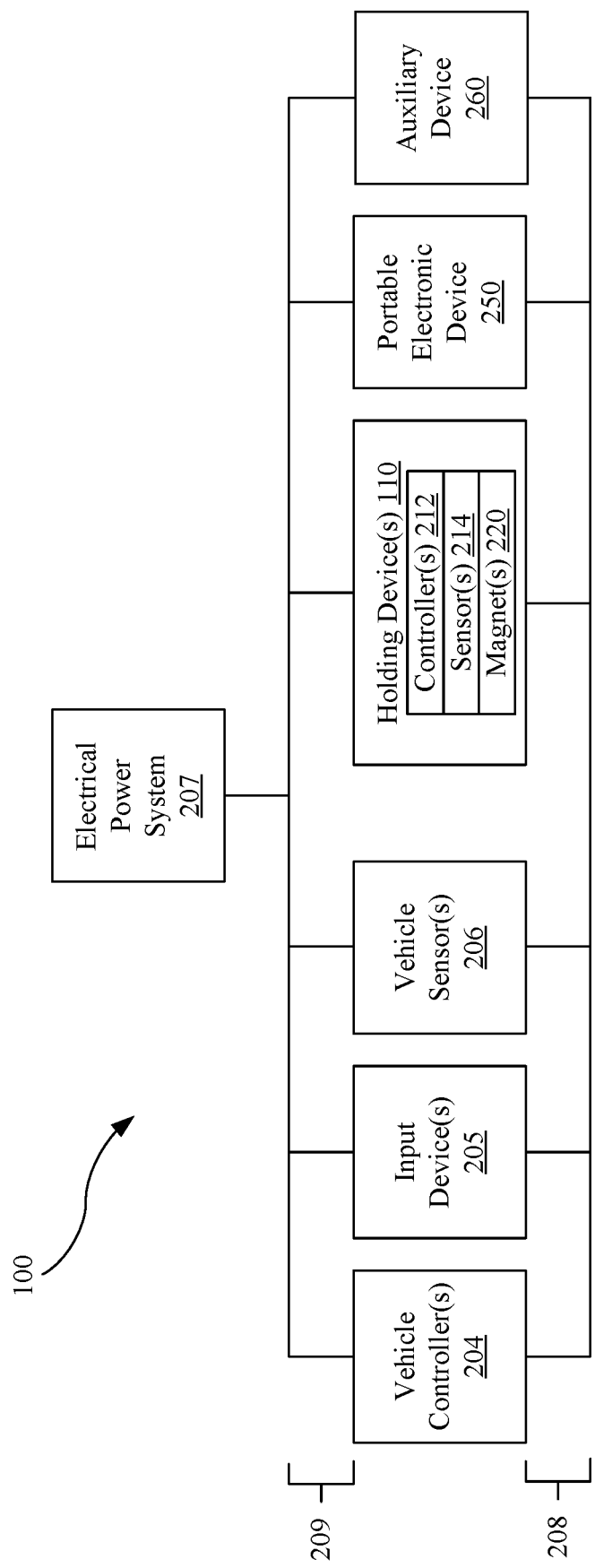
FIG. 2 is a schematic view of the vehicle shown in FIG. 1.
Figure 3:
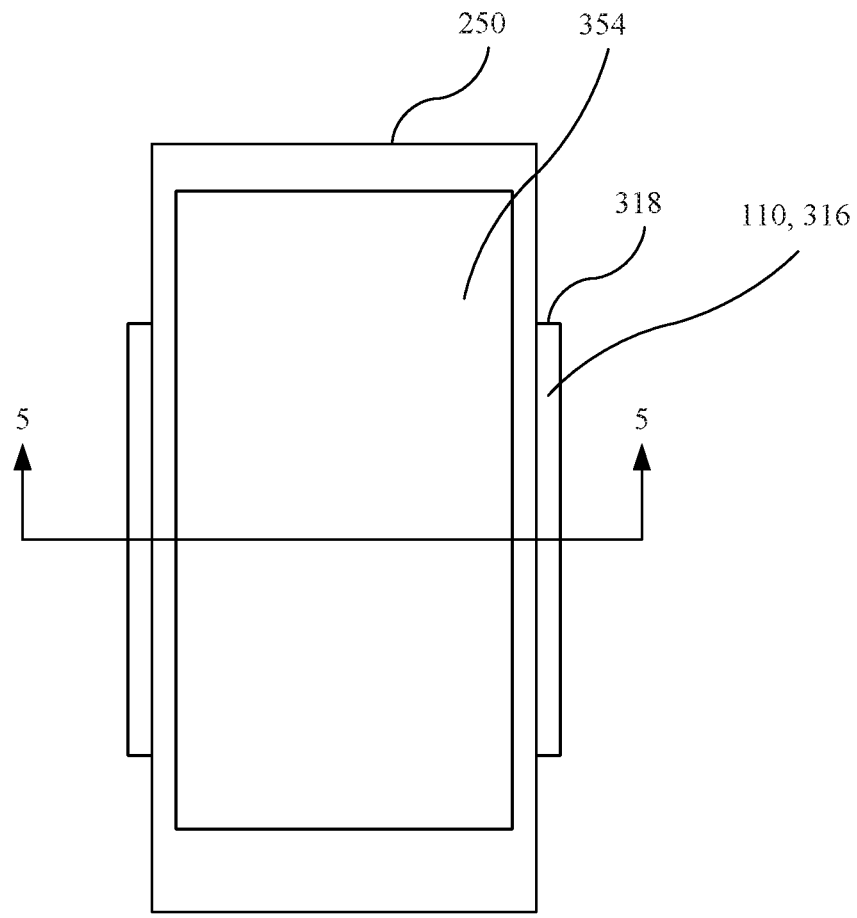
FIG. 3 is a front view of one of the holding devices shown in FIG. 1, which is holding an electronic device.
Figure 4:
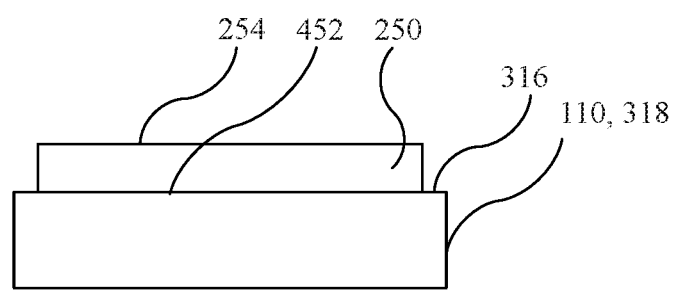
FIG. 4 is a bottom view of the holding device shown in FIG. 3, which is holding the electronic device.

Referring to FIG. 2, according to a first embodiment, the holding device 110 is configured to hold the user device, such as a portable electronic device 250 and/or an auxiliary device 260 via magnetism. The holding device 110 generally includes one or more controllers 212, one or more sensors 214, and one or more magnets 220, the various functions of which are discussed in further detail below. The discussion of FIGS. 3-25 is with respect to embodiments of the holding device 110 and the portable electronic device 250, but also applies to embodiments of the auxiliary device 260 that is further discussed in association with FIGS. 26-38.

The holding device 110 is integrated with the vehicle 100, for example, by being in communication with one or more vehicle controllers 204, input devices 205, and/or vehicle sensors 206 of the vehicle 100 via a network 208 and/or by being powered by an electrical power system 207 of the vehicle 100 (e.g., for propelling the vehicle 100) via a power distribution system 209. The holding device 110 is additionally in communication with the portable electronic device 250 via the network 208 or direct communication therewith (e.g., via near field communication). The holding device 110 may additionally include one or more sensors 214 in communication with the controller 212. The holding device 110 may, thereby, receive various control and/or data signals for controlling operation of the holding device 110 from the vehicle sensors 206 and/or sensors 214 of the holding device 110 itself. More specifically, the controller 212 of the holding device 110 determines whether and how to operate the magnets 220 to hold the portable electronic device 250. It should be noted that functions of the controller 212 of the holding device 110 and the vehicle controllers 204 may be consolidated or dispersed resulting in fewer or more controllers.

The holding device 110 may receive instruction and/or data signals from the vehicle controller 204 based on which the controller 212 of the holding device 110 determines whether and how to operate the magnets 220. The instruction and/or data signals received from the vehicle controller 204 may be based on inputs received by the vehicle controller 204, such as from the input devices 205 (discussed below), the vehicle sensors 206 (e.g., accelerometers, cameras, radar, LIDAR, etc.), the holding devices 110, and/or the portable electronic devices 250, and/or based on processing of such inputs by the vehicle controller 204 (e.g., via an autonomous driving plan, such as to execute emergency braking). The holding devices 110 may instead or additionally receive instructions, information, and/or other signals directly from the input devices 205, the vehicle sensors 206, and/or the portable electronic device 250, while bypassing the vehicle controller 204.

The user input devices 205 are configured to receive inputs from the user, for example, for the holding device 110 to hold or release the portable electronic devices 250. The user input devices 205 may, for example, include buttons, touch sensors, touch sensitive displays, cameras, microphones, and/or other passenger or gesture observing sensors. The input devices 205 may be dedicated for controlling the one or more holding devices 110, or may be configured to receive user inputs for controlling other vehicle functions (e.g., heating/cooling, entertainment, navigation, etc.) in addition to controlling the holding devices 110.

Referring to FIGS. 3-6, according to an exemplary embodiment, the holding device 110 and the portable electronic device 250 are cooperatively configured for the one or more magnets 220 (represented with broken lines in FIG. 5) of the holding device 110 to hold or otherwise secure the portable electronic device 250. More specifically, the one or more magnets 220 (represented by a dashed outline in FIG. 6) are selectively activated to draw one or more attraction plates 556 (represented with diagonal cross-hatching in FIG. 5) of the portable electronic device 250 to secure the portable electronic device 250 against the holding device 110.

During normal operation, the holding device 110 is configured to hold the portable electronic device 250 to prevent relative movement therebetween, which might otherwise be caused by standard vehicle dynamics (e.g., acceleration, braking, turning, vibrations, varied road surfaces, etc.). For example, using conservative multipliers, the one or more magnets 220 and the corresponding attraction plates 556 may be configured to secure the portable electronic device 250 up to approximately 1.5 G's in horizontal loading (e.g., resulting from acceleration, braking, and/or turning) and up to approximately 5 G's in vertical loading (e.g., due to vibrations and/or varied road surfaces). The force applied by the one or more magnets 220 to the attraction plates 556 holds the portable electronic device 250 against the holding device (or intermediate decorative surface of the vehicle 100), while friction prevents the portable electronic device 250 from sliding vertically and/or horizontally along the holding device 110.

As discussed in further detail below, the holding device 110 may be activated manually (e.g., by receiving a user input) and/or automatically when the portable electronic device 250 is determined to be in proximity of the holding device 110.

Furthermore, the holding device 110 and alternative embodiments thereof may be configured to accommodate portable electronic devices of different sizes. For example, the magnets 220 (and variations thereof) of the holding device 110 may be configured to provide sufficient strength for holding smaller and larger user devices (e.g., ranging between approximately 4 and 48 ounces for portable electronic device 110) by having sufficient strength to hold a larger device in various loading conditions. The holding device 110 may also be wide enough to provide sufficient bearing surface against the rear surfaces of portable electronic devices 250 having differing widths. In some embodiments, the holding device 110 may be able to recognize the type and/or size of the portable electronic device and, in response thereto, change the force by which the holding device 110 holds the portable electronic device 250.

The magnet 220 of the holding device 110 is selectively activated to hold the electronic device 250 against a forward surface 316 (e.g., outer, upright, mating surface, etc.) of the holding device 110. For example, a rearward surface 452 (e.g., rear or back surface) of the electronic device 250 is positioned against the forward surface 316 of the holding device 110, while a display 354 of the electronic device faces away from the forward surface 316 of the holding device 110 (e.g., to be visible and/or accessible to the passenger). The rearward surface 452 of the electronic device 250 may be formed by the electronic device 250 itself (e.g., an integrated housing or casing that contains internal components of the electronic device, 250). The forward surface 316 of the holding device 110 may be leather, suede, polymer, composite, a display screen, or other material.

Alternatively, the holding device 110 is positioned behind another component of the vehicle 100, such as a panel of the dashboard 102*a*, door 102*b*, seat back 103*a*, etc. (see, e.g., FIGS. 26-28 in which the holding device 110 is positioned under an upper panel 2603*e* of a console 102*d*). In these configurations, the rearward surface 452 of the portable electronic device 250 is instead held by the holding device 110 against the other surface of the panel or other intermediate component.

Figure 34:
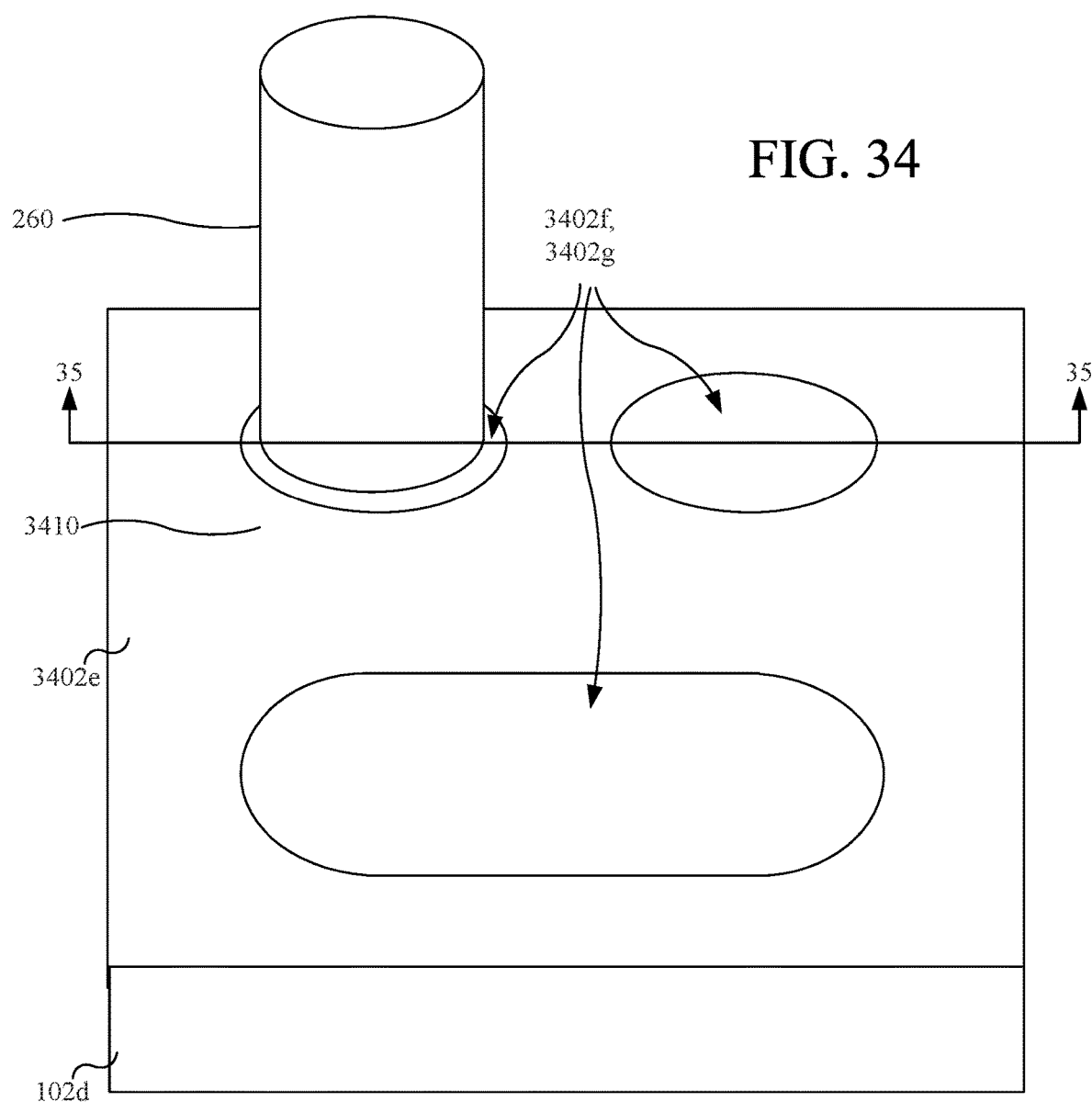
FIG. 34 is an upper perspective view of a console of a vehicle including multiple holding devices and an auxiliary device.
Figure 35:
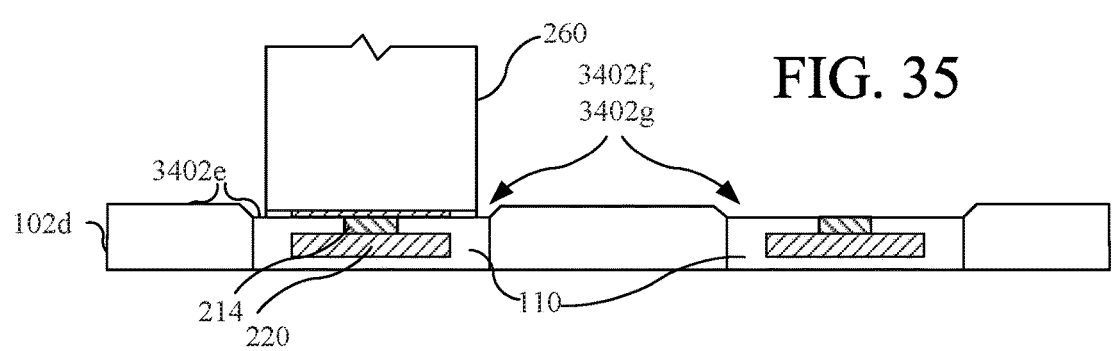
FIG. 35 is a cross-sectional view of the console, the holding device, and the auxiliary device taken along line 35-35 in FIG. 34.

Furthermore, while the forward surface 316 is depicted as being substantially planar, the forward surface 316, panel, or other surface may include an indentation (e.g., recess, depression, etc.) that has an outer periphery slightly larger than the portable electronic device 250 on two or more sides thereof, so as to receive and guide the portable electronic device 250 into a position to be held by the holding device 110 (see discussion associated with the embodiment shown in FIGS. 34-35).

The magnet 220 is fixedly positioned within a housing 318 of the holding device 110 (e.g., behind the forward surface 316 of the holding device 110), so as to be mechanically coupled to a structure of the vehicle 100. The housing 318, itself, is mounted to one of the vehicle structures (e.g., dashboard 102*a*, door 102*b*, roof 102*c*, seat back 103*a*, etc.). The magnets 220 may instead be movably mounted to the holding device 110, as is discussed below in further detail with respect to FIGS. 23-24, for example, to facilitate release of the portable electronic device 250.

Referring to FIGS. 5-6, the holding device 110 includes one or more magnets 220 that are cooperatively configured with the one or more attraction plates 556 (or permanent magnets) of the portable electronic device 250 to draw the electronic device 250 and hold the rearward surface 452 thereof against the forward surface 316 of the holding device 110. That is, the one or more magnets 220 are configured to selectively emit magnetic fields that attract the one or more attraction plates 556 toward the one or more magnets 220, so as to secure the portable electronic device 250 to the holding device 110. The one or more magnets 220 of the holding device may be configured in various manners, including type, number, location, size and/or strength, mounting, and operation thereof. Similarly, the one or more attraction plates 556 (or permanent magnets) of the portable electronic device 250 may be configured in various manners, including number, location, and size.

The one or more magnets 220 may include one or more electropermanent magnets, one or more electromagnets, or a combination thereof. In one embodiment, the one or more magnets 220 of the holding device 110 include one or more electropermanent magnets. As is known in the art, an electropermanent magnet selectively provides an external magnetic field and, advantageously, maintains the magnetic field without continually drawing electrical power (e.g., draining batteries less, continuing a hold without power, etc.). For example, an electropermanent magnet may be an assembly of two permanent magnets of which the direction of one of the magnets is switchable (e.g., by providing a current pulse of sufficient magnitude thereto) thereby causing the two magnets to either cooperatively produce an external magnetic field (e.g., the electropermanent magnet is on) or not by cooperatively concentrating their magnetic flux (i.e., the electropermanent magnet is off). Thus, when a voltage pulse of sufficient magnitude is applied thereto (e.g., from the electrical power system 206 of the vehicle 100 to the magnet 220), the electropermanent magnet switches in a binary manner between providing the external magnetic field of predetermined magnitude and orientation and not providing the external magnetic field. The magnet 220 is, thereby, selectively actuatable to hold or to not hold the portable electronic device 250 by providing the magnetic field or not, respectively. As discussed in further detail below, other embodiments of the holding device 110 may instead include magnets of varying type (e.g., one or more electro magnets alone or in combination with one or more electropermanent magnets), number, type, strength, and/or location.

One example of an electropermanent magnet is shown in FIG. 6A. The magnet 220 includes a plurality of first magnets 220a (e.g., AlNiCo magnets) and a plurality of second magnets 220b (e.g., NdFeB or neodymium magnets) that are arranged in pairs. In an off configuration, the magnetic field of each of the first magnets 220a offsets the magnetic field of the second magnet 220b to which it is paired or adjacent to, such that the magnet 220 does not emit an external magnetic field for attracting the attraction plate 556. To switch the magnet 220 to an on configuration, a pulse is applied to the first magnets 220a, which reverses the polarization of the first magnets 220a to be complementary to the second magnets 220b, such that the magnet 220 does emit the external magnetic field for attraction the attraction plate 556. As is shown in FIG. 6A, the first and second magnets 220a, 220b are wedge-shaped to collectively define the magnet 220 with an overall circular shape.

In another embodiment, the one or more magnets 220 of the holding device 110 include one or more electromagnets alone or in combination with one or more electropermanent magnets. As is known in the art, an electromagnet selectively provides a magnetic field that varies in strength and polarity relative to the magnitude and direction, respectively, of current applied to the electromagnet. While producing a magnetic field with magnets 220 that are electromagnets requires a continual draw of electrical power from the electrical power system 207, the one or more magnets 220 that are electromagnets allow the holding device 110 to modulate the strength and polarity of magnets 220.

The one or more attraction plates 556 are members that are made of or otherwise include steel or another ferromagnetic material. The attraction plate 556 may additionally include cutouts, windows, or other features that allow passage of other signals (e.g., for near field communication, inductive charging, etc.) to the portable electronic device 250 (e.g., from the holding device 110). As is shown in FIGS. 2-6, the attraction plate may be a single continuous member having a circular shape, but may be configured differently, including being provided in different numbers (e.g., having multiple members or attraction plates), or having different shapes formed individually or collectively (e.g., square, rectangle, ring, etc.). Further, instead of attraction plates, the portable electronic device 250 may instead include permanent magnets that are attracted by the one or more magnets 220 of the holding device 110, or magnetic components of the portable electronic device 250 (e.g., speakers, microphones, cameras, etc.) may be attracted by the magnets 220 of the holding device 110.

The holding device 110 is configured to hold the portable electronic device 250 in a predetermined location and a user-selectable angular orientation. The magnet 220 of the holding device 110 includes a single, circular magnet, while the portable electronic device 250 includes one single, circular attraction plate 556 of similar size. The magnetic field of the magnet 220 draws the attraction plate 556, so as to be substantially concentrically aligned with the magnet 220, which locates the portable electronic device 250 both vertically and horizontally into a predetermined position. The magnetic field of the magnet 220 may have substantially equal strength circumferentially about a central axis thereof (i.e., that is perpendicular to the forward surface 316 of the holding device 110), which allows the attraction plate 556 to be attracted and held in different angular orientations relative to the central axis. The force between the magnet 220 and the attraction plate 556, as well as the resultant friction between the rearward surface 452 of the portable electronic device 250 and the forward surface 316 of the holding device 110, hold portable electronic device 250 vertically, horizontally, and rotationally along, as well as perpendicularly against, the holding device 110. While the magnet 220 and the attraction plate 556 are described as being a singular magnet and attraction plate, a similar result may be provided by arranging multiple magnets 220 and/or multiple attraction plate 556 (or permanent magnets) in a similar circular arrangement.

It should be noted that various internal components of the portable electronic device 250 may be particularly susceptible to interference caused by the magnetic field of the magnet 220, such as a compass. Various strategies may be employed to reduce such interferences. For example, the attraction plate 556 may also include additional layers of material (e.g., shielding layers; not shown) that minimize disturbance by the magnetic field of the magnet 220 of internal components of the portable electronic devices 250. Instead or additionally, the holding device 110 may include additional magnets (not shown) positioned adjacent the magnets 220 used for holding the portable electronic device 250, such additional magnets being arranged to direct or otherwise influence the magnetic field of the magnets 220 to prevent interference with such internal components.

The one or more attraction plates 256 are positioned mechanically coupled to the portable electronic device 250, for example, by being provided within a housing of the portable electronic device 250. For example, a standard portable electronic device may be modified to form a variant that includes the one or more attraction plates 250. Instead, the attraction plates 256 may be located external to the device. For example, jumping ahead to FIG. 22, one or more attraction plates 2256 are positioned in or otherwise provided with a case 2258 (e.g., removable housing or member), which contains or is coupled to a standard electronic device 2250. Alternatively, the attraction plates 2256 may be provided component that is coupled to a rear surface of the standard portable electronic device 2250 (e.g., with a pressure sensitive or other adhesive) and which may include a decorative surface (e.g., microfiber, leather, suede, etc.). In a still further alternative, a housing of the portable electronic device 250, which contains various electronic components therein, may include or be formed from a suitable material that is attracted to the magnets 220 of the holding device 110 (e.g., the housing forms the attraction plate).

As discussed in further detail below, activation of the holding device 110 and its various alternative embodiments may be manual and/or automatic (e.g., based on determining a position, orientation, and/or trajectory of the portable electronic device 250 relative to the holding device 110).

Figure 7:
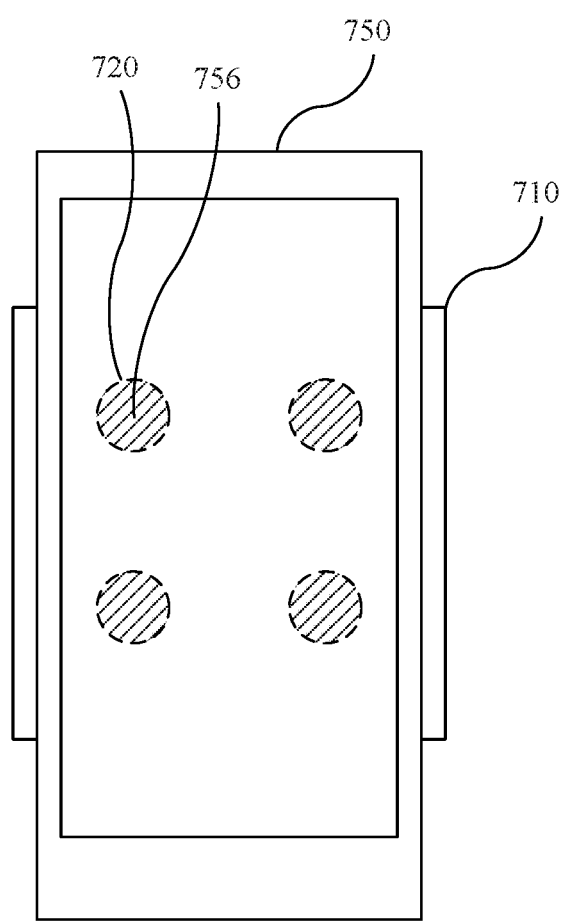
FIG. 7 is a front view of other embodiments of a holding device and an electronic device, which depicts hidden internal components of magnets in broken lines and attraction plates with diagonal cross-hatching.
Figure 8:
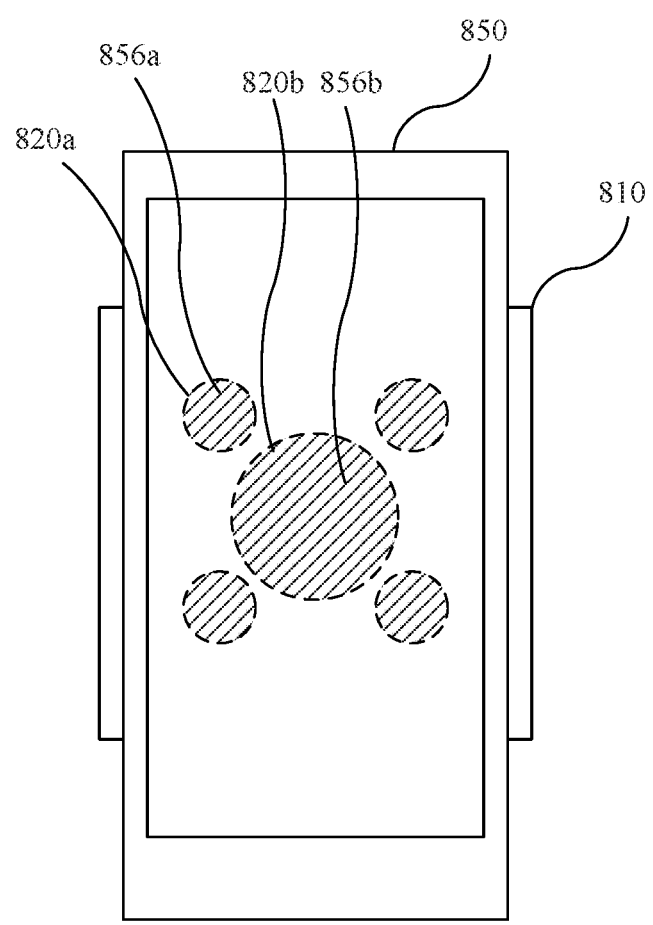
FIG. 8 is a front view of other embodiments of a holding device and an electronic device, which depicts hidden internal components of magnets in broken lines and attraction plates with diagonal cross-hatching.
Figure 9:
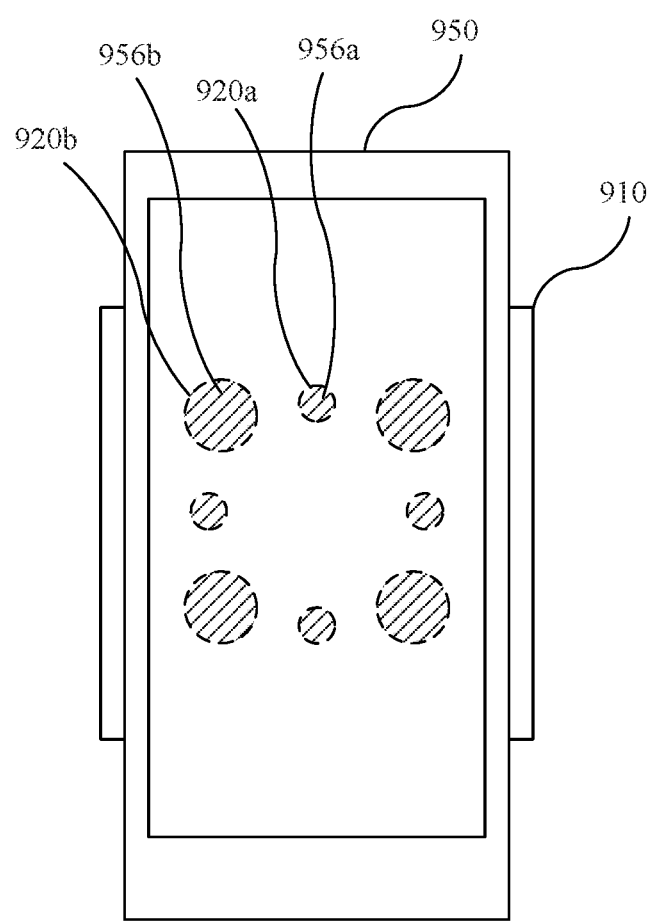
FIG. 9 is a front view of other embodiments of a holding device and an electronic device, which depicts hidden internal components of magnets in broken lines and attraction plates with diagonal cross-hatching.

Referring to FIGS. 7-9, other embodiments holding device 110 are configured to hold alternative embodiments of the portable electronic device 250 in one or more predefined angular orientations relative to the holding device 110.

Referring to the embodiment shown in FIG. 7, a holding device 710 includes a plurality of magnets 720 (e.g., four; represented by broken outlines), while a portable electronic device 750 includes a plurality of corresponding attraction plates 756 (e.g., four; represented by diagonal cross-hatching). By using multiple magnets 720 and multiple corresponding attraction plates 756, the portable electronic device 750 may be secured in one or more predefined angular orientations relative to the holding device 710. For example, as shown, the magnets 720 and the attraction plates 756 form a square shape, which allows for the portable electronic device to be secured in orientations that are 90 degrees apart (e.g., in landscape and portrait orientations). Alternatively, the magnets 720 and the attraction plates 756 may provide for a single orientation (e.g., only landscape or only portrait orientation), for example, by being arranged to form a rectangle or other elongated shape.

Referring to FIGS. 8-9, other embodiments of the holding device 110 and corresponding other embodiments of the portable electronic device 250 are cooperatively configured to help move the portable electronic devices into proper orientations.

Referring to the embodiment shown in FIG. 8, a holding device 810 includes a plurality of low strength magnets 820a and a higher strength magnet 820b (or magnet assembly) having greater size and/or strength than each of the low strength magnets 820a. The portable electronic device 850 includes a plurality of corresponding small attraction plates 856a and a single large attraction plate 856b that is larger than the small attraction plates 856a. The low strength magnets 820a and the corresponding small attraction plates 856a function to initially locate and/or orient the portable electronic device 950 relative to the holding device 910 with a lesser force but finer precision. The larger magnet 820b and the corresponding attraction plate 856b of greater size and/or strength function subsequently secure the portable electronic device 850 to the holding device 810 with a greater force. Alternative to the small attraction plates 856a, the electronic device 850 may instead include small permanent magnets, while the low strength magnets 820a are also small permanent magnets.

More specifically, as the portable electronic device 850 is initially moved to the holding device 110, the holding device 810 applies an initial force (e.g., first, low, locating, or orienting force) via the low strength magnets 820a, which aids the user in locating and/or orienting the portable electronic device 250 by drawing the small attraction plates 856a toward the low strength magnets 820a. This initial force may, for example, be sufficient to hold the portable electronic device 850 without significant loading thereto, while not aggressively pulling the portable electronic device 850 from the user's hand. Once the portable electronic device 850 is brought close to its proper location and/or orientation (e.g., by a combination of the initial force and the user's movements), a holding force (e.g., second, normal force), which is sufficient to hold the portable electronic device 850 during normal operating conditions, as described above. Instead of activating the lower strength magnets 820a and the higher strength magnet 820b in a stepped manner, as required for electropermanent magnets, the initial and holding forces may instead be provided by the magnets 220, 720 magnets of the other holding devices 110, 710 (or other variations) by modulating current to the magnets 220, 720, respectively, in a staged or progressive manner. The holding devices may also be configured to provide additional tactile feedback to the user by oscillating (e.g., quickly turning on/off or increasing/decreasing) the magnets 220, 720 and, thereby, providing a vibration sensation to the user holding the portable electronic device. Still further, the holding devices may be configured to increase to a peak and then decrease the magnetic force applied to the portable electronic device and, thereby, provide the user a sensation of a mechanical connection (e.g., a snap or button).

This increase of force may also be felt by the user to provide feedback that the portable electronic device 850 has been secured and/or provide a satisfying user experience of the portable electronic device 850 being sucked to the holding device 810. Other manners of providing active feedback to the user discussed in further detail below.

The holding device 810 may also be configured to change the force applied to the portable electronic device 850 as the portable electronic device 850 is removed. For example, upon receipt of a user input to release or remove the portable electronic device 850, the force may be reduced (e.g., from the holding force to the initial force), which may prevent inadvertent dropping of the portable electronic device 850, while also lessening the force required of the user to remove the portable electronic device 850. Various strategies for receiving the user input for removing the portable electronic device 850 are discussed in further detail below.

It should also be understood that the small and higher strength magnets 820a, 820b and corresponding small and large attraction plates 856a, 856b may be provide in lesser or greater quantities, the same quantity as each other, and/or in different locations and/or arrangements relative to each other. For example according to the embodiment shown in FIG. 9, a holding device 910 includes a plurality of low strength magnets 920a and a plurality of higher strength magnets 920b of lesser and greater sizes and/or strengths, respectively, while a portable electronic device 950 includes a plurality of corresponding attraction plates 956a, 956b. For example, as shown, the smaller magnets 920a and correspondingly small attraction plates 956a are arranged in a diamond pattern, between the larger magnets 920b and correspondingly large attraction plate 956b that are arranged in a square pattern. The low strength magnets 920a and the small attraction plates 956a function similar to the low strength magnets 820a and the small attraction plates 856a, as described above. The higher strength magnets 920b and the large attraction plates 956b cooperatively function similar to the higher strength magnet 820b and the large attraction plate 856b, as described above.

The magnets 920a and the corresponding attraction plates 956a of lesser size and/or strength function to initially locate and/or orient the portable electronic device 950 relative to the holding device 910 with a lesser force. The magnets 920b and the corresponding attraction plates of greater size and/or strength function subsequently secure the portable electronic device 950 to the holding device 910 with a greater force. Additional functionality of magnets 920a, 920b with different size and/or strength is discussed in further detail below. It should also be understood that the magnets 920a, 920b and corresponding attraction plates 956a, 956b may be provided in lesser or greater quantities, different quantities than each other, and/or in different locations or arrangements relative to each other.

Activation of the holding device 810 and the holding device 910, including the progressive operation of their respective magnets, may be based on determining the current location, angular orientation, and/or orientation of the portable electronic devices 850, 950 relative to the holding device, strategies for which are discussed in further detail below.

Referring to FIGS. 10-14, still further alternative embodiments of the holding device 110 and the portable electronic device 250 are cooperatively configured to provide for selective locating and/or orienting the portable electronic devices relative to the holding devices.

Figure 10:
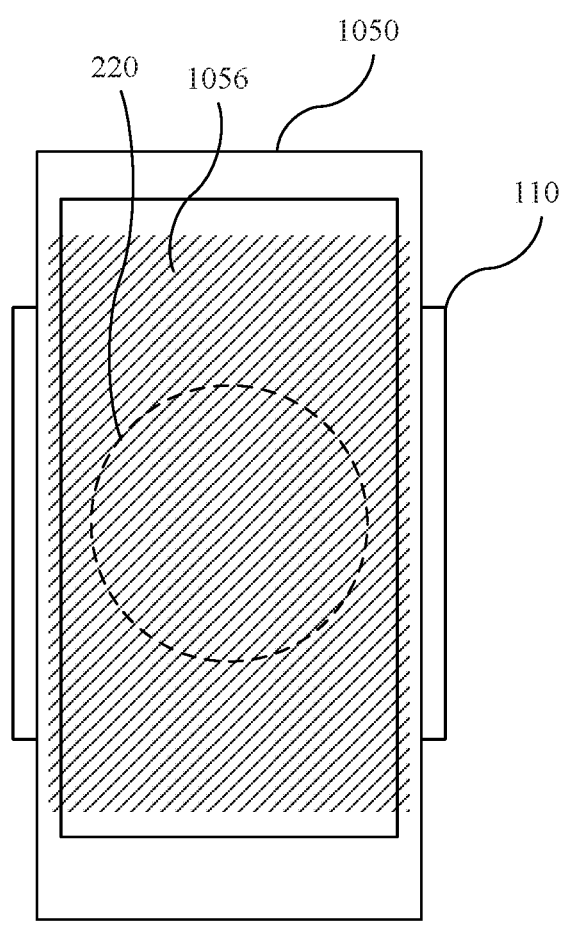
FIG. 10 a front view of the holding device shown in FIGS. 3-6 and another embodiment of an electronic device, which depicts hidden internal components of the magnet in broken lines and attraction plates with diagonal cross-hatching.

Referring to the embodiment shown in FIG. 10, in one example, the holding device 110 provides a single mounting location, while a variation of the portable electronic device 250 provides a range of locations at which it attaches to the single mounting location of the holding device 110. The holding device 110 is configured as described above, while a portable electronic device 1050 includes an attraction plate 1056 (represented by diagonal cross-hatching). The attraction plate 1056 has a width and/or a height that is larger than the magnet 220 (e.g., the diameter thereof), which allows varied positioning in horizontal and/or vertical directions of the portable electronic device 1050 relative to the holding device 110. For example, the attraction plate 1056 may extend a majority of a width and/or a length of the portable electronic device 1050 (e.g., >75%).

Referring to FIGS. 11-14, other alternative embodiments of the holding device 110 use a plurality of magnets that are arranged in an array or matrix to provide multiple mounting at which the user may selectively secure the portable electronic devices. As is evident from the embodiments disclosed below, increasing the spatial density of selectively activated magnets can increase the granularity for the user to choose a position in which the portable electronic device is to be held. Selective activation of the magnets for the embodiments below may, for example, be performed according to the strategies discussed below for determining the current location and/or angular orientation of the portable electronic devices relative to the holding devices.

Figure 11:
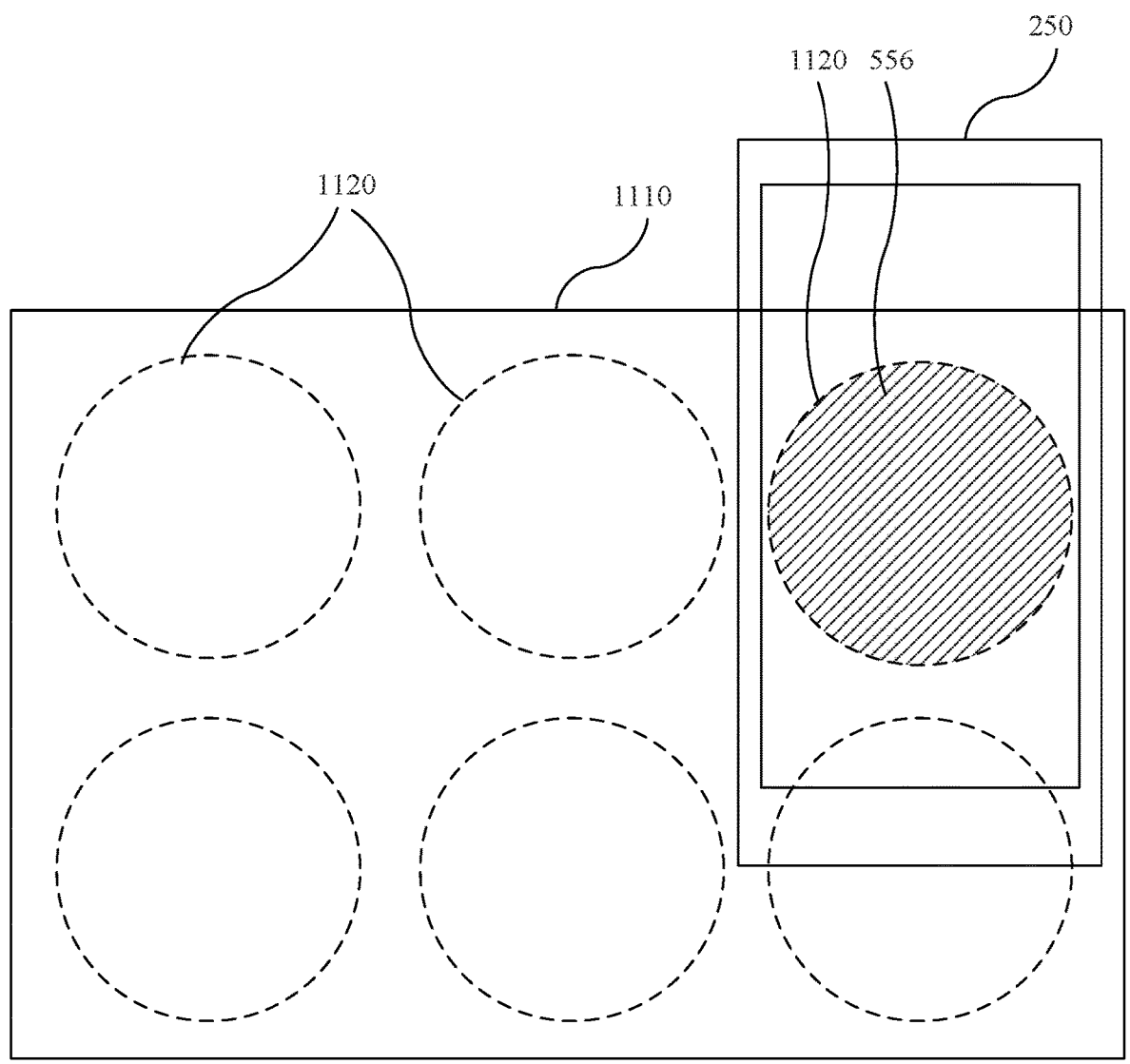
FIG. 11 a front view of another embodiment of a holding device and the electronic device shown in FIGS. 3-6, which depicts hidden internal components of magnets in broken lines and the attraction plate with diagonal cross-hatching.

Referring to the embodiment shown in FIG. 11, a holding device 1110 is configured to hold the portable electronic device 250 at multiple, discrete locations. The holding device 1110 is configured similar to the holding device 110 but instead includes multiple magnets 1120 (e.g., an array or matrix of magnets; represented by dashed outlines) that are spaced about in one axis (e.g., vertically or horizontally) or two axes (as shown) to provided multiple discrete holding positions (e.g., six as shown) at which the portable electronic device 250 may be secured to the holding device 1110. Each magnet 1120 is cooperatively configured with the attraction plate 556 of the portable electronic device 250, so as to hold the portable electronic device 250 in the manner described previously. Still further variations of the holding device 1110 may simply repeat the securing strategies at different locations in a single holding device (e.g., using those magnet and attraction plate strategies discussed with reference to FIGS. 2-10). By providing multiple mounting locations, the holding device 1110 may additionally be configured to hold multiple portable electronic devices 250 simultaneously.

Figure 12:
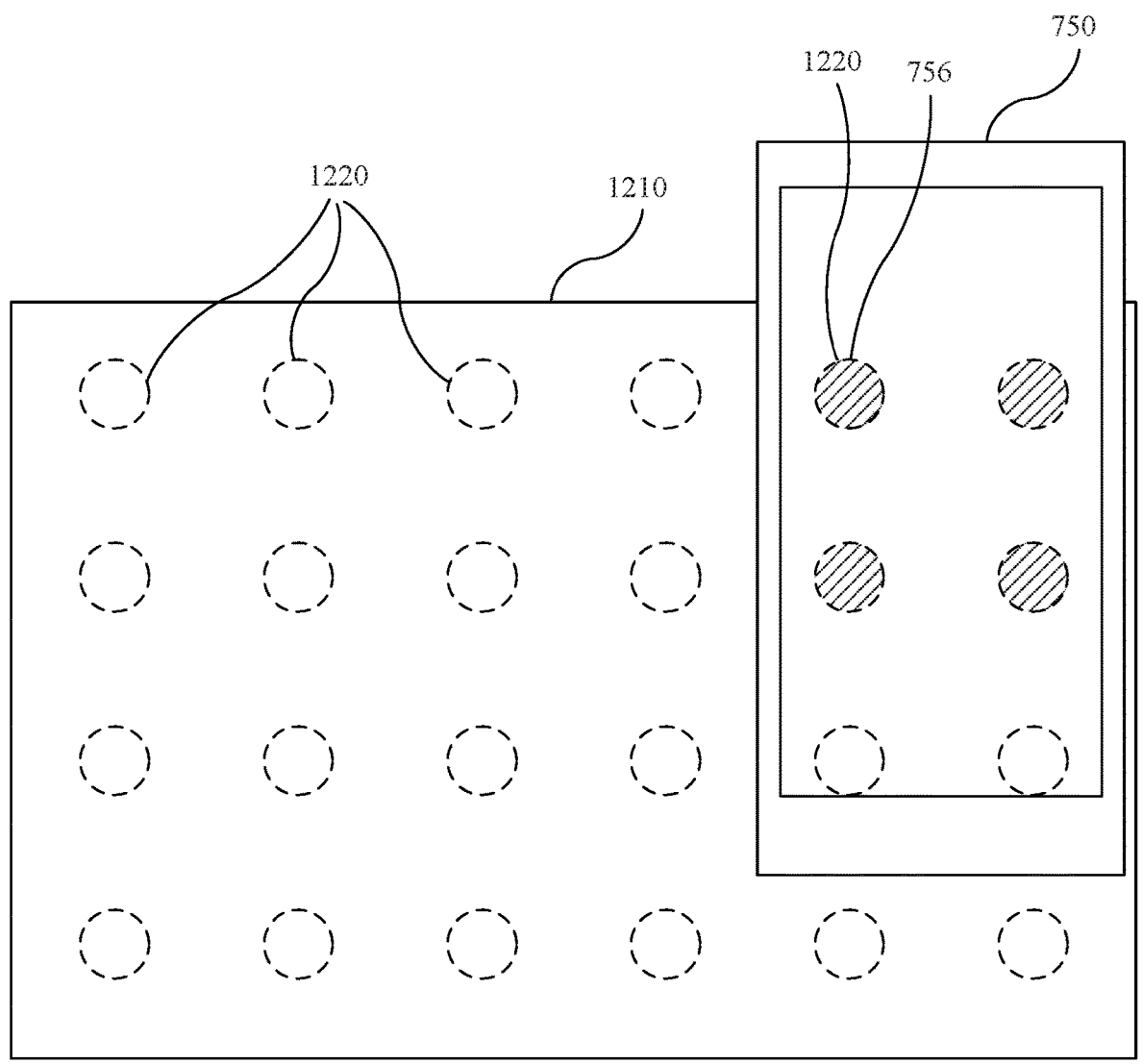
FIG. 12 a front view of another embodiment of a holding device and the electronic device shown in FIG. 7, which depicts hidden internal components of magnets in broken lines and the attraction plates with diagonal cross-hatching.
Figure 13:
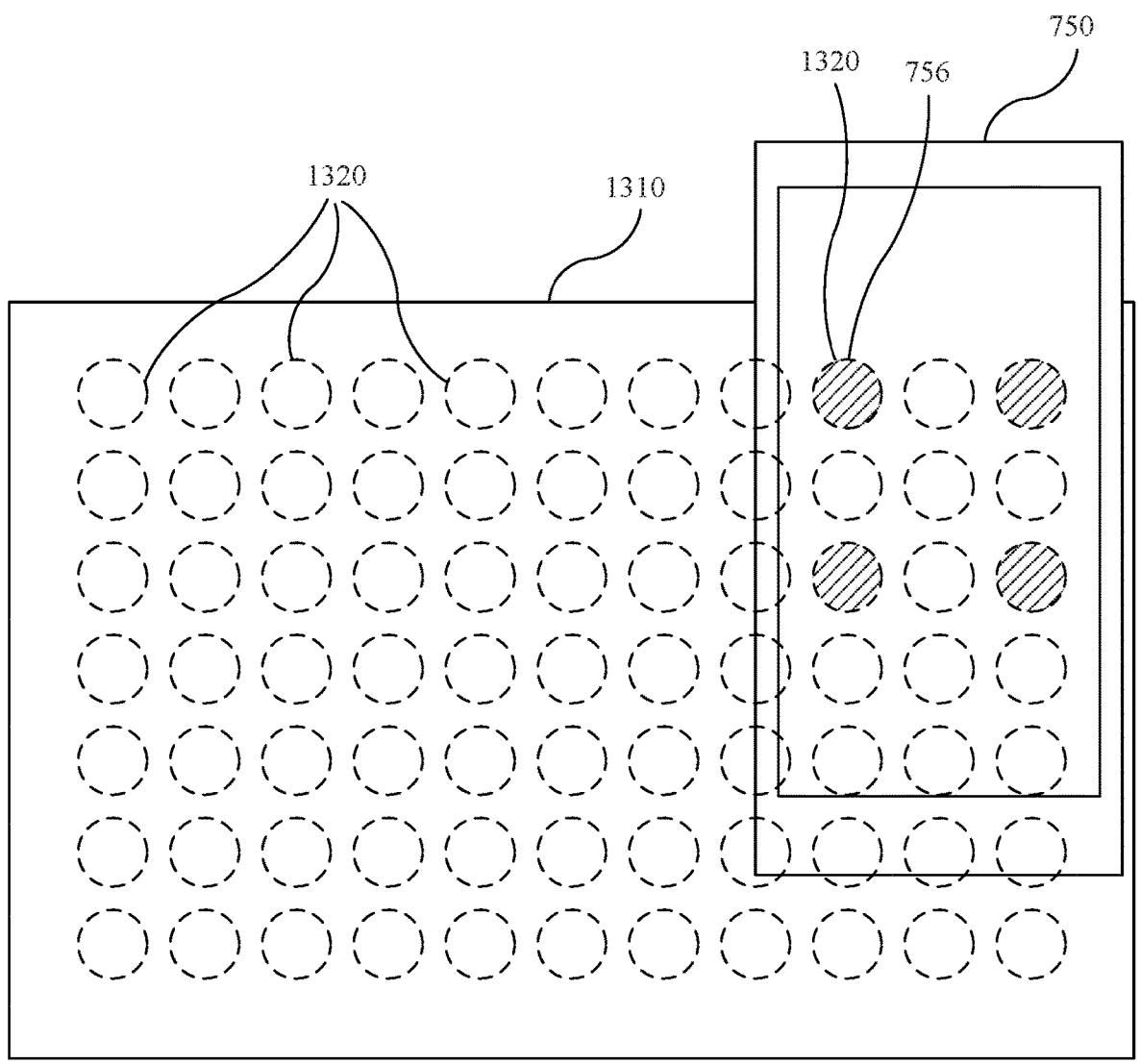
FIG. 13 a front view of another embodiment of a holding device and the electronic device shown in FIG. 7, which depicts hidden internal components of magnets in broken lines and the attraction plates with diagonal cross-hatching.
Figure 14:
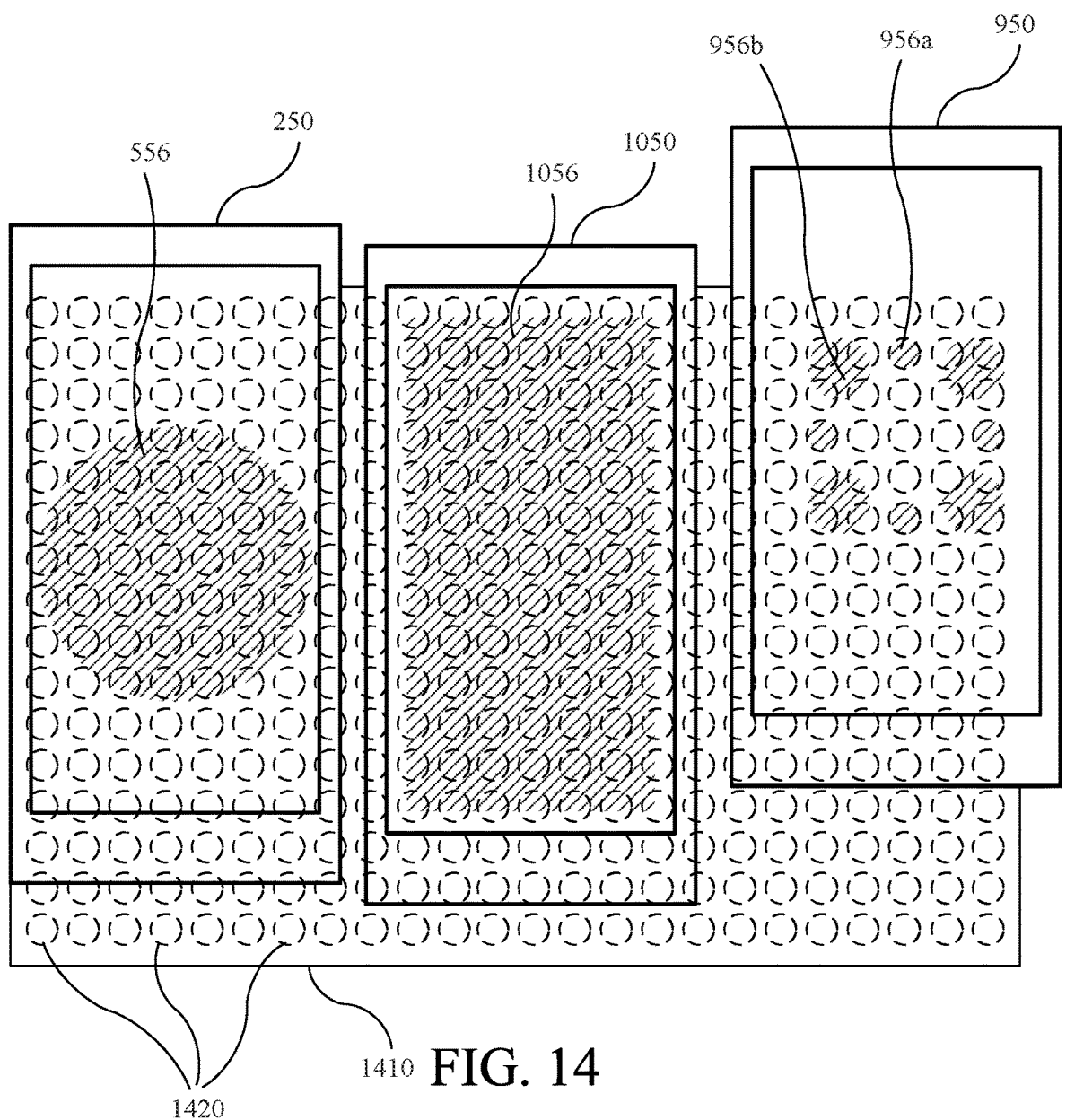
FIG. 14 a front view of another embodiment of a holding device and the electronic devices shown in FIGS. 3-6, 9, and 10, which depicts hidden internal components of magnets in broken lines and the attraction plates with diagonal cross-hatching.

Referring to FIGS. 12-14, other variations of the holding device 1110 include pluralities of magnets (e.g., arrays or matrices of magnets) of which overlapping subgroups of those magnets may be activated to hold the portable electronic device 250 (or variations thereof). Stated differently, a holding device includes a plurality of magnets that are spaced apart to form a matrix of magnets. The portable electronic device can be held in a first position by a first subset of the magnets and in a second position by a second subset of the magnets that includes some but not all of the magnets of the first subset of the magnets. In each of these embodiments, the holding devices may be configured to not activate their respective magnets if an insufficient number of attraction plates are aligned therewith (e.g., if the portable electronic device is biased upward and/or sideward of edges of the holding device, such that only a subset and/or subportions of the attraction plates are aligned with the magnets of the holding device).

Referring to the embodiment shown in FIG. 12, a holding device 1210 includes a plurality of magnets 1220 of which overlapping subgroups of the magnets 1220 may be activated to hold the portable electronic device 750 at multiple different positions. The magnets 1220 are spaced apart (e.g., in two axes as shown) distances and directions that correspond to spacing of the attraction plates 756 of the portable electronic device 750. The magnets 1220 are configured to be activated with any grouping (e.g., subgroup or subset) of the magnets that are adjacent to each other to provide multiple positions at which the portable electronic device 750 may be held (e.g., fifteen positions as shown). As a result, each magnet 1220 may be activated to hold the portable electronic device 750 in each of one or more positions (e.g., one position for each corner magnet, two positions for each edge magnet, and four positions for each interior magnet 1220). Still further variations of the holding device 1210 may implement the alignment and orientation strategies discussed with reference to FIGS. 8-9 (e.g., activating magnets in a staged or gradual manner and/or by including magnets of varying strength).

To provide even further granularity for the user to position the portable electronic devices 250, 750 (or variations thereof), magnets may be provided at increasing spatial density. Referring to FIG. 13, a holding device 1310 includes a plurality of magnets 1320 that are provided at four times the density of the magnets 1220 of the holding device 1210 (e.g., resulting in forty-five mounting positions instead of fifteen). Still further variations of the holding device 1210 may implement the alignment and orientation strategies discussed with reference to FIGS. 8-9 (e.g., activating magnets in a staged or gradual manner and/or including magnets of varying strength).

Referring to the embodiment shown in FIG. 14, a holding device 1410 employs a matrix of magnets 1420, while various portable electronic devices include one or more attraction plates that are each proximal (e.g., overlap) and drawn to more than one of the magnets. The holding device 1410 includes a plurality of magnets 1420 arranged in a matrix at a greater density than the magnets 1320 of the holding device 1310. The portable electronic devices 250, 950, 1050 are held by those magnets 1420 that are in proximity to (e.g., behind or overlapped by) the attraction plates 556, 956a and 956b, and 1056 of the respective portable electronic devices 250, 950, 1050. As is illustrated with the portable electronic device 950, the various alignment techniques described above with respect to FIGS. 8-9 may be implemented (e.g., by activating magnets in a staged or gradual manner).

Further variations and combinations of the above-described strategies for locating, orienting, and securing the various portable electronic devices to the holding devices. In one additional example, referring to FIG. 15, which is discussed in further detail below, a portable electronic device 1550 includes a single attraction plate 1556 (e.g., similar to the singular attraction plates 256, 1056) that is associated with multiple magnets. The periphery of the attraction plate 1556 corresponds to an outer periphery of low strength magnets 1520a and/or higher strength magnets 1520b (e.g., similar to the lower strength and higher strength magnets 920a, 920b), which function to location, orient, and secure the portable electronic device 1250. The holding device 1510 additionally includes a high strength magnet 1520c, which may be activated during high G scenarios, as discussed in further detail below.

The various embodiments of the holding device may implement additional functionality pertaining to activation, user feedback, removal, further securing during detected events, device security, and/or by having movable magnets.

As referenced above, activation and/or control of the holding devices may be manual or automatic. Manual activation of the holding device 110 and alternative embodiments may occur upon receipt or observation of a user input by sensors of at least one of the holding device 110, the portable electronic device 250, and/or the vehicle sensors 206. The various user inputs may, for example, include pressing one or more physical or virtual buttons, observing defined movement gestures of the user, receiving defined touch gestures, receiving audible commands, etc.

Automatic activation of the holding device 110 may, for example, be based on natural behaviors associated with the user intending the portable electronic device 250 to be held, such as the user moving toward the holding device 110. For example, the holding device 110 may be activated when the portable electronic device 250 is determined to be in close proximity to the holding device 110, in proper angular orientation relative to the holding device 110, and/or have a trajectory moving toward the holding device 110.

For example, activation and control the holding device 110 and its various alternative embodiments may occur automatically based on determining the current location, angular orientation, and/or trajectory of the portable electronic device 250 and its various alternative embodiments. Determination of the position, angular orientation, and/or trajectory may be performed using various sensors of the various embodiments of the holding device, the portable electronic device, and/or the vehicle 100. For simplicity, the strategies discussed below are made reference to the holding device 810 and the portable electronic device 850, but are applicable to the various other embodiments of holding devices and portable electronic devices disclosed herein.

Various conventional sensors (e.g., cameras, accelerometers, etc.) of the portable electronic device 250 may be used to determine the position, orientation, and/or trajectory of the portable electronic device 250. For example, a rear-facing camera of the portable electronic device 250 may be used to visually recognize its location and/or orientation relative to the holding device 810 (e.g., based on structures or indicia of the vehicle 100). An accelerometer and/or compass of the portable electronic device 850 may also be used to determine the orientation of the portable electronic device 850 relative to the holding device 810, for example, by determining the direction (e.g., in three axes) in which the display of the portable electronic device 850 faces and/or determining the direction in which the forward surface of the holding device 810 faces. Hall effect sensors of the portable electronic device 850 may also detect magnetic fields produced by the holding device 810. Control and/or data signals may then be sent by the portable electronic device 850 to the holding device 810 in accordance with the one or more aforementioned sensors.

Instead of or in addition to using sensors of the portable electronic device 850, one or more sensors 214 of the holding device 810 may recognize the position, orientation, and/or trajectory of the portable electronic device 850. For example, the sensors 214 may include an optical sensor (e.g., retroreflective sensor, camera, etc.) that optically observes and recognizes the position and/or orientation of the portable electronic device 250 (e.g., structures and/or other visual indicia of the portable electronic device 850). The sensors 214 may instead include one or more Hall effect sensors that recognize the position and/or orientation of the portable electronic device 850 by detecting a unique magnetic signature of the portable electronic device 850 (e.g., produced by magnetic field-producing components of the portable electronic device 850, such as speakers, microphones, cameras, etc.), and/or detect variations in the magnetic field of the magnets 820 caused by movement of the attraction plates 856. The sensors 214 may include other types of sensors, such as proximity sensors, or RFID sensors.

Instead or in addition to using sensors of the holding device 810 or the portable electronic device 850, the one or more sensors 206 of the vehicle 100 may be used to determine the position, orientation, and/or trajectory of the portable electronic device 250. For example, the one or more sensors 206 of the vehicle 100 may include a camera that observes and recognizes the location and/or orientation of the portable electronic device 250, or movements of the user.

Feedback may be provided to the user when activating the holding device 110 and/or locating, orienting, and/or securing the portable electronic device 250 to the holding device 110. Feedback may be tactile, visual, and/or audible.

Tactile feedback may include haptic feedback, such as a momentary and/or sustained vibration of the portable electronic device 250, that is produced during the various stages of operating the holding device (e.g., when the holding device 110 is activated, and/or when the portable electronic device 250 is located, oriented, and or secured to the holding device 110). This haptic feedback may vary based on the operating stage (e.g., by duration and/or intensity) and/or proximity of the portable electronic device 250 to the holding device 110.

Tactile feedback may instead or additionally be provided by the magnetic force. For example, the magnetic force pulling the portable electronic device 250 may be increased in a manner noticeable to the user to indicate the portable electronic device 250 is secure (see, e.g., discussion regarding the embodiments disclosed in FIGS. 8 and 9).

Figure 16:
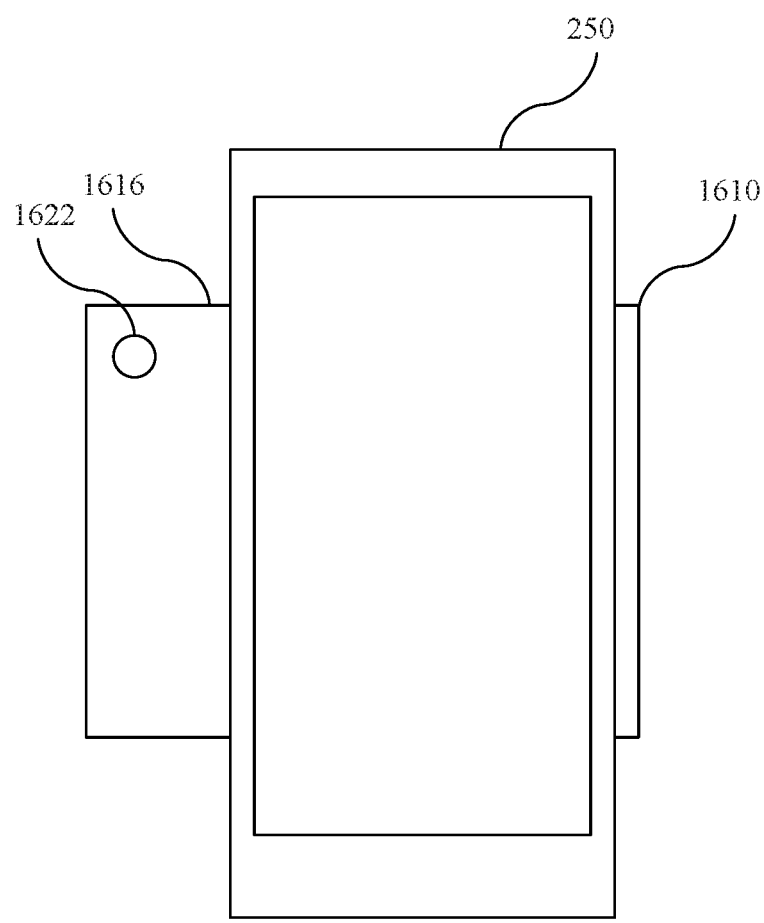
FIG. 16 a front view of another embodiment of a holding device and the electronic device shown in FIGS. 3-6.
Figure 17:
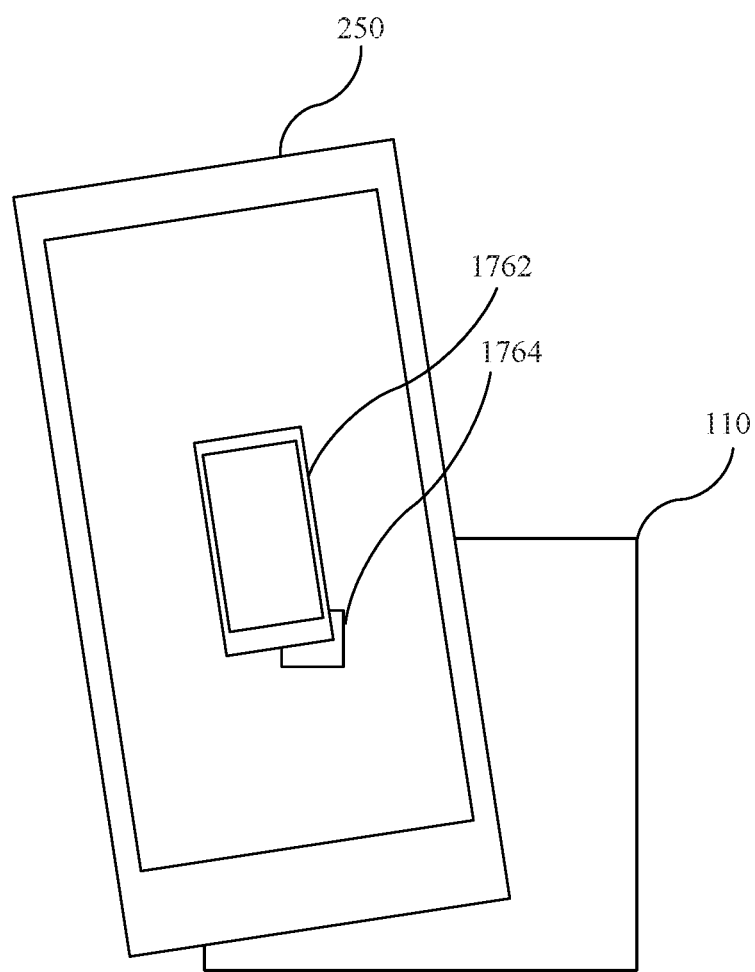
FIG. 17 is a front view of the holding device and the electronic device shown in FIGS. 3-6 with graphics on a display of the portable electronic device.

Referring to FIGS. 16-17, visual indicators and/or feedback may be provided by the different embodiments of holding device 110, the portable electronic device 250, and/or the vehicle 100. Feedback may be positive feedback to indicate that the portable electronic device 250 is being properly secured (e.g., located, oriented, and/or held), or may be negative feedback to indicate that the portable electronic device 250 is not being properly secured or cannot be secured (e.g., due to incompatibility or being unauthorized).

Referring to the embodiment shown in FIG. 16, a holding device 1610 includes one or more lights 1622 that are illuminated during one or more of coupling stages of activating the holding device 1610, locating and orienting the portable electronic device 250, securing the portable electronic device 250, and/or releasing the portable electronic device 250. For example, the light 1622 may illuminate upon occurrence of one or more of the coupling, change colors upon occurrence of one or more of the coupling stages (e.g., illuminate as yellow when the holding device 1610 is activated, and turn green when the portable electronic device 250 is secured), or change brightness as the portable electronic device 250 is moved closer the holding position of the holding device 1610. The light 1622 may, for example, include a small indicator light 1622 (as shown), or illuminate a large region (e.g., the forward surface 1616) of the holding device 1610 from behind the portable electronic device 250.

Referring to the embodiment shown in FIG. 17, the portable electronic device 250 provides a visual guide (e.g., dynamic graphical representation) on the display 354 thereof. More particularly, the visual guide includes a first reference graphic 1762 and a second reference graphic 1764 that represent the positions and/or orientations of the portable electronic device 250 and the holding device 110, relative to each other, as may be determined according to any of the locating and/or orienting strategies discussed above with respect to the embodiment shown in FIG. 8.

The first and second reference graphics 1762, 1764 graphically represent the relative vertical and horizontal position of the portable electronic device 250 relative to the holding device 110, respectively. For example, the first reference graphic 1762 is positioned upward and leftward of the second reference graphic 1764, just as the portable electronic device 250 is positioned upward and leftward of the holding device 110 (or the holding location thereof).

The first and/or second reference graphics 1762, 1764 may additionally graphically represent the relative spacing between the portable electronic device 250 relative to the holding device 110. For example, as the spacing is decreased, the second reference graphic 1764 may increase in size.

The first and/or second reference graphics 1762, 1764 may still further graphically represent the angular orientation of the portable electronic device 250 relative to the holding device 110. For example, the first reference graphics 1762 is tilted leftward relative to the second reference graphic 1764, just as the portable electronic device 250 is tilted leftward relative to the holding device 110.

The portable electronic device 250 may be configured to provide other visual indicators and/or feedback, such as changing the color, hue, or brightness of the display 354 as the portable electronic device 250 is moved into closer proximity to activate and/or be held by the holding device 110. The portable electronic device 250 may instead, or additionally, display different graphics or patterns indicating the location and/or angular orientation of the portable electronic device 250 relative to the holding device 110. In a still further embodiment, when the portable electronic device 250 is secured, the portable electronic device 250 displays visual media (e.g., picture, video, or other images) that is also displayed by another display of the vehicle.

Audible feedback may instead or additionally be provided by the holding device 110, portable electronic device 250, and/or the vehicle 100. Audible feedback may include verbal instructions and/or statuses, as well as non-verbal indicators, such as a chime (e.g., to indicate that the portable electronic device 250 is secured to the holding device 110.

Release of the various embodiments of the portable electronic device 250 may be triggered, indicated, and operated in various manners.

Release by the holding device 110 may be initiated manually using dedicated inputs, as described above for activating the holding device 110.

Release may also be initiated by actions that a user might otherwise perform to physically remove or grasp the portable electronic device 250. In the various strategies described below, release or removal is initiated by both determining contact with the portable electronic device 250 and determining or confirming intent by the user to grasp the portable electronic device 250. Intent of the user may be determined in various manners, such as by contact to opposing sides of the portable electronic device, contact meeting a certain threshold magnitude, certain movements of the portable electronic device 250 or the user (e.g., using various sensors, such as cameras of the portable electronic device 250 or the vehicle 100).

In one example, physical inputs of the portable electronic device 250 may be arranged in positions at which the user might normally engage the portable electronic device 250 to grasp the portable electronic device 250 (e.g., opposing front/back or left/right sides thereof). The display 354 and the rear surface 452 of the portable electronic device 250 are configured as discrete touch sensors (e.g., as capacitive sensors). Thus, when the user engages the front and back of the portable electronic device 250, the sensors of the display 354 and the rear surface 452 both simultaneously register contact, which triggers release of the portable electronic device 250 by the holding device 110 (e.g., by sending signals to the holding device 110 via the network 208 or directly via near field communication). Contact with the display 354 and the rear surface 452 may thereafter be maintained to hold the portable electronic device 250.

The display 354 may also be configured to detect varied forces applied thereto, such that release by the holding device 110 may be prevented below certain force thresholds and allowed above those thresholds. The rear surface 452 of the portable electronic device 250 may also be configured to detect varied magnitudes of capacitance that may correspond to a user grabbing the portable electronic device 250 (e.g., increasing capacitance with more fingers touching the rear surface 452), such that release by the holding device 110 may be prevented below certain capacitance thresholds. In this manner, removal of the portable electronic device 250 is initiated by determining both contact of the user with the portable electronic device 250 and intent of the user to remove the device (e.g., by determining contact on opposing sides and/or by the force or pressure of the contact exceeding a certain threshold).

In another example, pressing certain combinations of buttons of the portable electronic device 250 may initiate release by the holding device 110. For example, the portable electronic device 250 may include physical buttons or touch sensors on peripheral edges on opposite lateral sides (e.g., a volume button and a camera shutter button). By pressing the two buttons or touch sensors, the portable electronic device 250 triggers the holding device 110 to release the portable electronic device 250. Contact with the buttons or sensors may thereafter be maintained to hold the portable electronic device 250. In this manner, removal of the portable electronic device 250 is also initiated by determining both contact of the user with the portable electronic device 250 and intent of the user to remove the device (e.g., by contacting buttons or sensors on opposing edges of the portable electronic device 250).

In a still further example, rotation of the portable electronic device 250 may initiate release by the holding device 110. More particularly, the user may rotate the portable electronic device 250 in plane with the forward surface 316 of the holding device 110 (i.e., about the axis perpendicular to the forward surface 316) to initiate release by the holding device 110. Such rotation may be detected, for example, using sensors of the portable electronic device 250 (e.g., an accelerometer, Hall effect sensors, the camera, etc.), using the sensors 214 of the holding device 110 (e.g., Hall effect sensors, etc.), and/or the vehicle sensors 206 (e.g., a camera). Intended rotation for removal may also be confirmed using other sensors of the portable electronic device 250 (e.g., with the display 354 and/or the rear surface 452 functioning as touch sensors) and/or the vehicle sensors 206 (e.g., a camera recognizing movements of the user).

Advantageously, unintended rotation about the axis perpendicular to the forward surface 316 is unlikely to occur during normal operation of the vehicle 100. Loading from vehicle dynamics may act on the portable electronic device 250 in translational directions in three normal axes and rotationally about axes parallel to the forward surface 316 of the holding device 110 (e.g., if a more significant portion of the portable electronic device 250 is positioned above/below or left/right of the surface against which the portable electronic device 250 is held by the holding device 110). Since portable electronic devices 250 tend to have generally even weight distribution (e.g., left/right and top/bottom for a centrally located center of gravity), loading from vehicle dynamic event is less likely to cause rotation of the portable electronic device 250 about the axis normal to the forward surface 316 of the holding device 110. Thus, rotation about the axis normal to the forward surface 316 may be uniquely less affected than the five other degrees of freedom, thereby allowing rotation thereabout to be attributable to intended movement by the user and, thereby, be utilized as an input for initiating release thereof by the holding device 110.

Release may be triggered in various other manners, such as by detecting separation of the portable electronic device 250 from the holding device 110 in combination with another input (e.g., capacitive and/or force sensing by the display 354 of the rear surface 452 of the portable electronic device 250). In still further examples, release may be triggered or validated by the various user inputs described above with respect to activating the holding device 110 (e.g., buttons, gestures, movements, etc.). Furthermore, any of the above described strategies for triggering release may be used in combination with each other, for example, to confirm the user's intent to take possession of the device.

Release may be operated in various manners. For example, upon triggering the release, the holding device 110 may remove all force applied to the portable electronic device 250 by decreasing (inclusive of terminating) the magnetic field provided by the one or more magnets 220 of the holding device 110 (e.g., by switching electropermanent magnets, reducing current to electromagnets, or stopping current to electromagnets).

Release may instead be operated in a staged manner, as was described above with respect to the embodiment shown in FIG. 8. Upon triggering release, the holding device 110 reduces the force applied to the portable electronic device 250, while maintaining sufficient force to hold the portable electronic device 250 during low G events and to prevent inadvertent dropping of the portable electronic device 250. For example, the electropermanent magnets may be switched and/or current reduced to any electromagnets. After the force is reduced, the user may grasp and remove the portable electronic device 250 with less resistance.

Release may also be indicated in various manners. For example, the haptic, visual, and/or audible feedback may be provided in the manners described above with respect to activating the holding device 10.

The holding device 110 may also be configured to prevent unauthorized release of the portable electronic device 250, while security measures may be implemented if unauthorized release does occur. For example, release may be authorized, for example, by identifying the user, such as using fingerprint recognition, facial recognition, and/or voice recognition (e.g., using appropriate sensors or cameras of the portable electronic device 250, the holding device 110, and/or the vehicle 100). Instead or additionally, release may be authorized by providing a predefined input from the user, such as a user defined passcode, gesture sequence, voice command, etc.

If unauthorized release occurs, such as by forcible removal of the portable electronic device 250, various security measures may be taken, such as sending an alert to another device of the user or another person from the portable electronic device 250 and/or the vehicle 100. Instead, or additionally, the portable electronic device 250 may be further secured (e.g., requiring additional verification for access) and/or have data deleted therefrom.

The holding device 110 (and variations thereof) may be configured to further secure the portable electronic device 250 upon detection of certain circumstances. For example, the holding device 110 may apply additional magnetic force and/or utilize mechanical devices when relative movement of the portable electronic device 250 is detected and/or upon prediction or detection of high acceleration events. This allows use of a smaller nominal holding force as compared to holding forces applied in response to or in anticipation of high acceleration, which reduces the necessary size and energy consumption of the device 250.

Relative movement of the portable electronic device 250 may be detected by the holding device 110, the portable electronic device 250, and/or the sensors 206 of the vehicle 100. Such relative movement may be caused by the user (e.g., inadvertent bumping of the portable electronic device 250), vehicle dynamics, etc.

The portable electronic device 250 may detect relative movement, for example, optically (e.g., with a rear facing camera), magnetically (e.g., using Hall effect sensors that detect variations in the magnetic field applied by the magnets 220), and/or using accelerometers (e.g., by measuring acceleration of the portable electronic device 250 that differs from that measured by an accelerometer of the vehicle 250).

The holding device 110 may also detect movement of the portable electronic device 250. For example, the one or more sensors 214 of the holding device 110 includes Hall effect sensors that changes in the magnetic field produced by the one or more magnets 220 and/or the magnetic components of the portable electronic device 250, which suggest movement of the portable electronic device 250 relative to the sensors 206. The one or more sensors 214 of the holding device 110 may instead or additionally include an optical sensor (e.g., retroreflective sensor, camera, etc.) that may observe minor relative movements of the portable electronic device 250. Relative movement may also be detected by various circuitry of the holding device 110, such as a changes in power draw by the magnets 220 (e.g., if electromagnets) and/or changes in power draw (e.g., frequency) by a telemetry coil of the holding device 110 that is charging the portable electronic device 250.

The holding device 110, the portable electronic device 250, and/or the sensors 206 of the vehicle are configured to detect and/or predict high G events. For example, high G events may be detected or predicted using vehicle sensors 206 that observe the external environment of the vehicle 100 (e.g., cameras, radar, LIDAR, etc. for detecting upcoming road conditions or an upcoming impact), using accelerometers of the vehicle 100 and/or the portable electronic device 250 (e.g., detecting an impact as it occurs), and/or using various vehicle controllers 204 (e.g., an airbag ECU).

The holding device 110 (and variations thereof) may be configured to increase the magnetic force applied to the portable electronic device 250. It should be noted that for the magnetic force to increase, the attraction plate 556 must not be saturated by the magnetic field of the magnets 220. Thus, the attraction plate 556 is designed with margin, so as to not be saturated by the magnetic field during normal usage.

In one example, the one or more magnets 220 of the holding device are electromagnets. Upon detecting relative movement of the portable electronic device 250, increased current is supplied to the magnets 220, which strengthens the magnetic field produced thereby to apply a greater holding force to the attraction plate 556.

Figure 15:
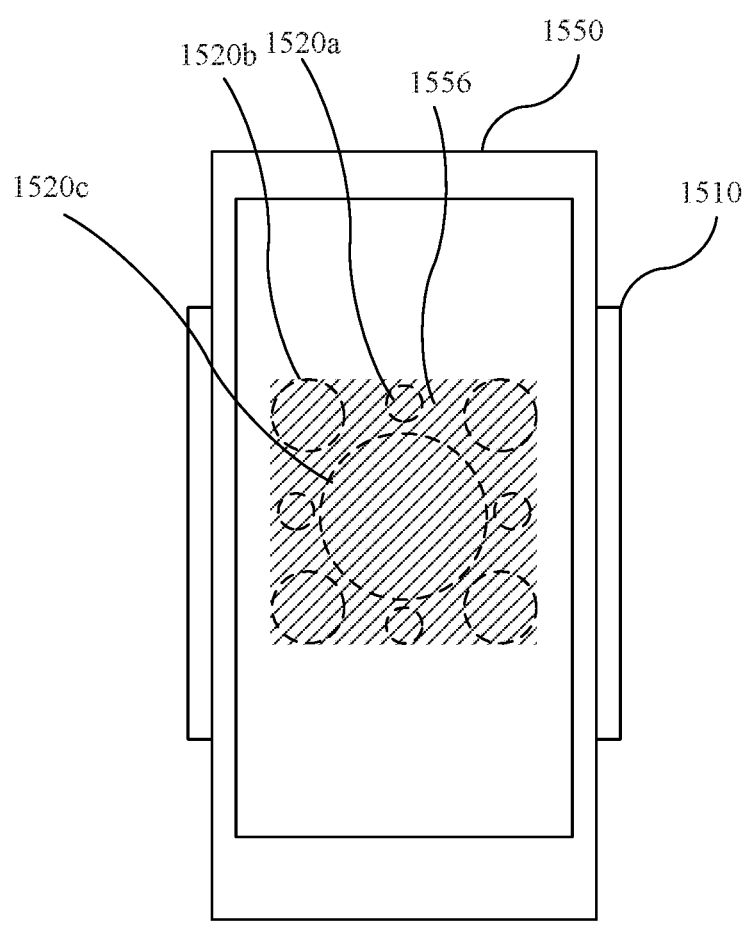
FIG. 15 a front view of other embodiments of a holding device and an electronic device, which depicts hidden internal components of magnets in broken lines and an attraction plate with diagonal cross-hatching.

In other examples, additional magnets (e.g., electropermanent magnets or electromagnets) are activated to increase the holding force applied to the portable electronic device 250. For example, in the embodiments shown in FIGS. 13-14, additional ones of the magnets 1320, 1420 may be activated. Alternatively, as is shown in FIG. 15, the holding device 1510 includes a high strength magnet 1520c, which is activated only when increased holding force is required.

The holding device 110 and/or the vehicle 100 may instead or additionally use one or more mechanical devices for further preventing movement of the portable electronic device 250.

Figure 18:
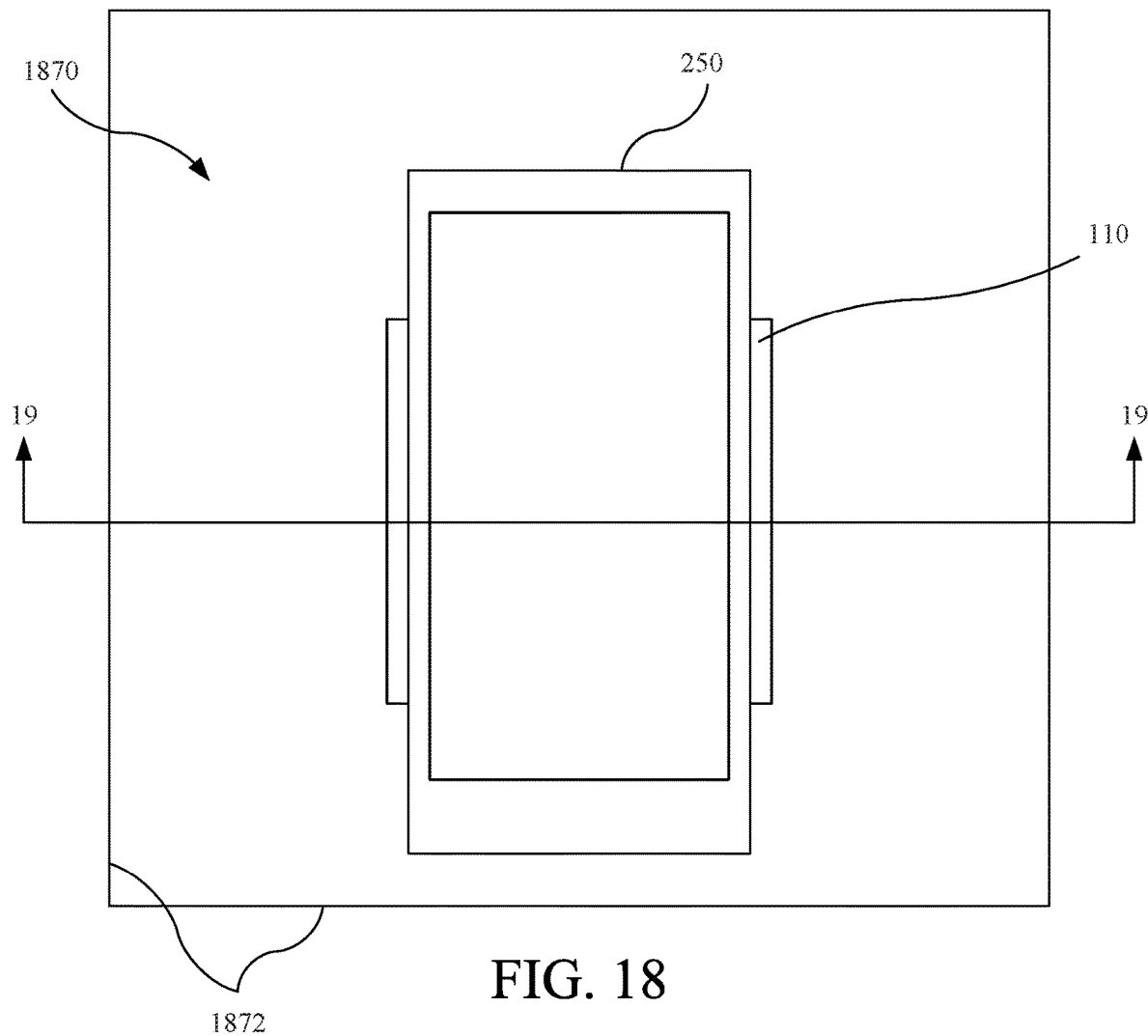
FIG. 18 is a front view of the holding device and the electronic device shown in FIGS. 3-6, which are disposed in a receptacle.
Figure 19:
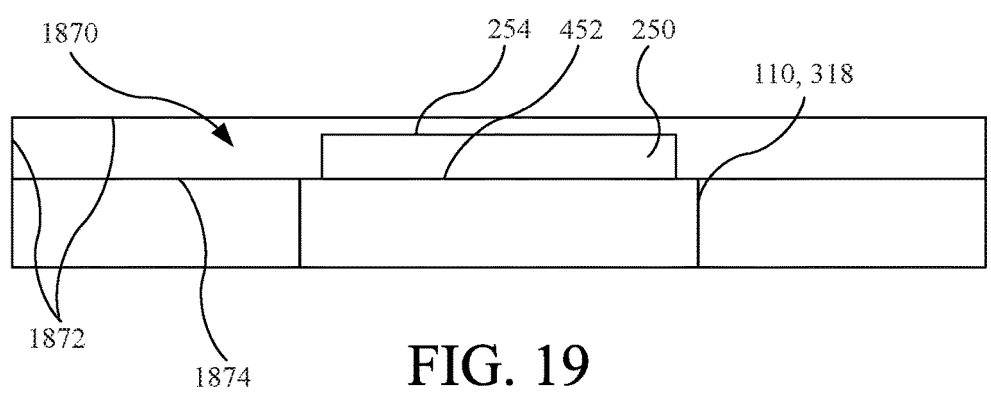
FIG. 19 is a cross-sectional view of the holding device, the electronic device, and the receptacle taken along line 19-19 in FIG. 18.

Referring to FIGS. 18-19, the holding device 110 may be positioned in or behind a receptacle 1870. The receptacle 1870 includes peripheral walls 1872 that extend outward from a rear wall 1874, behind which or flush with is the holding device 110. The peripheral walls 1872 have a depth to the rear wall 1874, which is greater than a thickness of a periphery of the portable electronic device 250. If the portable electronic device 250 slides (e.g., shears) relative to the holding device 110, the periphery of the portable electronic device 250 engages the peripheral walls 1872 of the receptacle to prevent further movement thereof. The receptacle 1870 may be sized to accommodate devices of different sizes (e.g., smartphones, tablets, etc.). Alternatively, the peripheral walls 1872 have a depth to the rear wall 1874, so as to be coextensive with or extend slightly beyond the most peripheral portion of a sloped edge of the electronic device 250 (e.g., the peak of a convex edge), or to extend partially along a perpendicular edge to the rear surface 452 of the portable electronic device 250.

Figure 20:
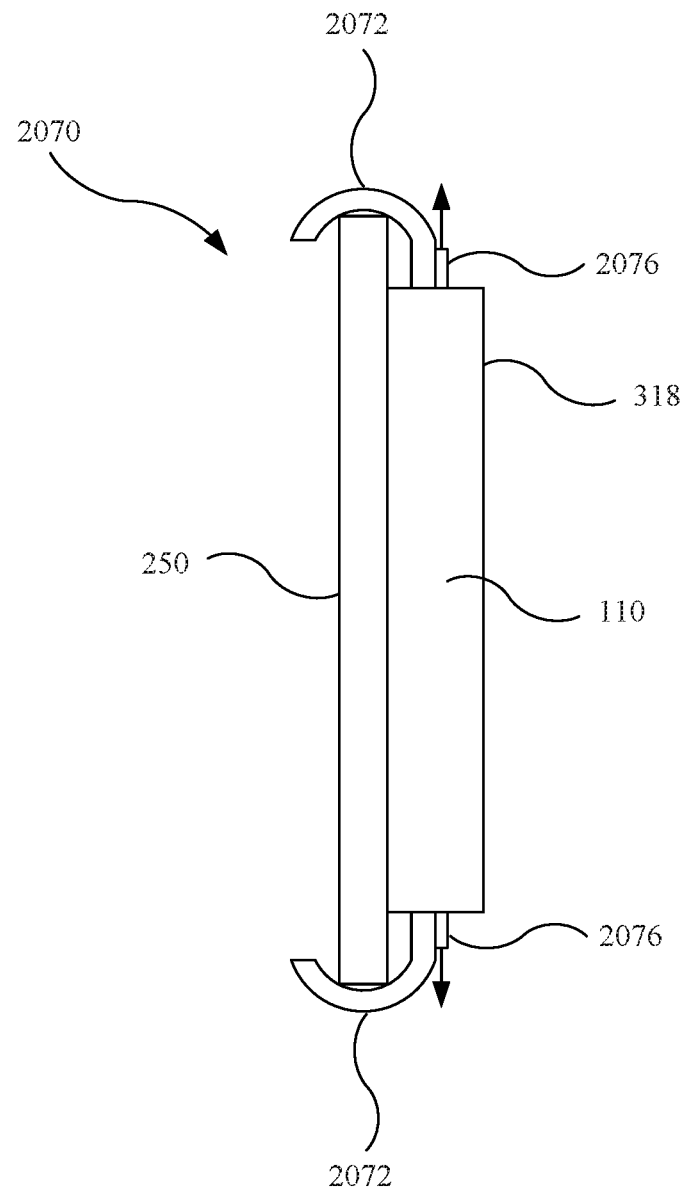
FIG. 20 is a side view of the holding device and the electronic device shown in FIGS. 2-6, along with a mechanical retention device.

Referring to FIG. 20, the holding device 110 additionally includes an actuatable clasp 2070. The actuatable clasp 2070 includes clasp members 2072 (e.g., hooks or retention members) that deploy around the periphery of the portable electronic device 250 to prevent movement thereof. For example, the clasp members 2072 may be hingedly or slidably coupled to the housing 318 of the holding device 110, and be deployed with sliding pins 2076 or other actuators (e.g., motor, linear actuators, etc.).

Figure 21:
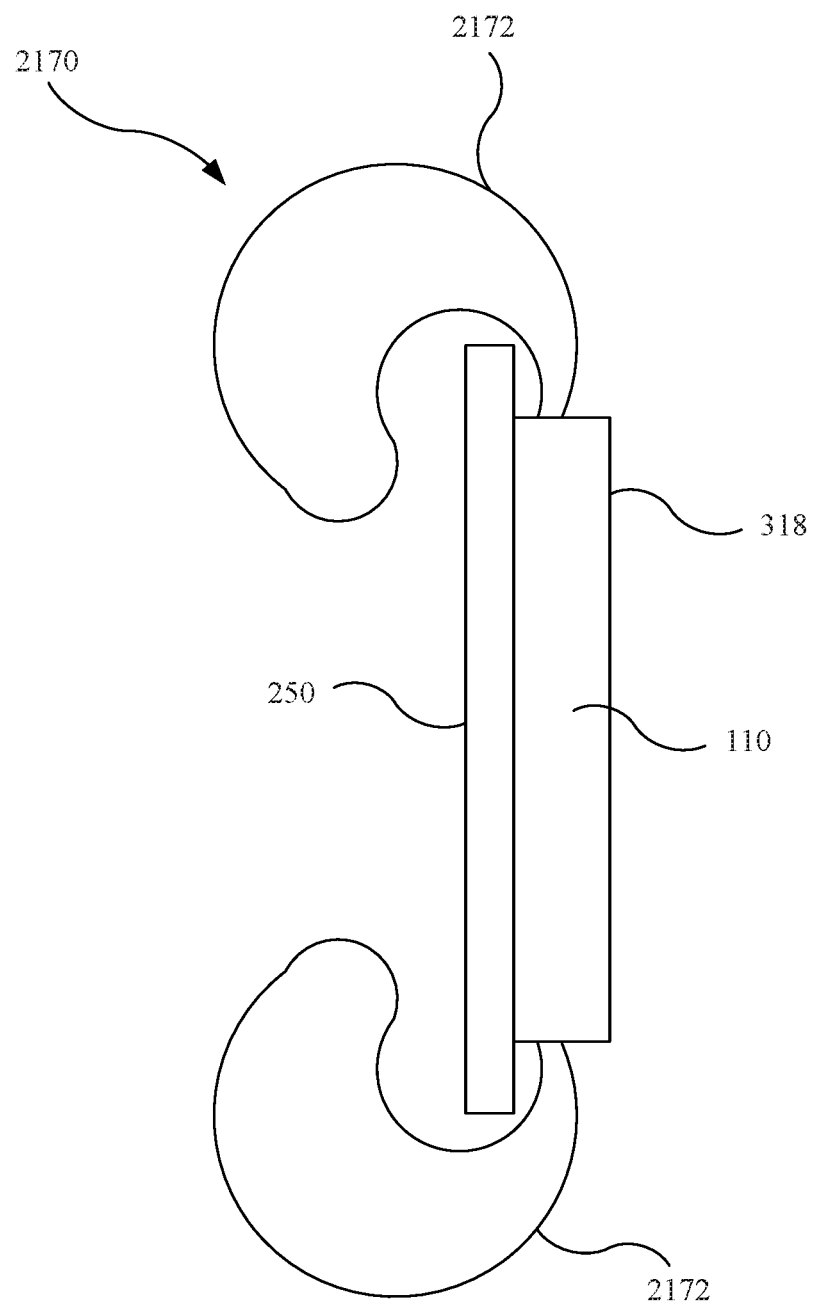
FIG. 21 is a side view of the holding device and the electronic device shown in FIGS. 2-6, along with an airbag retention device.
Figure 22:
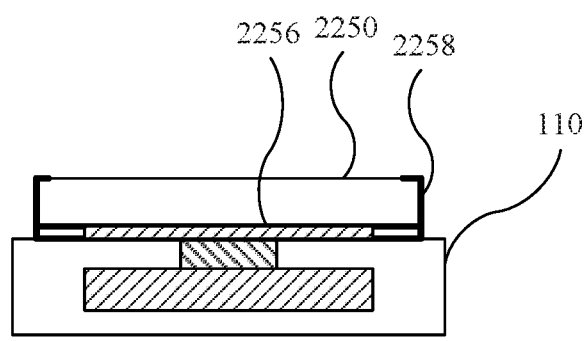
FIG. 22 is a cross-sectional view of the holding device shown in FIGS. 2-6, along with another embodiment of an electronic device and a case.

Referring to FIG. 21, the holding device 110 additionally includes an airbag mechanism 2170. The airbag mechanism 2170 includes an airbag cushion 2172 that deploys around the periphery of the portable electronic device 250 to prevent movement thereof. For example, the airbag cushion 2172 may deploy from the housing 318 of the holding device 110 with a suitable inflator (e.g., pyrotechnical, chemical, etc.). The airbag cushion 2172 is additionally configured to deploy from a position behind to around a front of the portable electronic device 250, for example, using a combination of folding and rolling of the airbag cushion 2172 when stored. According to another embodiment, variations of the airbag cushion 2172 may be used in conjunction with the receptacle 1870 described above, in which the alternative airbag deploys over the portable electronic device 250 positioned in the receptacle 1870.

Figure 23:
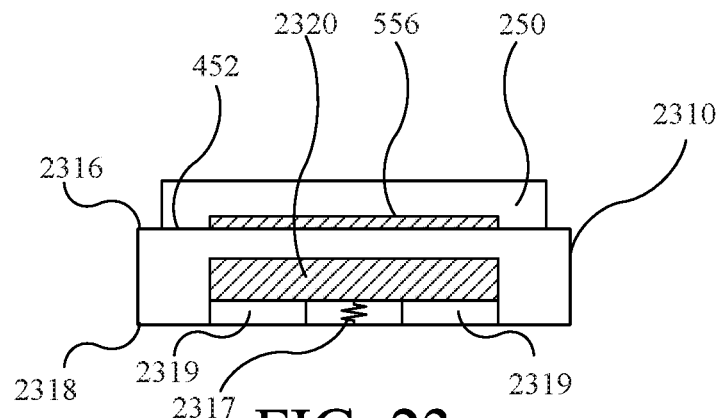
FIG. 23 is a cross-sectional view of another embodiment of a holding device in a first configuration, and the electronic device shown in FIGS. 2-6
Figure 24:
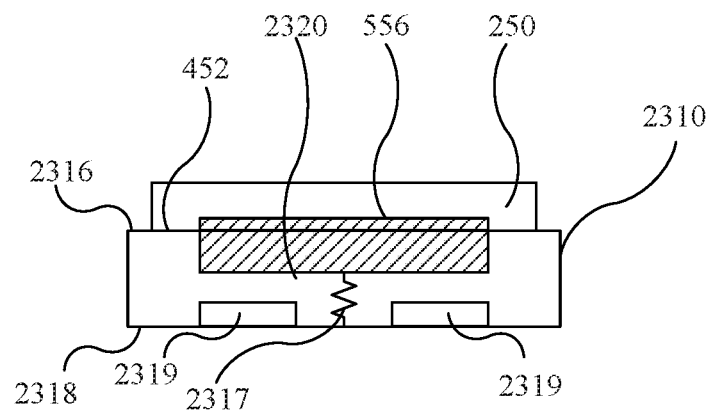
FIG. 24 is a cross-sectional view of the holding device of FIG. 23 in a second configuration, and the electronic device shown in FIGS. 2-6.

Referring to FIGS. 23-24, a holding device 2310 includes one or more magnets 2320 that are movably coupled with a spring 2317 to a housing 2318 of the holding device 2310. The spring 2317 is configured to normally bias the magnet 2320 to a retracted position (see FIG. 23) in which the magnet 2320 is positioned away from a forward surface 2316 of the holding device 1810. As the portable electronic device 250 is moved into proximity of the holding device 2310 and, more particularly, as the attraction plate 556 is moved to within the magnetic field of the magnet 2320, the magnet 2320 is pulled by the magnetic force into an extended position (see FIG. 24) adjacent the forward surface 2316 of the holding device 2310. In this manner, the holding device 2310 is connected passively to the portable electronic device 250. While in the extended position, the magnetic field of the magnet 2320 draws the attraction plate 556 with sufficient force to overcome the force of the spring 2317 and to secure the portable electronic device 250 to the holding device 2310.

The actuators 2319 are depicted schematically but may be any suitable type of actuator. In one example, the actuators 2319 are mechanical actuators that physically engage the magnet 2320 (or another member coupled thereto) to move the magnet to the retracted position (e.g., screw, helix, or other ramped device that gradually pulls the magnet 2320 away from the attraction plate 556 and reduces the force therebetween). Alternatively, the actuators 2319 may be electromagnets or electropermanent magnets having an opposite pole positioned proximate the magnet 2320 (e.g., which may be a permanent magnet).

Figure 25:
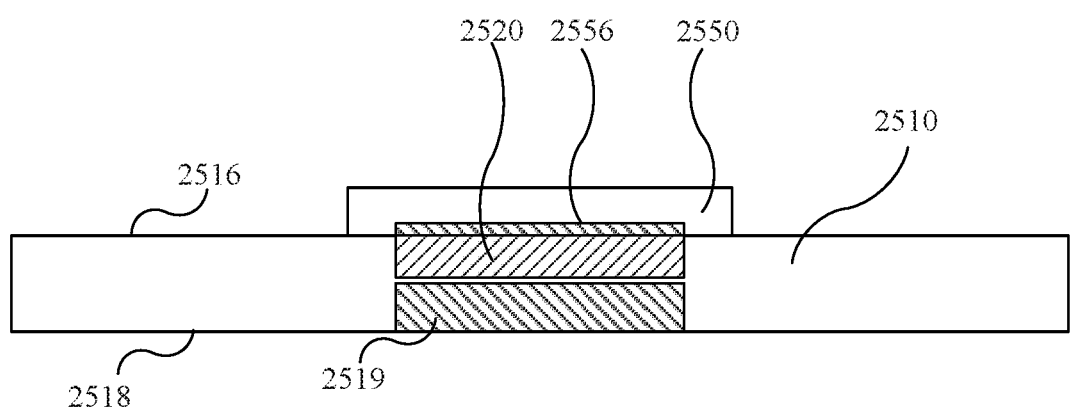
FIG. 25 is a cross-sectional view of other embodiments of a holding device and an electronic device.

Referring to FIG. 25, a holding device 2510 includes on one or more magnets 2520 that are permanent magnets. The portable electronic device 2550 includes a permanent magnet 2556 instead of an attraction plate, and has a rear pole of opposite polarity to that of a forward pole of the magnet 2520 of the holding device 2510 to draw the magnet 2556 thereto.

To remove or release the portable electronic device 2550, the holding device 2550 includes a selectively actuatable magnet 2519 (e.g., an electromagnet or an electropermanent magnet). The actuatable magnet 2519 is positioned proximate (e.g., behind) the permanent magnet 2520 and has the opposite polarity thereof. Thus, when the actuatable magnet 2519 is activated, its magnetic field offsets that of the magnet 2520 and/or repels the magnet 2556 of the portable electronic device 2550.

Various embodiments of holding device 110 and/or the vehicle controller 204 of the vehicle 100 may also be configured to identify the portable electronic device 250 to be held (e.g., by manufacturer, product line, product type, owner, etc.). Based on the detected identity of the portable electronic device 250, the holding device 110 may alter the manner in which the holding device 110 holds or does not hold the portable electronic device 250. For example, based on the detected identity, the holding device 110 may vary the strength by which the holding device 110 holds the portable electronic device 250. Use of unidentified or unauthorized portable electronic devices may be prevented with the holding device 110.

The detection sensors 214 may be Hall effect sensors that are configured to determine a magnetic signature of the portable electronic device 250 that is unique to a particular device type (e.g., smartphone or tablet computer of certain lines by certain manufacturers). For example, each line or type of portable electronic device 250 may include various internal components (e.g., speakers, cameras, etc.) that emit magnetic fields of certain strength, spacing, and orientation, which result in a unique magnetic signature that identifies the type of the portable electronic device 250. Instead or in addition to identification by way of the detection sensors 214, the portable electronic device 250 may otherwise send an identification or authentication signal to the holding device 110 (e.g., by way of the network 208 and/or the vehicle controller 204) by which the controller 212 of the holding device 110 identifies the portable electronic device 250.

Referring to FIGS. 26-38, as referenced above, the user device may instead be the auxiliary device 260 may be held by the various embodiments of the holding device 110. Depending on the use of the auxiliary device 260, the holding device 110 may be reoriented for its surface 316 to be arranged substantially horizontally.

Figure 26:
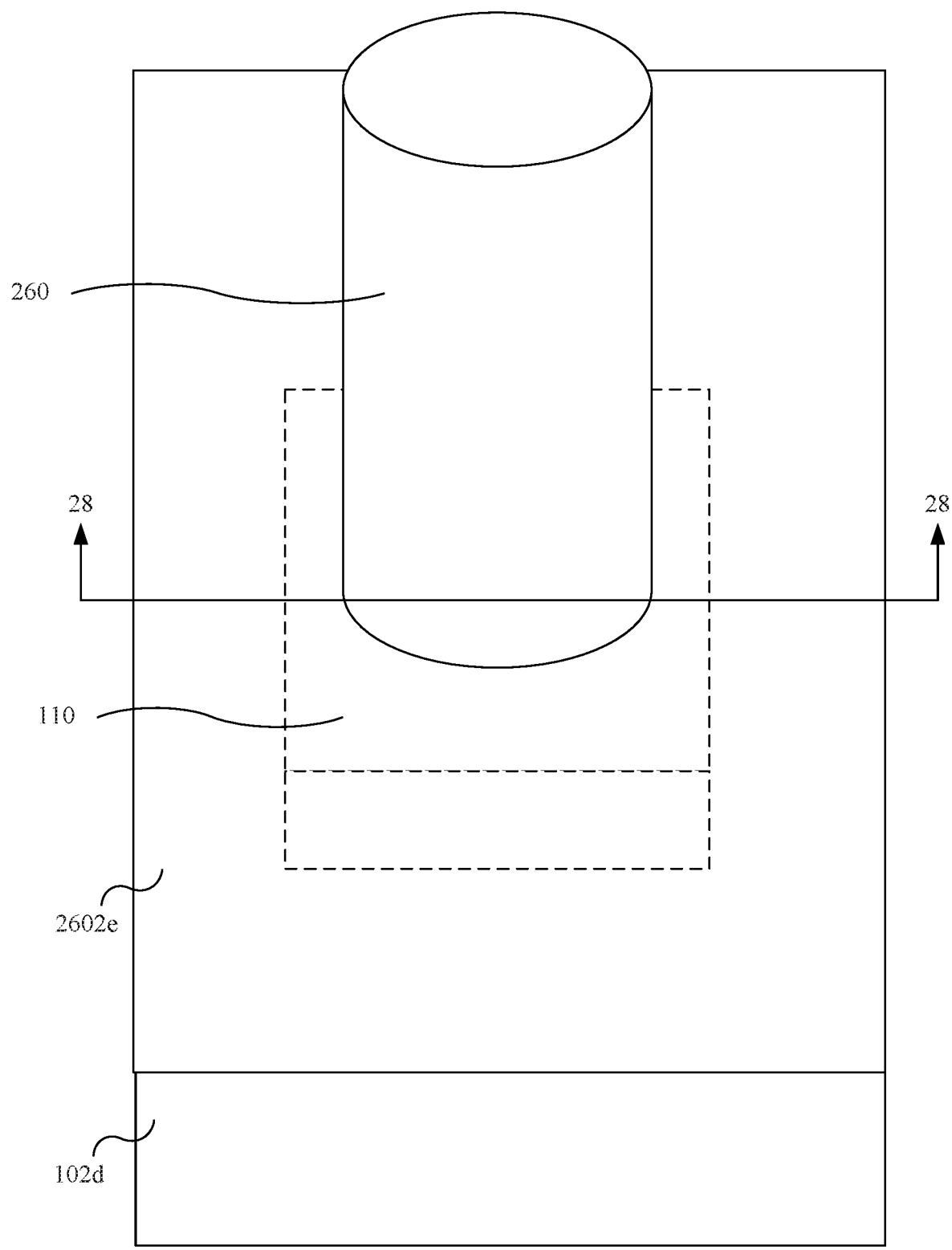
FIG. 26 is an upper perspective view of a holding device and an auxiliary device.
Figure 27:
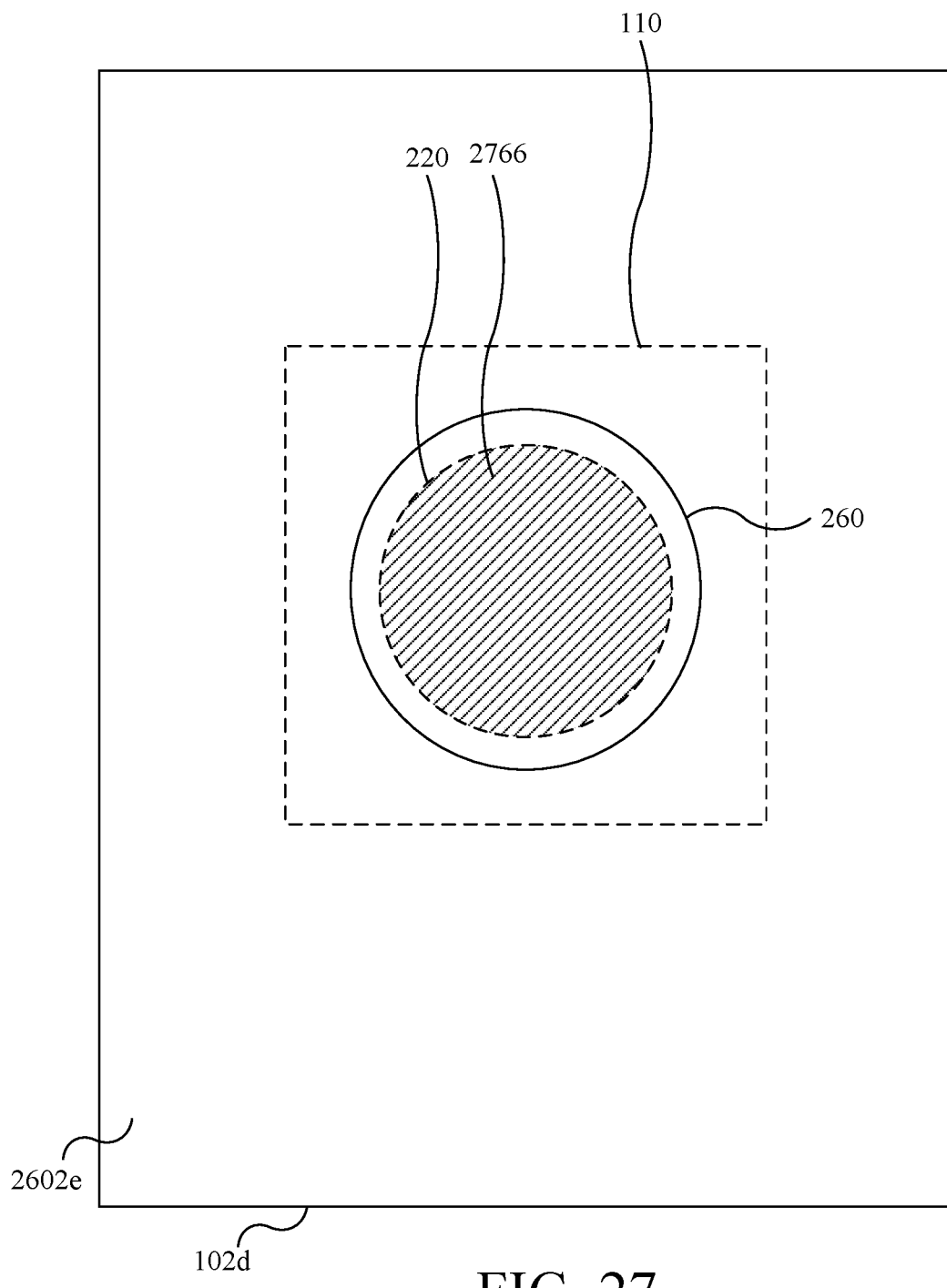
FIG. 27 is a top view of the holding device and the auxiliary device shown in FIG. 26.
Figure 28:
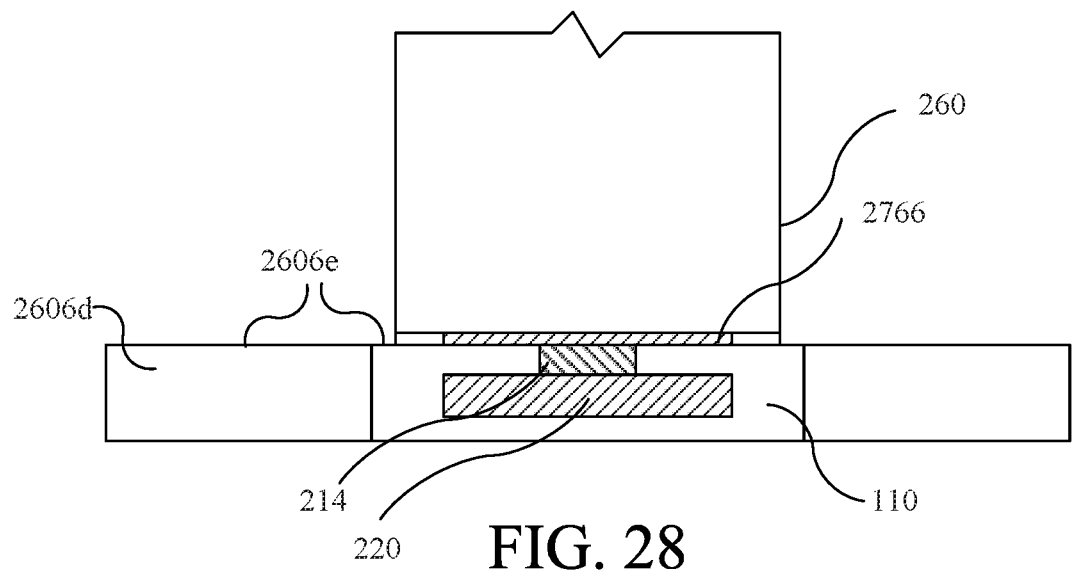
FIG. 28 is a cross-sectional view of the holding device and the auxiliary device taken along line 28-28 in FIG. 26.

Referring to the embodiment shown in FIGS. 26-28, the auxiliary device 260 is configured as a vessel (e.g., cup, bottle, etc.) for holding liquids or other contents. The holding device 110 (shown in broken lines in FIGS. 26-27) is positioned behind a decorative surface 2602e (e.g., glass, plastic, etc.), for example, as part of a console 102d of the vehicle 100. When the auxiliary device 260 is positioned on the surface 2602e of the vehicle 100, the holding device 110 holds the auxiliary device 260 via magnetism. According to other exemplary embodiments, the auxiliary device 260 may instead be a cup holder, electronic device holder, storage compartment, or other device.

Referring to FIGS. 27-28, the auxiliary device 260 includes an attraction plate 2766 (depicted in diagonal cross-hatching) in a bottom thereof, which is drawn to and held by the magnet 220 (depicted in broken outline) of the holding device 110. As is shown in FIGS. 27-28, the attraction plate 2766 is a single continuous member similar to the attraction plate 556 described previously, but may be configured in different manners, including having different quantity (e.g., having multiple members or attraction plates) and having different shapes formed individually or collectively (e.g., square, rectangle, ring, etc.). The attraction plate 2766 and the magnets 220 may also be configured and/or operated in the manners described above with respect to FIGS. 7-15 (e.g., for detecting, locating, and or orienting the auxiliary device 260 and providing multiple holding locations for the auxiliary device 260).

In one embodiment, the auxiliary device 260 is a passive device that does not communicate with the holding device 110. The holding device 110 detects, holds, and releases the auxiliary device 260 without send/receiving any signals therebetween. The one or more sensors 214 of the holding device 110, alone or in conjunction with the vehicle sensors 206 of the vehicle 100, are configured to detect receive inputs for manually and/or automatically activating/deactivating the magnets 220 to hold/release the auxiliary device 260. For example, the one or more sensors 214 of the holding device 110, alone or in conjunction with the vehicle sensors 206, are configured to detect and/or determine the location of the auxiliary device 260 in manners described above with respect to the portable electronic device 250 (e.g., with the sensors 214 being optical sensors, and/or Hall effect sensors). The auxiliary device 260 may also be used with the holding devices that provide multiple discrete or overlapping holding positions (refer to discussion of holding devices 1110 and 1410).

Figure 29:
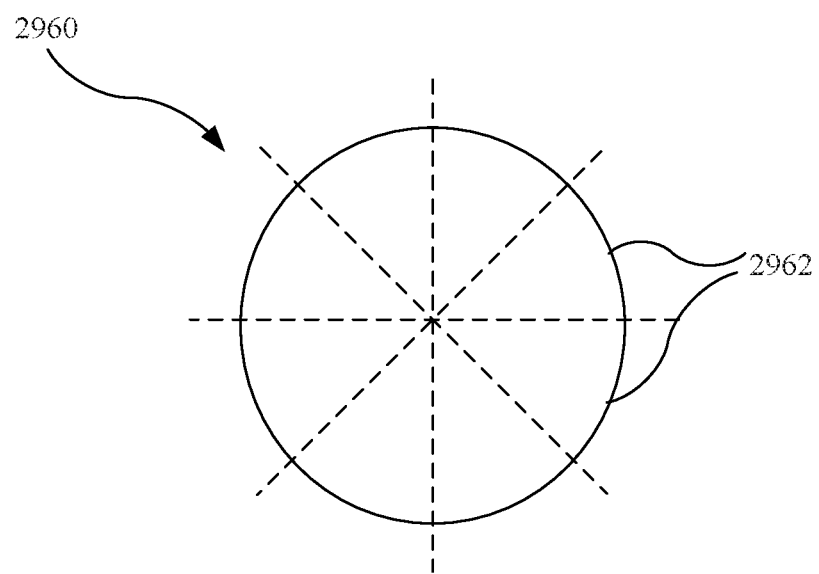
FIG. 29 is a top view of another embodiment of an auxiliary device.

The one or more sensors 214 of the holding device 110 may also be configured to receive inputs and/or detect user behaviors for releasing the auxiliary device 260. For example, as shown in FIG. 29, an auxiliary device 2960 includes a plurality of discrete zones 2962 (e.g., eight) that are circumferentially spaced about the vessel formed by the auxiliary device 2960. The zones 2962 may, for example, be formed by separate members. The sensors 214 of the holding device 110 are configured to detect whether each contact zone 2962 of the auxiliary device 2960 has been contacted by the user (e.g., by detecting or measuring changes in capacitance). When the user contacts the contact zones 2962 that are positioned generally opposite each other (e.g., with 90 degrees or more separation therebetween), such as when the user grasps the auxiliary device 2960 as opposed to bumping one side thereof, the holding device 110 releases the auxiliary device 2960. In this manner, release is initiated by determining contact along with user intent (i.e., by simultaneously contacting opposite sides of the auxiliary device 2960).

Alternative embodiments of the auxiliary device 260 are active devices that communicate with the holding device 110, such as to identify the auxiliary device and/or for activating/deactivating the holding device 110.

Figure 30:
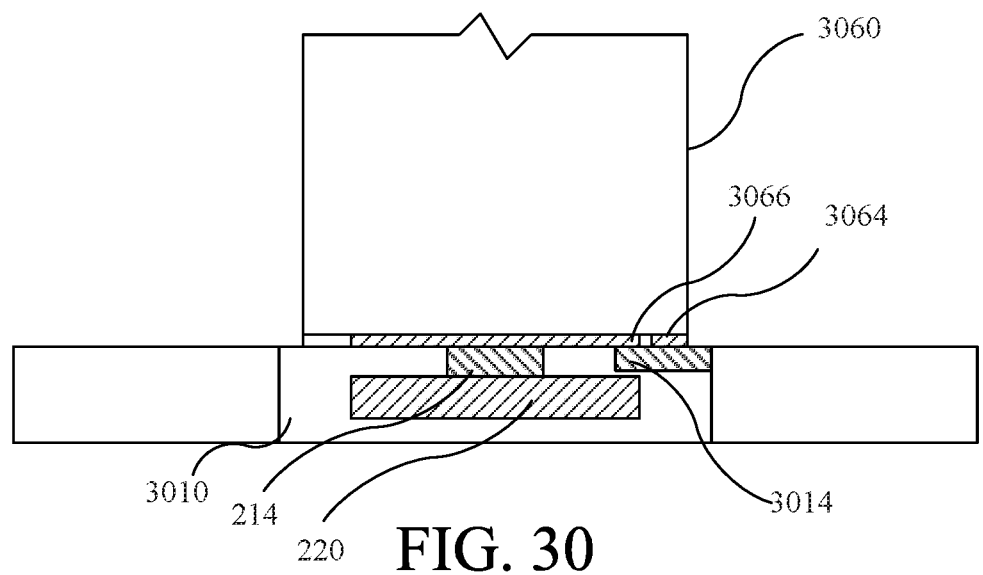
FIG. 30 is a cross-sectional view of other embodiments of a holding device and an auxiliary device.

Referring to the embodiment shown in FIG. 30, an auxiliary device 3060 is configured to communicate with a holding device 3010 using a passive data transmission device but does not include its own power source. Examples of passive data transmission devices include radio-frequency identification (RFID) devices and Near Field Communication (NFC) devices. In one implementation, the auxiliary device 3060, for example, includes an RFID device 3064 that communicates with the holding device 3010. The holding device 3010 is configured similar to the holding device 110, but additionally includes a coil 3014 or other actuator that provides remote power to the RFID device 3064 when the RFID device 3064 is in close proximity to the coil 3014.

The RFID device 3064 of the auxiliary device 3060 receives power from the coil 3014 of the holding device 3010 to send one or more signals a receiver 3016 of the holding device 3010. The holding device 3060 activates a magnet 220 to hold the auxiliary device 3060 in response to receiving the signal from the RFID device 3064 and/or the strength of the signal, which may indicate proximity of the auxiliary device 3060 to the holding device 3010. The RFID device 3064 may also store and communicate certain information, for example, device information (e.g., serial number, model, compatibility, etc.), and/or user information (e.g., user identifier, preferences, etc.) that may be used in some manner to control holding device 3010 (e.g., holding strength, heating/cooling of the contents, activation/deactivation with authorized/unauthorized use, etc.). While the coil 3014 and the RFID device 3064 are depicted as being biased toward a side of the holding device 3010 and the auxiliary device 3060, respectively, they may be arranged at any suitable position as may be compatible with the magnet 220 and attraction plates 3066, respectively, thereof. In other embodiments, another RFID device may be used, which is powered by a self-contained power source (e.g., battery) of the auxiliary device.

Figure 31:
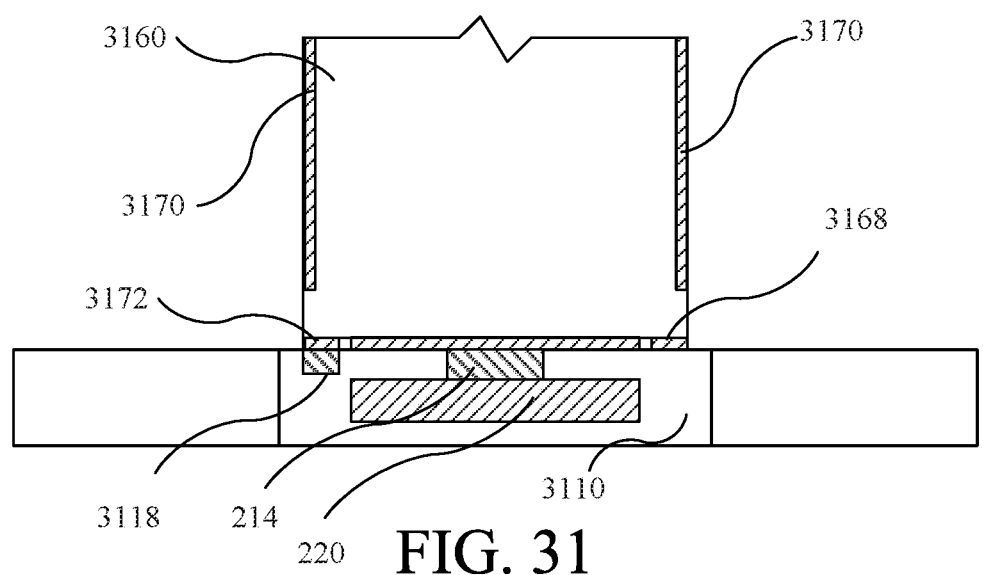
FIG. 31 is a cross-sectional view of other embodiments of a holding device and an auxiliary device.
Figure 32:
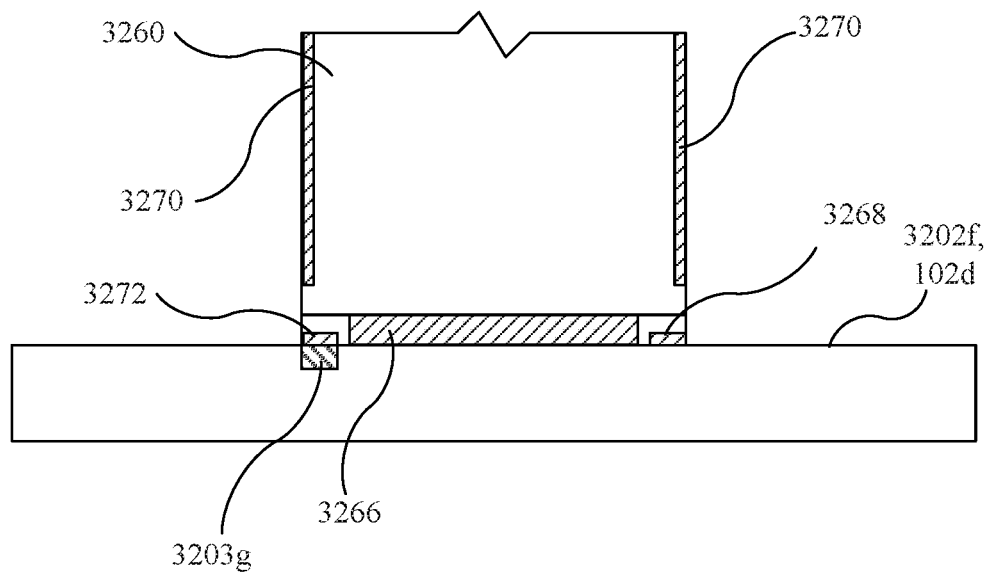
FIG. 32 is a cross-sectional view of other embodiments of a holding device and an auxiliary device.

Referring to the embodiments shown in FIGS. 31-32, various auxiliary devices include their own power source (e.g., a battery) for performing various functions. Alternatively, the various auxiliary devices may be configured for physical electrical and/or communication connections with the holding devices.

Referring to FIG. 31, an auxiliary device 3160 includes a battery 3168 and one or more sensors 3170 configured to detect a user grasping the auxiliary device 3160. The sensors 3170 may, for example, be capacitive sensors positioned on opposite sides of the auxiliary device 3160 and/or distributed circumferentially there about (e.g., similar to spacing of the contact zones 2962 described above). When a user grasps the auxiliary device 3160, contact by the user is detected at multiple sensors 3170. The auxiliary device 3160 sends one or more signals (e.g., via near field communication, or the network 208 of the vehicle 100) based on this detected contact or lack of contact for the holding device 110 to release or hold, respectively, the auxiliary device 3160. Moreover, the sensors 3170 may be configured to detect magnitudes in changes of capacitance (e.g., based on greater contact surface area and/or pressure by the user), which may be used to distinguish between inadvertent contact or insufficient grasping force by the user from intentional contact and sufficient grasping force. The sensors 3170 may instead include resistive force sensors having resistance that changes according to the pressure (e.g., from grasping).

The battery 3168 may be charged via a physical connection or inductive charging. For example, the auxiliary device 3160 may include a secondary inductive charging coil 3172 that inductively couples to and receives power from a primary inductive charging coil 3118 of the holding device 3110, or another charging source. While the secondary inductive charging coil 3172 and the primary inductive charging coil 3118 are depicted as being biased toward a side of the auxiliary device 3160 and the holding device 3110, respectively, they may be positioned and/or arranged in any suitable manner (e.g., relative to an attraction plate 3166 of the auxiliary device 3160 and/or magnet 220 of the holding device 3110).

Referring to FIG. 32, an auxiliary device 3260 includes one or more selectively activated magnets 3266 that hold the auxiliary device 3260 to a passive attraction plate 3202*f* in the console 102*d* of the vehicle 100. The magnet 3266 may, for example, be an electropermanent magnet or an electromagnet as described previously. The magnet 3266 is selectively activated and/or powered by a battery 3268 of the auxiliary device 3260, which may be charged by inductive charging coils 3272, 3203*g* of the auxiliary device 3260 and the vehicle 100, respectively. The magnet 3266 is activated based on inputs to sensors 3270 of the auxiliary device 3260 (see discussion of sensors 3170 above), such as to emit an external magnetic field when grasping touch is not detected (e.g., based on location and/or magnitude of touch detected) to hold the auxiliary device 3260 to the attraction plate 3203*f*. Conversely, when grasping touch is detected by the sensors 3170, the magnet 3266 does not emit the external magnetic field to allow release the auxiliary device 3260 from the attraction plate 3203*f*.

Figure 33:
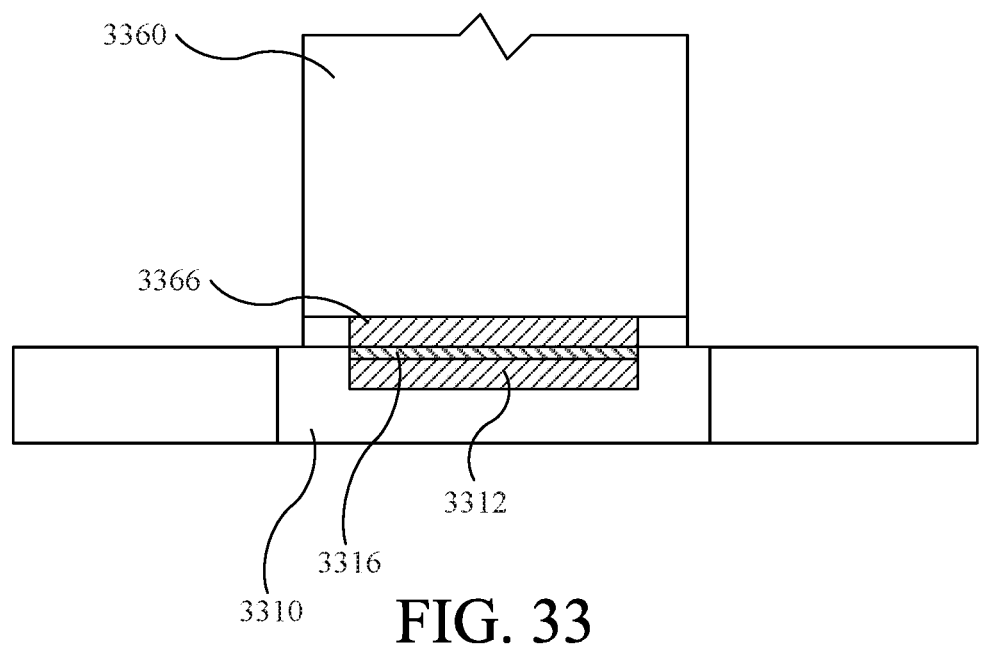
FIG. 33 is a cross-sectional view of other embodiments of a holding device and an auxiliary device.

Referring to FIG. 33, as an alternative to the magnet 3266 of the auxiliary device 3260 being selectively activated and/or powered by the battery 3268 thereof, an auxiliary device 3360 includes a magnet 3366 that is an electropermanent magnet that is activated by a holding device 3310. The holding device 3310 includes an attraction plate 3316 to which the magnet 3366 draws the auxiliary device 3260. The holding device 3310 additionally includes an actuator 3312 (e.g., an electromagnet) that selectively emits a magnetic field that, when emitted, switches the magnet 3366 of the auxiliary device 3360 between emitting an external magnetic field (i.e., for holding the auxiliary device 3360 to the attraction plate 3316 of the holding device 3310) and not emitting the magnetic field (i.e., for releasing the auxiliary device 3360). Upon switching the magnetic field of the magnet 3366 of the auxiliary device 3360, the actuator 3312 of the holding device 3310 is deactivated, so as to stop drawing power. Locating and activation of the auxiliary device 3260 may be performed using the strategies described previously (e.g., using sensors 214 in the holding device 3310, RFID, vehicle sensors 206, etc.).

The various embodiments of the holding device 110 may also be configured to indicate to a user locations at which the auxiliary device 260 may be held. For example, as is shown in FIGS. 34-35, a holding device 110 is configured in conjunction with a mounting surface 3402*e* of a center console 102*d* of the vehicle 100 to hold multiple auxiliary devices 110 at multiple different locations. To identify each location, holding areas 3402*f* of the mounting surface 3402*e*, behind which holding devices 110 (or variations thereof) are positioned, are identified physically and/or visually. For example, as shown in FIG. 35, the mounting surface 3402*e* includes a depression 3402*g* whose periphery is larger than the auxiliary device 260, so as to visually and/or tactilely identify the holding area 3402*f*. In some embodiments, the depression 3602*g* may be slightly larger than a mating end of the auxiliary device 260, so as to guide the auxiliary device 260 into position. Instead or additionally, the holding areas 3402*f* may be identified visually, for example, with a contrast of materials, colors, surface finishes, indicia, and/or lighting (e.g., emanating from or around the holding areas 3402*f* and/or the auxiliary device 260).

Figure 36:
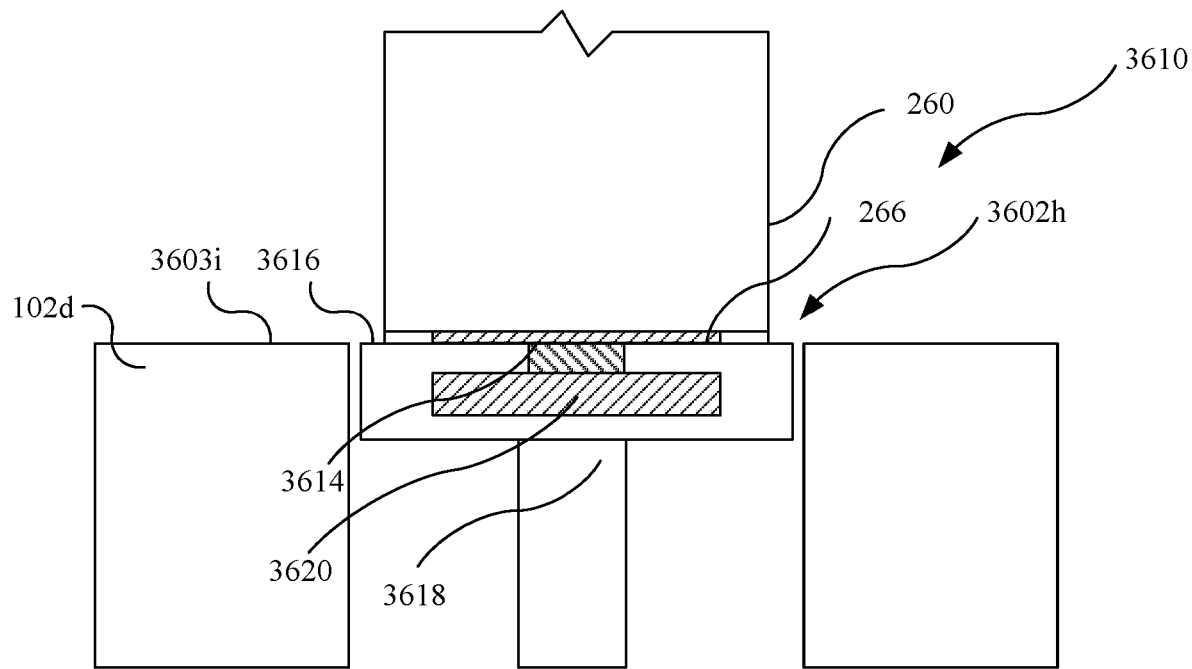
FIG. 36 is a cross-sectional view of another embodiment of a holding device in a first configuration with the auxiliary device shown in FIG. 26.
Figure 37:
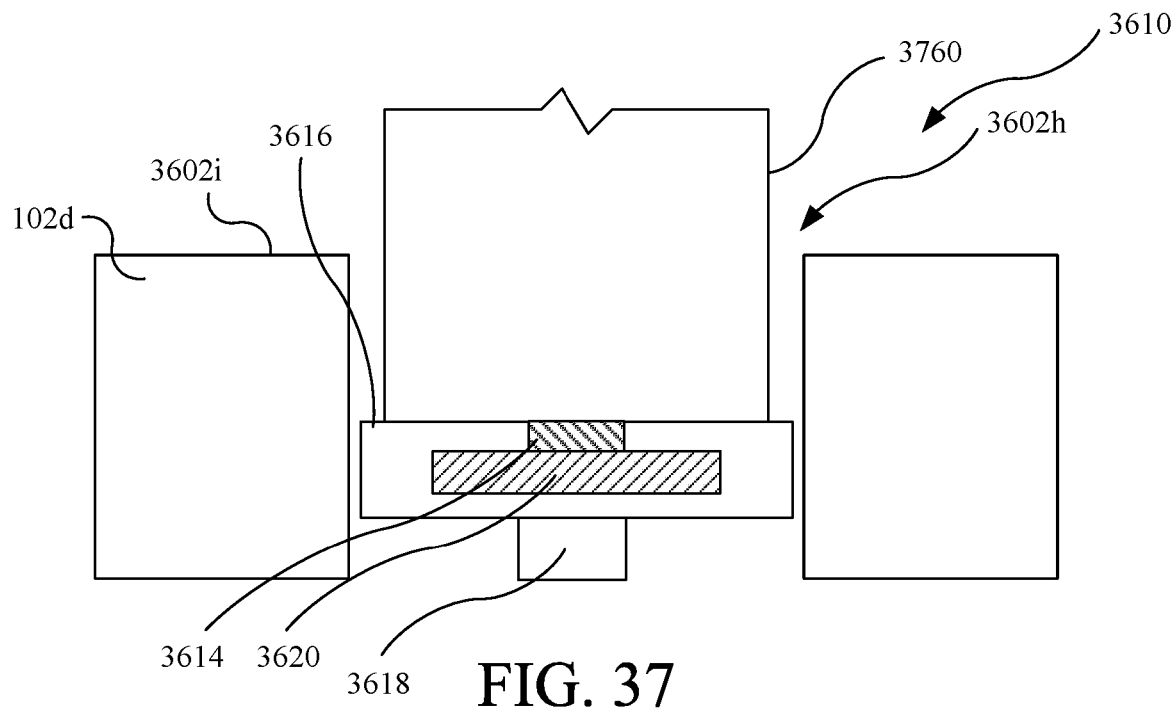
FIG. 37 is a cross-sectional view of the holding device of FIG. 36 shown in a second configuration with another auxiliary device.

Referring to another embodiment shown in FIGS. 36-37, a holding device 3610 is configured to hold authorized and/or magnetically compatible auxiliary devices 260 via magnetism and to hold non-authorized and/or non-magnetically compatible devices by selectively forming a receptacle 3602*h*. The holding device 3610 is configured substantially similar to the holding device 110 (or variations thereof), but the sensing and magnetic components are movable vertically within the receptacle 3602*h* (e.g., receptacle, cavity, etc.) of the console 102*d* or other component of the vehicle 100.

The holding device 3610 includes one or more sensors 3614 and one or more magnets 3620 that are positioned underneath an upper surface 3616 of the holding device 3610, which may be configured in any of the manners described above (e.g., magnet/attraction plate configuration, detecting and locating strategies, etc.). When an authorized or compatible device is both detected and recognized or identified (e.g., the holding device 3610 optically recognizing the auxiliary device 260, magnetically recognizing the magnetic signature of the auxiliary device 260, and/or communicating with the auxiliary device 260), the upper surface 3616 is maintained flush with (as shown) or slightly recessed from (e.g., to form a depression) surrounding upper surfaces 3602i of the console 102d (see FIG. 36). When another auxiliary device 3760 that is detected but is not authorized or identified, the upper surface 3616 of the holding device 3610 is biased downward to form the cavity 3602h, which functions as a conventional cup holder or other receptacle (see FIG. 37). The holding device 3610 is reconfigurable by operating an actuator 3618 (e.g., linear actuator, screw actuator, rack and pinion, etc.), which moves the upper surface 3614, sensors 214, and/or magnet 3620.

Figure 38:
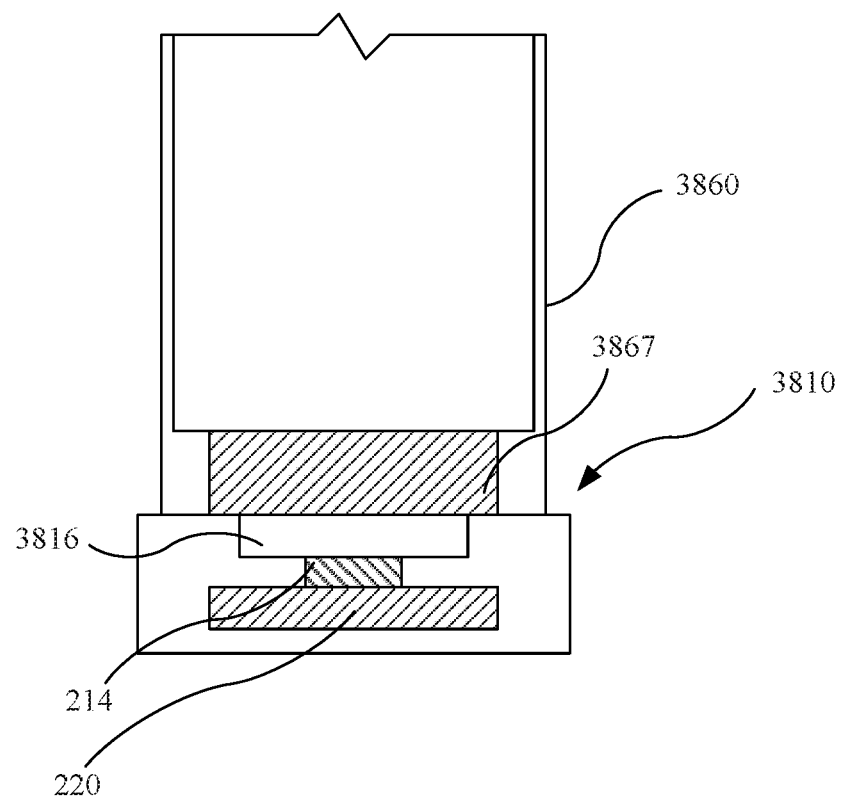
FIG. 38 is a cross-sectional view of other embodiments of a holding device and an auxiliary device.

Referring to another embodiment shown in FIG. 38, an auxiliary device 3860 and a holding device 3810 are cooperatively configured to heat and/or cool contents of the auxiliary device 3860 (e.g., a liquid beverage). The auxiliary device 3860 is configured as a vessel having a conductive mass 3867 (e.g., metal member, such as aluminum, steel, etc.) at a bottom thereof. An upper surface of the conductive mass 3867 (or an intermediate conductive member or layer) is exposed internal to the auxiliary device 3860, while a lower surface (or another intermediate conductive member or layer) is exposed below the auxiliary device 3860. The conductive mass 3867 is also thermally insulated from an exterior of the auxiliary device 3860 that might be touched by the user (e.g., the auxiliary device 3860 may have an outer insulating layer of silicone or other material).

The holding device 3810 includes a Peltier device, or other thermoelectric device, that, when the auxiliary device 3860 is positioned on the holding device 3810, directly contacts the conductive mass 3867. The Peltier device may be switched between cooling and heating modes to conductively heat or cool the conductive mass 3867 to, thereby, heat or cool the contents of the auxiliary device 3860. Heating and/or cooling may, for example, be determined based on information communicated through an RFID device (see description of RFID device 3064 above) and/or by user input. Alternatively, the holding device 3810 and/or the auxiliary device 3860 may incorporate a temperature sensor to sense the temperature of the auxiliary device 3860 or its contents and regulate the temperature of based on the current temperature. Detection, identification, and holding of the auxiliary device 3860 may be implemented in the manners described previously (e.g., using one or more sensors 214 and/or one or more magnets 220) arranged in a manner suitable for use with the conductive mass 3867 (e.g., functioning as an attractor plate or with a separate attractor plate) and the Peltier device 3816.

Referring to FIGS. 39-51, various other holding devices may secure user devices, such as the various embodiments of the portable electronic devices 250 and/or the auxiliary devices 260 in other manners, such as direct vacuum, directional adhesives, deformable receivers, and/or movable pins.

Referring to FIGS. 39-44, user devices are held via a vacuum or suction.

Figure 39:
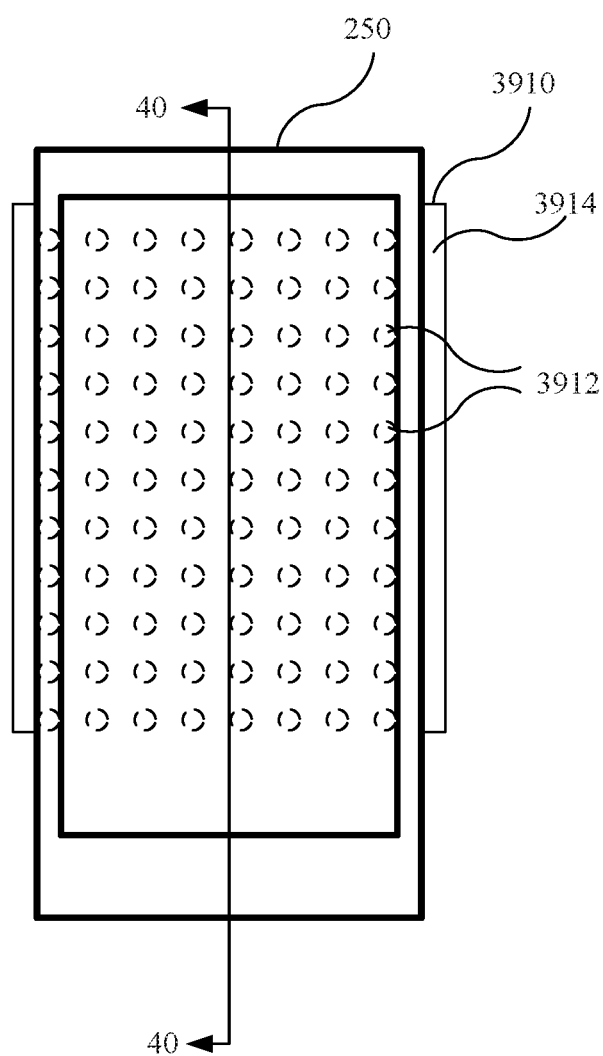
FIG. 39 is a front view of another embodiment of a holding device and the electronic device of FIG. 7.
Figure 40:
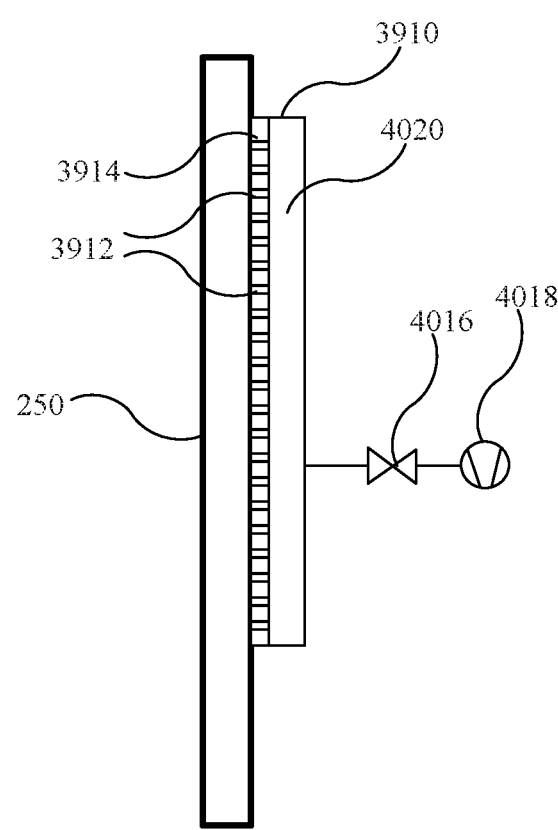
FIG. 40 is a cross-sectional and partial schematic view of the holding device and the electronic device taken along line 40-40 in FIG. 39.

Referring to the embodiment shown in FIGS. 39-40, a holding device 3910 is configured to secure the standard portable electronic device 2250 via a vacuum. More particularly, the holding device 3910 is configured to apply a vacuum to a rear surface 452 of the portable electronic device 750.

The holding device 3910 includes one or more vacuum sources, or may be functionally coupled to another vacuum system of the vehicle 100, and a plurality of nozzles 3912 through which a vacuum is pulled relative to the passenger compartment 101 of the vehicle 100. The one or more nozzles 3912 are, for example, apertures formed in a plate 3914 (e.g., aluminum, plastic, or other substrate) that engages the rear surface 452. According to other embodiments, rather than use nozzles 3912 in a substrate, the vacuum may be pulled through a porous material, such ceramic, wood, micro-perforated material, porous plastic, etc.

One or more valves 4016 are arranged between the nozzles 3912 and the vacuum source. For example, as shown in FIG. 40, all nozzles 3912 are associated with a single valve 4016 that is selectively activated for the vacuum source 4018 to draw the vacuum through the nozzles 3912 simultaneously. All nozzles 3912 are in communication with a common chamber 4020, which is in turn in communication with the single valve 4016. To prevent continual air flow through unused nozzles 3912, the nozzles 3912 may be concentrated in a small enough area, such that all nozzles 3912 engaged the rear surface 452 of the portable electronic device 450, while still providing sufficient area to hold devices of greater mass.

The valve 4016 may be activated in the manners described above, for example, based on a user input and/or detection of the portable electronic device 250 in proximity of the holding device 3910 (e.g., by the holding device 3910 including sensors 214 described previously and/or using vehicle sensors 204). To ensure continued holding of the portable electronic device 750, the vacuum level may be monitored and maintained at a predetermined level (e.g., 10 psi) and/or the location of the portable electronic device 750 monitored.

The holding device 3910 may additionally employ the various magnetic strategies for alignment/orientation (e.g., using low strength magnets to initially aligned the device, then fully securing with the vacuum) and/or using additional higher strength magnets to further secure the portable electronic device 750 upon detection of high acceleration of the vehicle 100.

Figure 41:
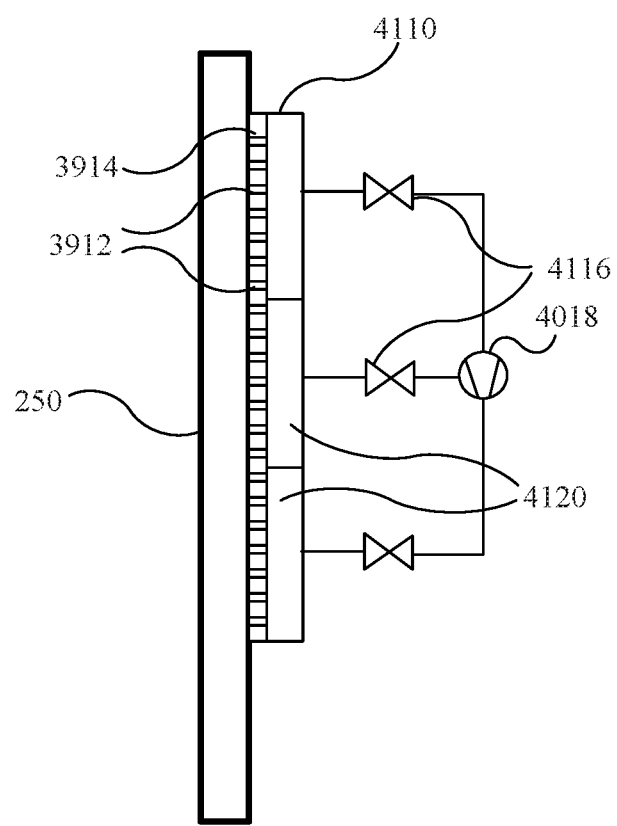
FIG. 41 is a cross-sectional and partial schematic view of another embodiment of a holding device and the electronic device shown in FIG. 7.

Referring to another embodiment shown in FIG. 41, multiple valves 4116 are each associated with a subset of the nozzles 3912 (e.g., vertical and/or horizontally divided zones of nozzles). For example, lower, middle, and upper zones of nozzles 3912 are each in communication with lower, middle, and upper chambers 4120 that are each associated with one valve 4116. Each valve 4116 is operated to provide vacuum at the nozzles 3912 associated therewith based on the location of the portable electronic device 250 as detected in the manners described previously.

Figure 42:
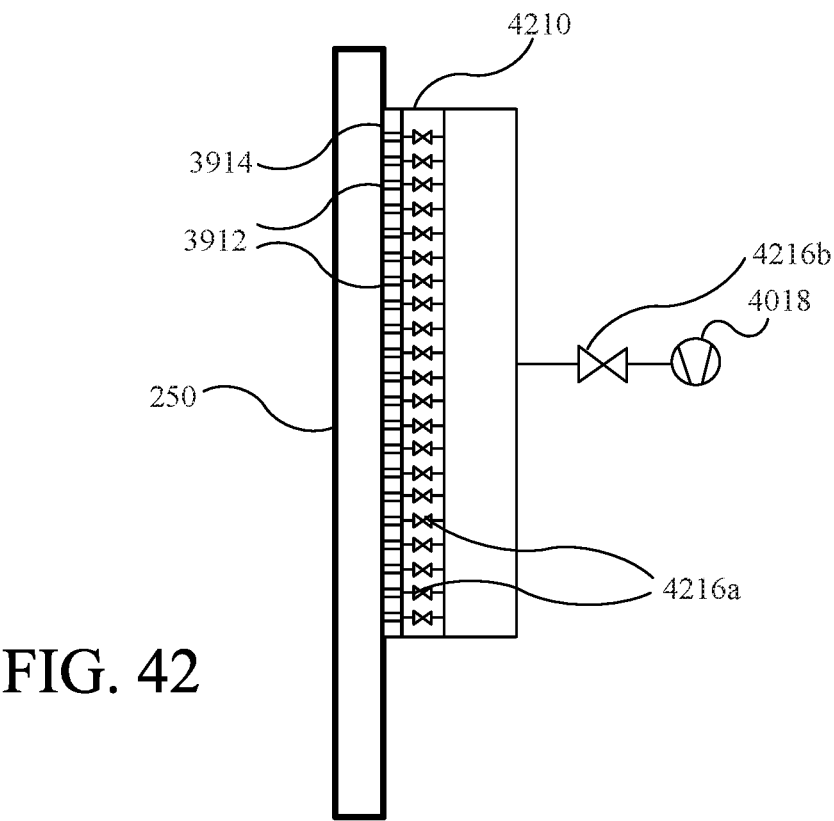
FIG. 42 is a cross-sectional and partial schematic view of another embodiment of a holding device and the electronic device shown in FIG. 7.

Referring to a still further embodiment shown in FIG. 42, a holding device 4210 includes a plurality of passive valves 4216a and one or more active valves 4216b. Each passive valve 4216a is associated with one of the nozzles 3912, while the one or more active valves 4216b are associated with all (as shown) or a subset of the passive valves 4216a and nozzles 3912 (e.g., vertical and/or horizontally divided zones).

Upon detection of the portable electronic device 250, the active valve 4216b is opened to pull a vacuum through the passive valves 4216a. Those passive valves 4216b positioned directly behind the rear surface 452 of the portable electronic device 250 remain open, while those passive valves 4216b in communication with the passenger compartment 101 of the vehicle 100 are closed due to the airflow therethrough.

Figures 43, 44:
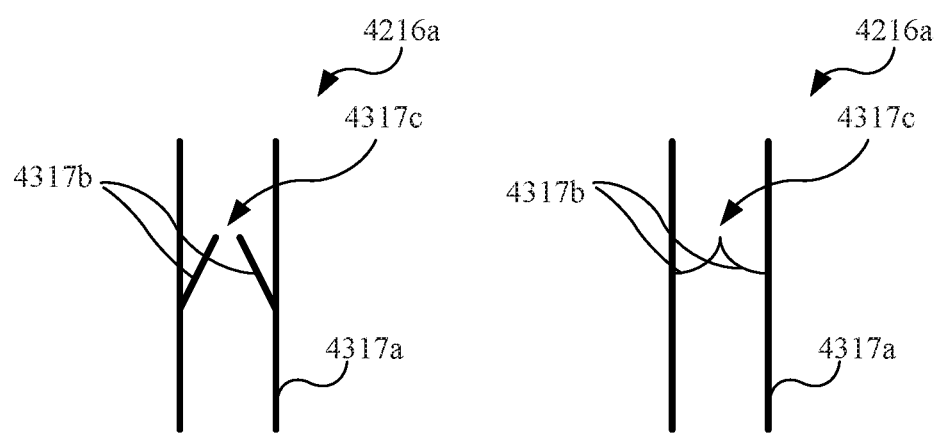
FIG. 43 is a cross-sectional view of a passive valve of the holding device shown in FIG. 42, the passive valve being in an open configuration.
FIG. 44 is another cross-sectional view of the passive valve shown in FIG. 43 in a closed configuration.

As shown in FIG. 43, each passive valve 4216a generally includes a conduit 4317a and one or more elastic members

4317*b* therein. The elastic member 4317*b* defines an orifice 4317*c* that is normally open. With airflow therethrough, the elastic member 4317*b* biases together to close the orifice 4317*c* (see FIG. 44), which remains closed until the vacuum is released.

Figure 45:
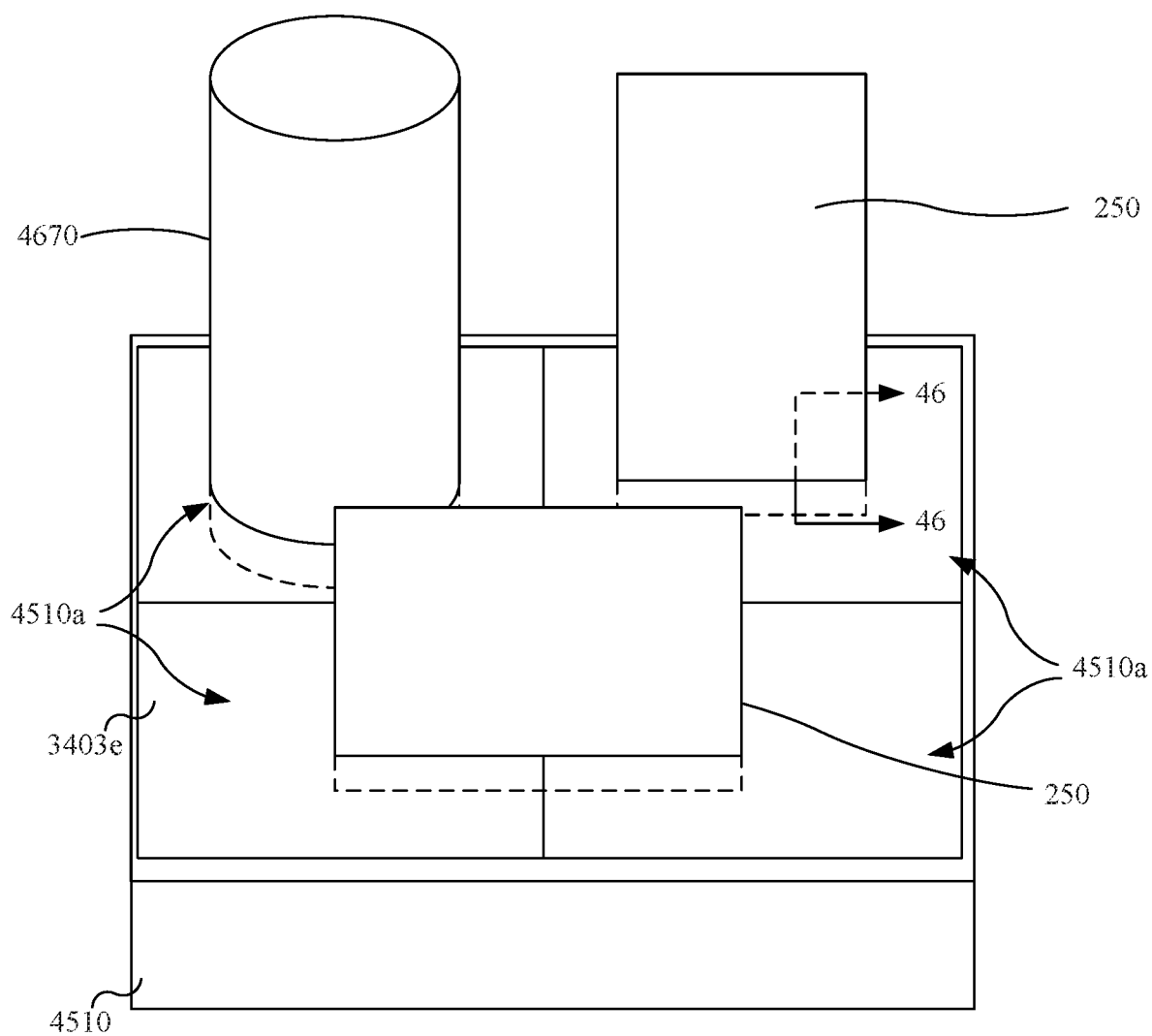
FIG. 45 is an upper perspective view of another holding device with multiple portable electronic devices shown in FIG. 7 and another object.
Figure 46:
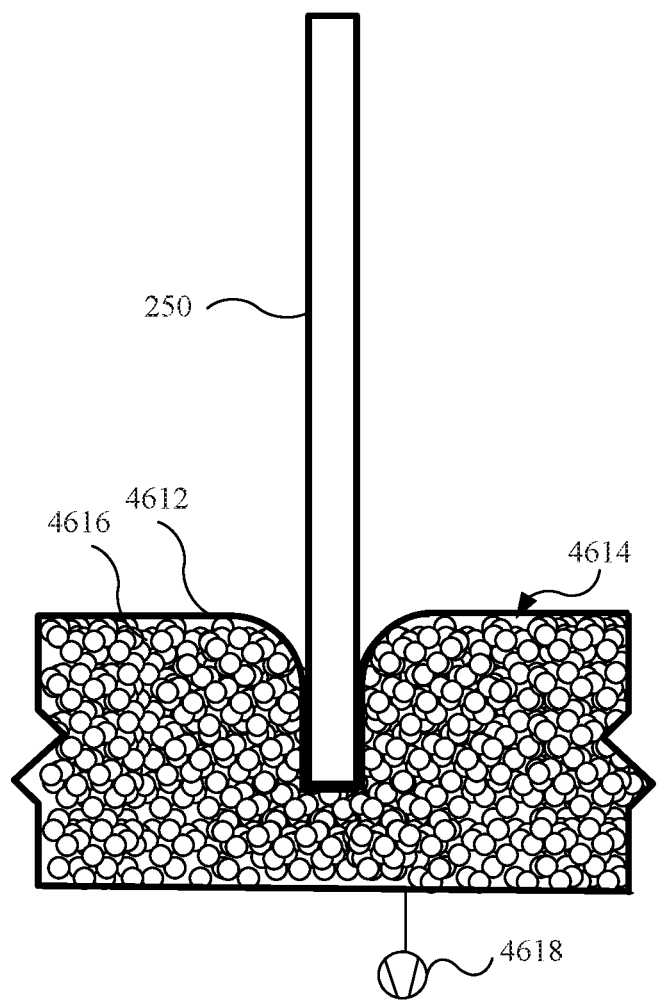
FIG. 46 is a cross-sectional view of the holding device and one of the portable electronic devices taken along line 46-46 in FIG. 45.
Figure 47:
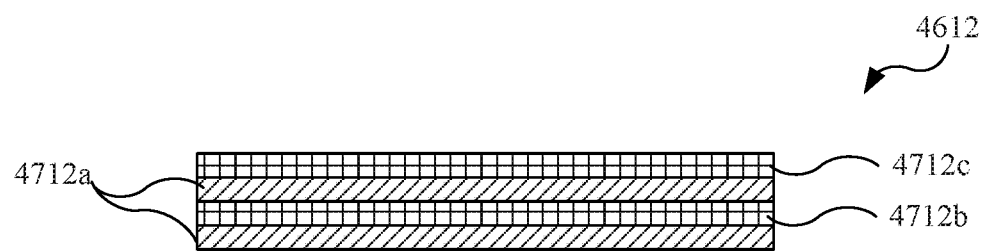
FIG. 47 is a detail cross-sectional view of an outer layer of the holding device shown in FIG. 45.

Referring to FIGS. 45-47, a holding device 4510 is configured as a deformable receiver that selectively hardens to secure a user device therein (e.g., portable electronic devices 250, a standard drinking vessel 4570, etc.). As shown, the holding device 4510 is divided into selectively actuatable regions 4510*a*, which may each individually receive and hold the user device, or may cooperatively hold a single device (see, e.g., the lower portable electronic device 250). Lower embedded portions of the user devices, which are embedded in and held by the holding device 4510, are depicted in dashed lines. Alternatively, the holding device 4510 may include a single actuatable region 4510*a*.

Referring to FIG. 46, each region 4510*a* of the holding device 4510 generally includes a compliant outer layer 4612 (e.g., flexible membrane) that defines a chamber 4614 (e.g., vacuum chamber) containing a media 4616 of solid particles (e.g., beads of glass, polymer, or other suitable material) that are flowable over each other. The holding device 4610 additionally includes a vacuum source 4618 in communication with the chamber 4614 to selectively form a vacuum therein.

When the vacuum is not provided, the compliant outer layer 4612 is deformable, such that pressing on the outer layer 4612 with one of the user devices causes the outer layer 4612 to deform therearound and the media 4616 to flow therearound within the chamber 4614. When the vacuum is provided, the media 4616 is compressed within the chamber 4614 bound by the outer layer 4612, so as to form a rigid assembly around the user device.

The vacuum source 4618 may be activated upon receiving a user input and/or detecting the user device being pressed against the outer layer 4612 and between the media 4616. Depending on the type of user device, detection and determining a location of the user device may be performed according to any of the suitable methods described previously and/or by detecting pressure variances within the chamber 4614. For example, user devices that are not in communication with the holding device 4610, the user may manually activate one or more regions 4510*a* of the holding device 4510 (e.g., using manual inputs as described previously) and/or the location of the user device may be determined according to the methods described previously for activating corresponding regions 4510*a* thereof.

Detecting and/or locating the user devices may be instead or additionally be based on detecting pressure variances within the chamber 4614, optically recognizing a position of the object (e.g., using a camera of the vehicle 100 and/or the holding device 4510), and/or by including a touch sensitive sensor (e.g., capacitive or resistive) in, on, or below the outer layer 4612. The holding device 4510 is activated when the user device is embedded an appropriate depth, as detected automatically or when determined by a user, such as to hold a bezel but not cover a display of the portable electronic device 250.

The outer layer 4612 may be a unitary layer of an elastomeric material (e.g., EPDM, neoprene, silicon, etc.), or as shown in FIG. 47, a composite material comprising one or more elastomeric layers 4712*a*, a strengthening layer 4712*b*, and a decorative layer 4712*c*. In one embodiment, the elastomeric layers 4712*a* are EPDM layers, the strengthening layer 4712*b* is Kevlar, and the decorative layer 4612*c* is a fly-knit material.

The outer layer 4712 is manufactured by pressing or embedding the strengthening layer 4712*b* to a first of the elastomeric layers 4712*a* when uncured, subsequently pressing a second of the elastomeric layers 4712*a* while uncured to the strengthening layer 4712*b*, and finally pressing or embedding the decorative layer 4712*c* to the second elastomeric layer 4712*a* while still uncured. After all the layers 4712*a*, 4712*b*, 4712*c* are pressed together, the layered structure may then be formed to a desired shape and then cured. Alternatively, the respective layers may be formed (e.g., cured and/or cut) into a desired shape, and then assembled/coupled into a final desired shape of the outer layer 4712.

The chamber 4614 may be approximately one inch deep or other suitable depth as may be appropriate for expected devices (e.g., portable electronic devices having greater mass for which a greater holding depth would be desirable). The different regions 4510*a* may have different chamber depths.

The vacuum source 4518 may, for example, be a vacuum source of the vehicle, a dedicated vacuum pump, or an actuatable piston (e.g., via solenoid). Once the vacuum is pulled by the vacuum source 4518, the vacuum is locked (e.g., with a valve or the vacuum source 4518), such that the vacuum source 4518 need not continually operate to continue securing the object. Chambers may additionally include isolation valves (e.g., pistons movable in response to airflow) that isolate any chamber that has failed (e.g., leaks) from the vacuum source 4518 to prevent continued flow through such failed chamber.

Figures 48, 49:
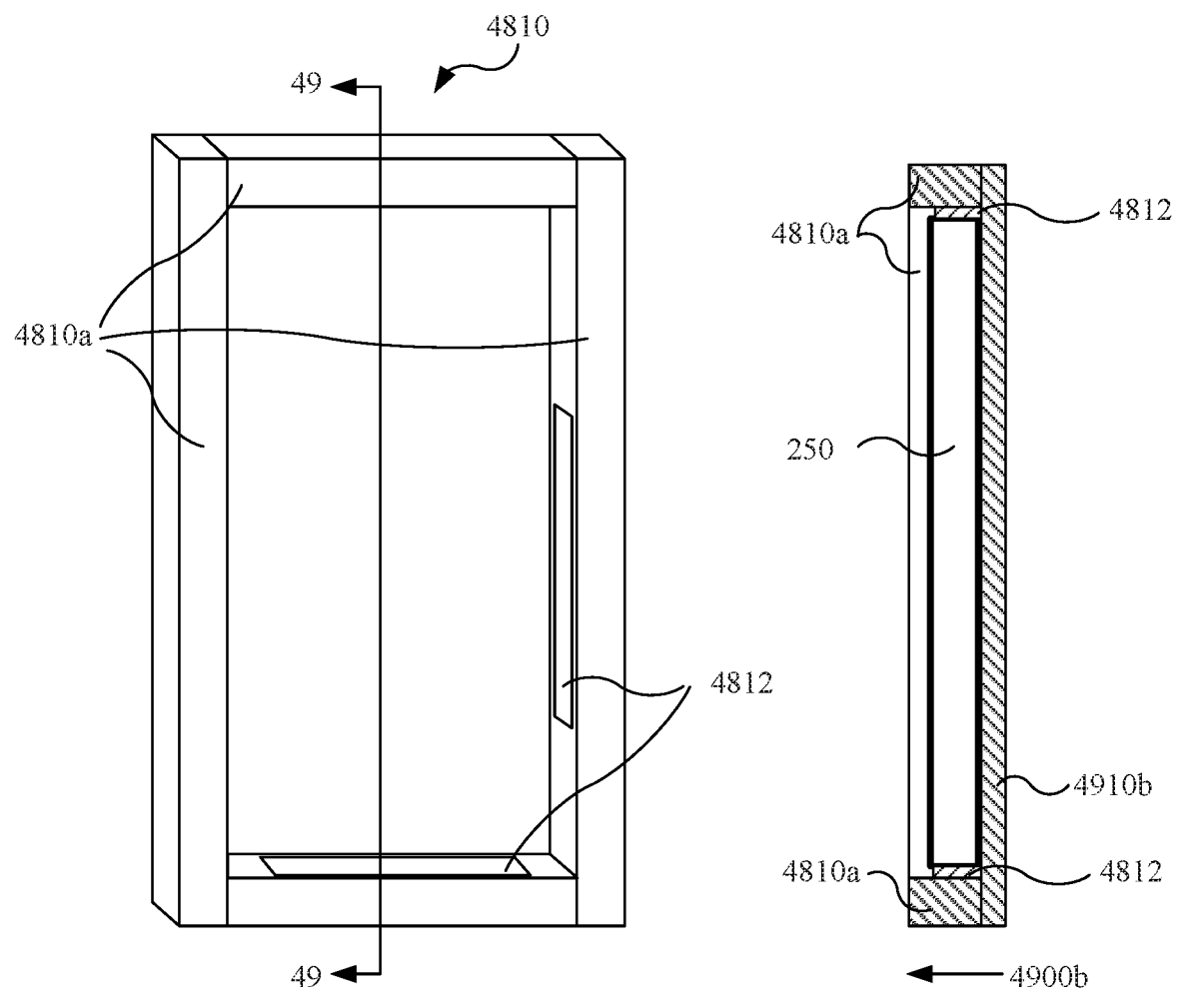
FIG. 48 is an upper, left perspective view of another embodiment of a holding device.
FIG. 49 is a cross-sectional view of the holding device and the portable electronic device shown in FIG. 7 taken along line 49-49 in FIG. 48.

Referring to FIGS. 48-49, a holding device 4810 is configured to retain a portable electronic device 750 using a reusable dry adhesive 4812. For example, the holding device 4810 includes members 4810*a* on opposing sides of the electronic device 750 (e.g., top/bottom and left/right) with patches of dry adhesive 4812 thereon, which engage opposing edges of the portable electronic device 750.

The dry adhesive 4812 may, for example, be a unidirectional adhesive configured to retain the portable electronic device 750 in one direction. As shown in FIG. 49, the portable electronic device 250 may be inserted into the holding device 4810 in a direction indicated by the arrow 4900*a*, but is retained (i.e., is prevented from moving) in an opposite direction indicated by the arrow 4900*b*. The portable electronic device 250 may be removed, for example, by moving a back plate 4910*b* away from the members 4810*a* in the direction 4900*a*, pushing the portable electronic device in the direction 4900*a*, and removing the through the gap formed between the members 4810*a* and the back plate 4910*b*. Instead, the portable electronic device may be released by moving the members 4810*a* away from each other (e.g., up/down and left/right as shown in FIG. 48) to move the adhesive patches 4812 out of contact with the opposing edges of the portable electronic device 750.

The dry adhesive patches 4812 may, for example, comprise high friction, synthetic fibers (e.g., "gecko fibers") that are angularly aligned to engage a surface of an object to prevent movement of the object in one direction.

Figure 50:
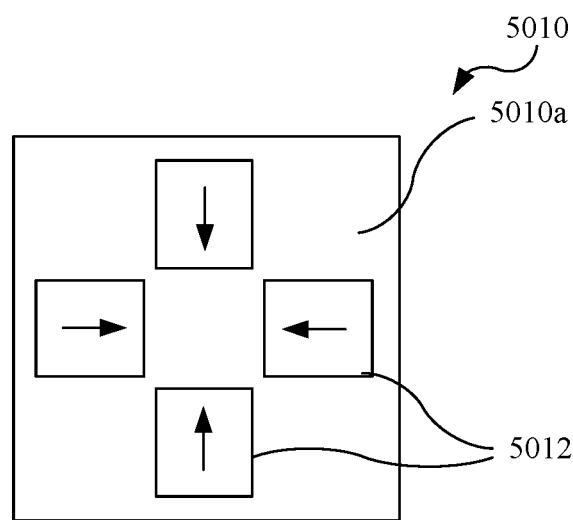
FIG. 50 is a front view of another embodiment of a holding device.

Referring to the embodiment shown in FIG. 50, a holding device 5010 comprises a planar member 5010*a* and a plurality of directional adhesive patches 5012 that are aligned in opposing directions in two axes (e.g., perpendicular axes). The holding direction of each adhesive patch 5012 is indicated by the arrows depicted within the respective patches 5012.

The planar member 5010*a* may be a flexure that is slightly deformable so as to move the adhesive patches 5012 toward each other to engage and compress a portion of the rear surface 752 of the portable electronic device 750 therebetween substantially in plane with the rear surface 752. The planar member 5010a (e.g., planar structure) may, for example, deform to hold the portable electronic device 750 by a first pressing the portable electronic device 750 against the planar member 5010a, and deform to release the portable electronic device 750 upon a second pressing.

To prevent unintended release, the holding device 5010 may maintain the planar member 5010a in its flexed state using one or more actuators that are responsive to sensors receiving user inputs or otherwise sensing actions of the user indicative of their intent to remove the portable electronic device 250. As an alternative to using the planar member 5010a configured as a flexure, the adhesive patches 5012 may otherwise be movable (e.g., using one or more actuators that are controllable in response user inputs and/or user behaviors).

Figure 51:
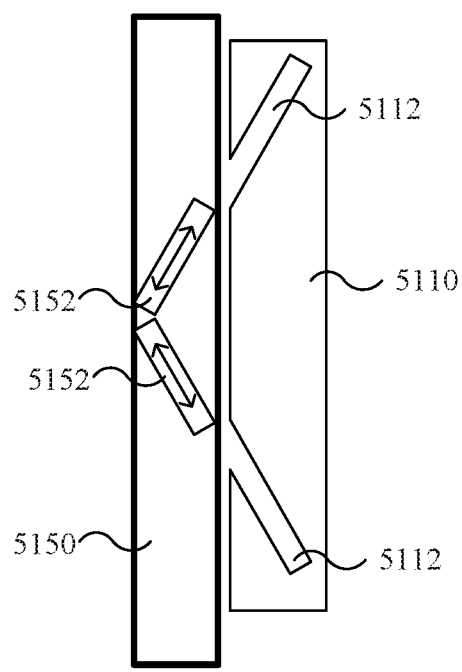
FIG. 51 is a cross-sectional view of other embodiments of a holding device and a portable electronic device.

Referring to FIG. 51, a holding device 5110 receives actuatable pins 5152 of a portable electronic device 5150 in receptacles 5112. The actuatable pins 5152 and each corresponding receptacle 5112 are arranged at non-parallel angles relative to each other to prevent movement of the portable electronic device in six degrees of freedom relative to the holding device 5110. The pins 5152 may be activated according to the user input and device detection strategies described previously. Further, the male/female relationship of the pins 5152 and the receptacles 5112 may be reversed to the holding device 5110 and portable electronic device 5150.

Figure 52:
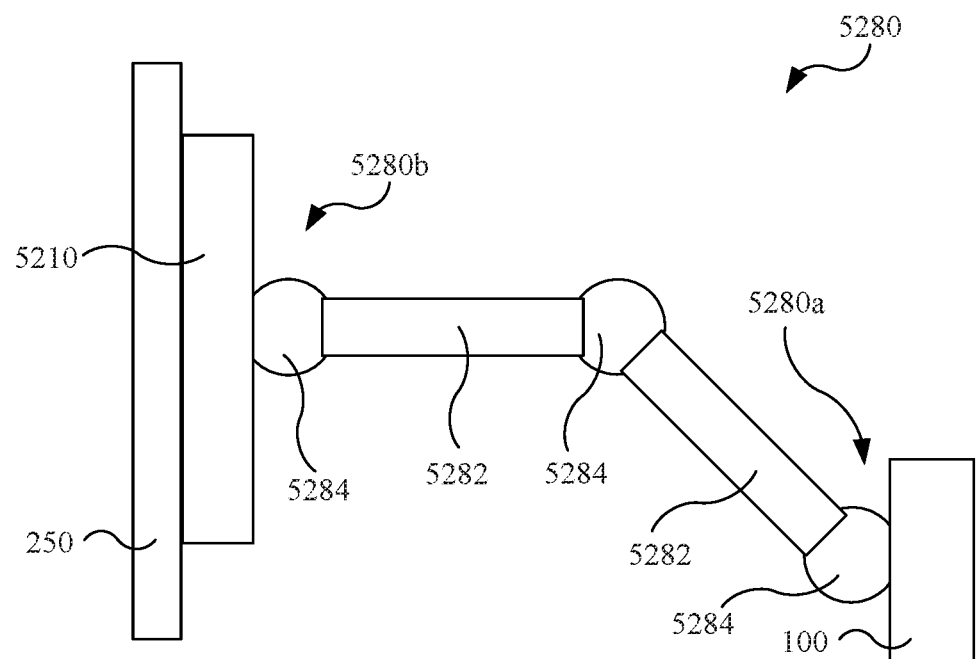
FIG. 52 is a side view of an adjustable mechanism.

Referring to FIG. 52, a portable electronic device 250 is adjustably coupled to a structure of the vehicle 100 via an adjustable mechanism 5280 and a holding device 5210. A distal end 5280a of the adjustable mechanism 5280 is coupled to the vehicle 100 (e.g., in a cavity of a back of a seat 106, door 103c, etc.), while a proximal end 5280b of the adjustable mechanism 5280 is coupled to the portable electronic device 250 via one of the embodiments of the holding device 110 described above or another type (e.g., snap-fit, etc.).

The adjustable mechanism 5280 includes one or more rigid, elongated members 5282 (e.g., links; two as shown) that are movably coupled to each other, the vehicle 100, and/or the holding device 110 via joints 5284 that are selectively lockable. The joints 5284 generally provide one, two, or three rotational degrees of freedom between the members 5282 coupled thereto. The elongated members 5282 may also be interconnected with springs (e.g., coil or gas springs; not shown) to assist in lifting each adjacent member 5282. Collectively, the elongated members 5282 and the joints 5284 allow the portable electronic device 250 to be moved to several positions and in any desired angular orientation. In some embodiments, adjustable mechanism 5288 may limit movement of the portable electronic device 750 to five degrees of freedom, while the sixth degree of freedom (rotation in plane with the holding device) being reserved for a user input for releasing the portable electronic device 750 from the holding device 5210 (as described above).

The joints 5284 are configured to allow movement upon user input or upon detecting certain combinations of contact using, for example, sensors of the portable electronic device 750, sensors of the holding device 5210 (refer to sensors 214 above), and/or vehicle sensors 206. Such input may be a manual selection by a user to unlock the adjustable mechanism 5280, or may be more closely tied to natural movements expected of a user for moving the portable electronic device 750. For example, the holding device 5210 and/or the portable electronic device 250 may detect certain contact, acceleration, and/or relative movement of the portable electronic device 250 to the holding device 5210, which suggest intended movement (e.g., contact on a lower surface and upward acceleration, contact on an upper portion and downward acceleration, etc.). Such contact, movement, and/or combinations of contact/movement that initiate release of the joints 5284 should be distinguishable from other contacts, movement, and/or combinations of contact/movement used for other inputs (e.g., to initiate release of the portable electronic device 250). Such input may also be based on observations of the passenger with a vehicle camera.

The joints 5284 may, for example, include friction plates that are released with decompression, interleaved plates with interlocking circumferentially spaced peaks/valleys and which are released with decompression, etc. The joints 5284 may include any suitable actuator.

Figure 53:
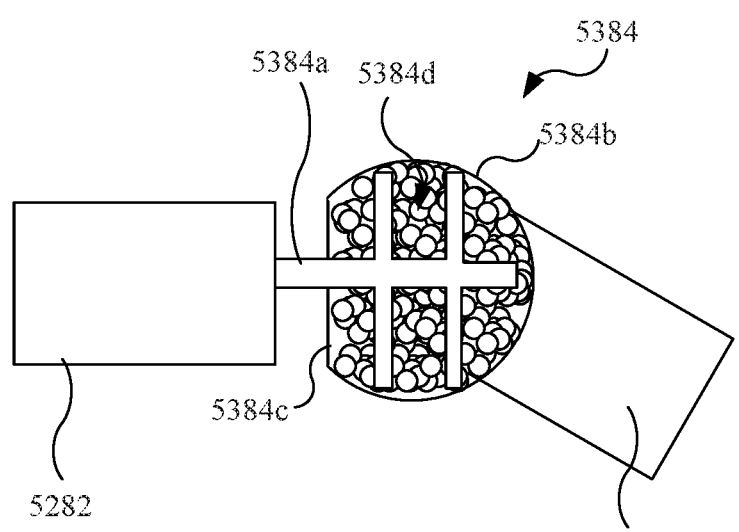
FIG. 53 is a cross-sectional view of a joint of the adjustable mechanism shown in FIG. 52.
Figure 54:
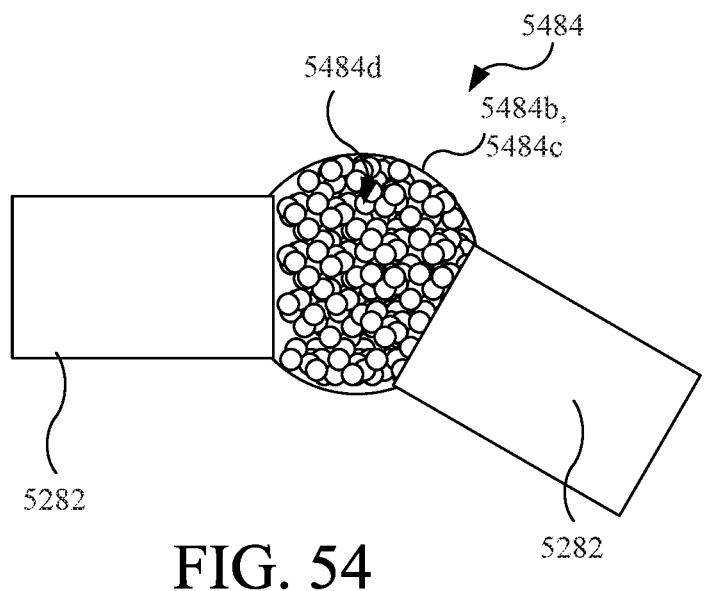
FIG. 54 is a cross-sectional view of another joint of the adjustable mechanism shown in FIG. 53.

In another example, as shown in FIG. 53, a joint 5384 is operated on principles used in the holding device 4510 by using a male member 5384a (e.g., a ball) that is movable within a rigid chamber 5384b bound by an outer layer 5834c and lockable within media 5384d. The male member 5384a is positioned and rotatable (e.g., in one, two, or three axes) within the rigid chamber 5384b. The male member 4884a may also include one or more flanges or engagement regions that provide bearing surfaces that bear in a normal direction against the media 5384d (as opposed to a ball having only friction thereagainst).

The joint 5384 is locked by applying a vacuum to the rigid chamber 5384b, which draws the outer layer 5384c (e.g., membrane) against the media 5384d to lock the male member 5384a therein. The vacuum source (not shown) may be configured in the manners described for the vacuum source 4618. The joint 5384 is released by releasing the vacuum.

According to another embodiment, a joint 5484 is configured similar to the joint 5384 but includes no male member 5384a rotatable within a cavity. Rather, an outer layer 5484c forms a flexible chamber 5484b, which is coupled to the members 5282 on either side thereof. When the joint 5484 is unlocked (i.e., when no vacuum is drawn), the members 5282 may be moved relative to each other, which causes the outer layer 5484c and the flexible chamber 5484b formed thereby to flex and the media 5484d therein to flow over itself. The joint 5484 is locked by drawing a vacuum, which compresses the media 5484d within the flexible chamber 5484b to prevent flow therein, to thereby hold the members 5282 in fixed relation to each other.

Figure 55:
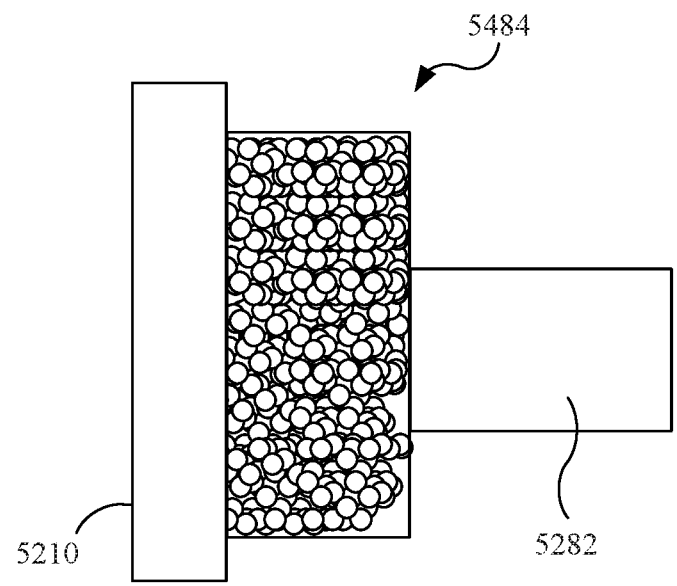
FIG. 55 is another cross-sectional view of an alternative configuration of the joint shown in FIG. 54.

As shown in FIG. 55, a joint 5484 may be particularly advantageous for coupling a member 5282 to the holding device 5210, as shown in FIG. 55 to provide limited movement (e.g., +/−approximately 15 degrees or less) in two degrees of rotational freedom but substantially prevents movement in a third degree of rotational freedom.

Figure 56:
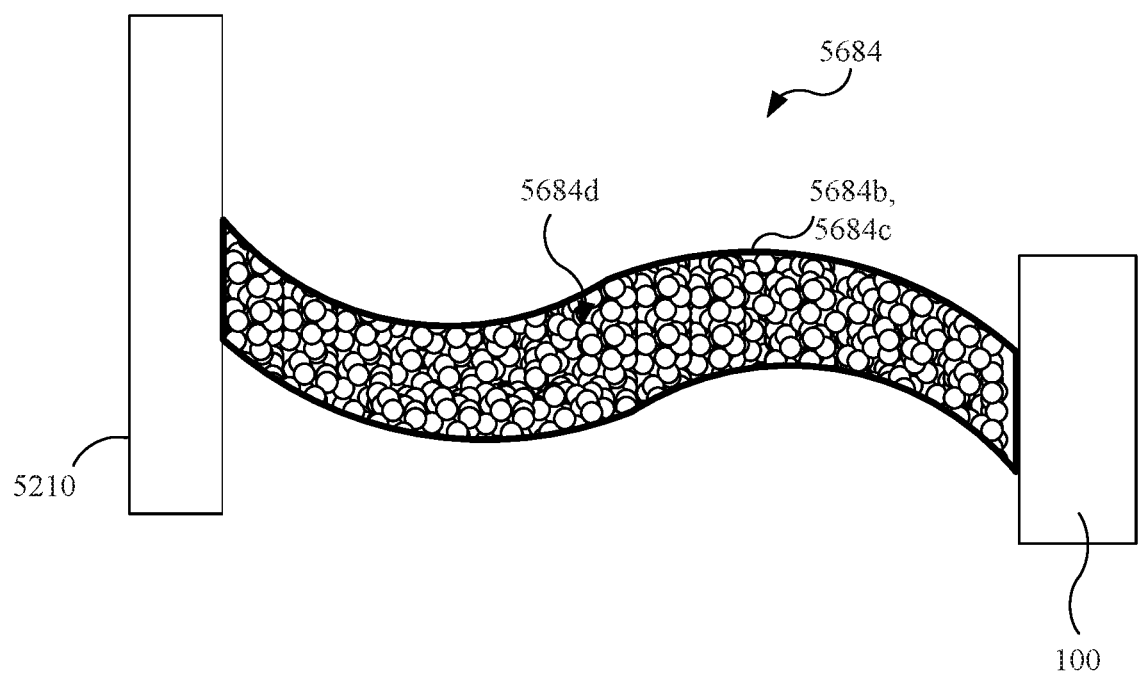
FIG. 56 is a cross-sectional view of another adjustable mechanism.

Referring to FIG. 56, an adjustable mechanism 5680 may instead include an elongated, flexible chamber 5684b formed by an outer layer 5684c, which extends from the holding device 5210 the structure of the vehicle 100. When a vacuum is drawn, the media 5684d contained in the flexible chamber 5684b is compressed together to prevent flow therein and form a generally rigid, elongated structure. When the vacuum is released, the holding device 5210 may be moved to a desired location, while the flexible chamber 5684b is deformed and the media 5684d flows within the chamber 5684b.

What is claimed is:

1. A system for securing a user device in a vehicle, comprising:
   a controller;
   a magnet; and
   an attraction plate,
   wherein one of the magnet or the attraction plate is mechanically coupled to the vehicle, and the other of the magnet or the attraction plate is mechanically coupled to the user device, and
   wherein the magnet is selectively activated by the controller to hold the attraction plate and, thereby, secure the user device to the vehicle.

2. The system according to claim 1, wherein the magnet is a component of a holding device that is mechanically coupled to the vehicle, and the attraction plate is mechanically coupled to the user device.

3. The system according to claim 1, wherein the magnet is an electropermanent magnet.

4. The system according to claim 1, further comprising:
   multiple magnets and multiple attraction plates that each correspond to one of the magnets,
   wherein the multiple magnets are activated progressively to firstly angularly orient the user device to magnets with a lesser force and secondly secure the user device to the magnets with a greater force,
   wherein the multiple magnets include a first set of magnets having a first strength and a second set of magnets having a second strength that is greater than the first strength, and
   wherein the magnets of the first set of magnets are activated to angularly orient the user device and the magnets of the second set of magnets are activated to secure the user device.

5. The system according to claim 1, further comprising a sensor, wherein the magnet is a component of a holding device and is activated by the controller upon detection with the sensor of the user device being positioned proximate the holding device.

6. The system according to claim 5, wherein the holding device includes the sensor that is one of an optical sensor, a Hall effect sensor, a radio-frequency identification (RFID) device, or a Near Field Communication (NFC) device to detect the user device.

7. The system according to claim 5, wherein the holding device is configured to determine whether the user device is an authorized device by at least one of communicating with the user device, optically recognizing the user device, magnetically recognizing the user device, or recognizing a wireless signal from the device.

8. The system according to claim 1, further comprising a sensor, wherein the magnet is a component of a holding device and is operated by the controller to release the user device upon detecting with the sensor grasping of the user device by a user.

9. The system according to claim 8, wherein the holding device releases the user device upon at least one of detecting with the sensor user contact on opposite sides of the user device, detecting with the sensor a force of contact as exceeding a threshold, or optically recognizing with the sensor the user as grasping the user device.

10. The system according to claim 8, wherein the holding device releases the user device in a staged manner by operating the magnet with the controller to reduce a magnetic force applied by the magnet to the attraction plate to lessen a holding force by which the user device is removable by the user from the holding device.

11. The system according to claim 1, wherein the magnet is a component of a holding device having multiple magnets that provide multiple holding locations to which the user device is movable relative to the holding device and at which the user device is securable by the holding device, wherein the holding device is configured to determine a present location of the user device and activate with the controller one or more of the magnets corresponding to the present location of the user device.

12. The system according to claim 11, wherein each magnet of the multiple magnets is associated with only one of the holding locations.

13. The system according to claim 11, wherein the multiple magnets are arranged in a matrix, and a majority of the magnets are associated with more than one of the holding locations.

14. The system according to claim 1, wherein the magnet is a component of a holding device, and holds the attraction plate with greater force upon detection of at least one of separation between the holding device and the user device, vehicle acceleration exceeding a threshold, or anticipated vehicle acceleration.

15. The system according to claim 1, wherein the user device is a portable electronic device.

16. The system according to claim 15, wherein the system provides active feedback determined by the controller to assist a user in positioning the portable electronic device relative to the magnet.

17. The system according to claim 16, wherein the active feedback comprises at least one of visual feedback, tactile feedback, or audible feedback.

18. The system according to claim 16, wherein the active feedback is visual feedback comprising a dynamic graphical representation on a display of the portable electronic device.

19. The system according to claim 15, wherein the portable electronic device has a display screen.

20. The system according to claim 15, further comprising a housing removably coupled to the electronic device and including the attraction plate.

21. The system according to claim 1, wherein the user device is an auxiliary device for holding contents.

22. A system for holding a user device, comprising:
   a passenger vehicle; and
   a holding device mechanically coupled to the passenger vehicle,
   wherein the holding device magnetically couples to the user device upon active detection of the user device using one or more sensors of at least one of the user device, the holding device, or the passenger vehicle.

23. The system according to claim 22, wherein the holding device releases the user device upon detecting both contact of the user device by a user and intent by the user to grasp the user device.

24. The system according to claim 23, wherein the intent of the user is determined by at least one of contacting opposing sides of the user device, contacting the user device with a force exceeding a threshold, or optical recognition of the user.

25. The system of claim 22, wherein the system is configured to provide feedback to a user of an angular orientation of the user device relative to the holding device by at least one of visually or tactilely.

26. The system according to claim 22, wherein the user device is a portable electronic device having a display screen.

27. The system according to claim 22, further comprising a controller in communication with the sensors and that selectively operates the holding device upon active detection of the user device with the sensors.

28. An object securing system for a vehicle, the system comprising:
- a controller;
- a magnetic device that is connected to the vehicle and is switchable between a first state in which an external magnetic field is produced to attract ferromagnetic objects and a second state in which the external magnetic field output by the magnetic device is changed by the controller relative to the first state; and
- an electronic device, wherein the electronic device is held by the magnetic device in the first state and the electronic device is released from the magnetic device in the second state.

29. The system according to claim 28, further comprising a sensor, wherein magnetic device is switched to the first state by the controller when the electronic device is detected in proximity of the magnetic device with the sensor.

30. The system according to claim 28, wherein the electronic device has a display screen.

31. A system for holding a user device, comprising:
- a passenger vehicle;
- a holding device mechanically coupled to the passenger vehicle;
- a controller by which the holding device is operated to magnetically couple to the user device; and
- a sensor by which the holding device actively detects the user device;
- wherein the holding device magnetically couples to the user device upon active detection of the user device by the holding device.

* * * * *